United States Patent
Yoshida et al.

(10) Patent No.: US 9,930,482 B2
(45) Date of Patent: Mar. 27, 2018

(54) DEVICE WITH POSITION DETERMINATION MEANS, SERVER APPARATUS FOR COMMUNICATING WITH THAT DEVICE, METHOD FOR RECEIVING SERVICE IN ACCORDANCE WITH POSITION, AND PROGRAM

(71) Applicant: INTEC INC., Toyama-shi, Toyama (JP)

(72) Inventors: Mikio Yoshida, Kanagawa (JP);
Takahiro Endo, Kanagawa (JP);
Kenichi Nagami, Kanagawa (JP);
Natsuko Yoshizawa, Kanagawa (JP)

(73) Assignee: INTEC INC., Toyama-Shi (JP)

( * ) Notice: Subject to any disclaimer, the term of this patent is extended or adjusted under 35 U.S.C. 154(b) by 0 days.

(21) Appl. No.: 15/305,491

(22) PCT Filed: Mar. 13, 2015

(86) PCT No.: PCT/JP2015/001403
§ 371 (c)(1),
(2) Date: Oct. 20, 2016

(87) PCT Pub. No.: WO2015/162846
PCT Pub. Date: Oct. 29, 2015

(65) Prior Publication Data
US 2017/0048662 A1 Feb. 16, 2017

(30) Foreign Application Priority Data

Apr. 21, 2014 (JP) ................................. 2014-087749

(51) Int. Cl.
*H04W 24/00* (2009.01)
*H04W 4/02* (2018.01)
(Continued)

(52) U.S. Cl.
CPC .............. *H04W 4/02* (2013.01); *G06F 13/00* (2013.01); *H04M 1/72572* (2013.01); *G01S 19/01* (2013.01)

(58) Field of Classification Search
CPC ...... H04W 4/02; H04M 1/72572; G01S 19/01
See application file for complete search history.

(56) References Cited

U.S. PATENT DOCUMENTS 9,250,310 B2 * 2/2016 Hasegawa ................. G01S 5/02
2007/0266395 A1 * 11/2007 Lee ......................... H04H 60/31
725/11

(Continued)

FOREIGN PATENT DOCUMENTS

JP 11-075242 A 6/1999
JP 2003-032730 A 1/2003

(Continued)

OTHER PUBLICATIONS

Motonobu Kawai, "Indoor Positioning Begins", Tokushu; Ayumidasu Okunai Sokui, May 27 issue of Nikkei Electronics (2013), pp. 27-41 and its partial English translation thereof.

*Primary Examiner* — Wayne H Cai
(74) *Attorney, Agent, or Firm* — Foley & Lardner LLP

(57) ABSTRACT

Signals to be used for receiving a service according to position are appropriately selected from a plurality of positioning signals received by a moving device.
A device capable of being used while moving and of receiving a service according to a position to which the device has moved comprises: positioning means for, based on positioning signals for location identification separately received from a plurality of positioning devices, determining their respective positional information; holding means for holding positional information determined by the positioning means for each type of the plurality of positioning devices; and notification means for, regarding positional (Continued)

information newly determined by the positioning means, determining with reference to the holding means whether to provide notification of the position in order to receive the service or not, and providing the notification according to the determination.

20 Claims, 43 Drawing Sheets

(51) Int. Cl.
     *G06F 13/00*      (2006.01)
     *H04M 1/725*     (2006.01)
     *G01S 19/01*      (2010.01)

(56) References Cited

U.S. PATENT DOCUMENTS

| | | | |
|---|---|---|---|
| 2010/0318535 A1* | 12/2010 | Weber | G06F 17/3087 707/759 |
| 2011/0119222 A1* | 5/2011 | Rosinski | H04W 16/18 706/50 |
| 2013/0267256 A1 | 10/2013 | Yu | |

FOREIGN PATENT DOCUMENTS

| | | |
|---|---|---|
| JP | 2005-217484 A | 8/2005 |
| JP | 2010-139321 A | 6/2010 |
| JP | 2010-210557 A | 9/2010 |
| JP | 2013-106278 A | 5/2013 |
| JP | 2014-009964 A | 1/2014 |

\* cited by examiner

FIG.4

⟨Positioning Result Master 155⟩

| Location ID | Location | Positioning means |
|---|---|---|
| RL001 | (35.679, 139.763), (35.680, 139.763), (35.680, 139.763), (35.679, 139.762) | GNSS |
| RL101 | (35.680, 139.763), (35.680, 139.764), (35.681, 139.764), 35.681, 139.763) | GNSS |
| ... | ... | |

FIG.5
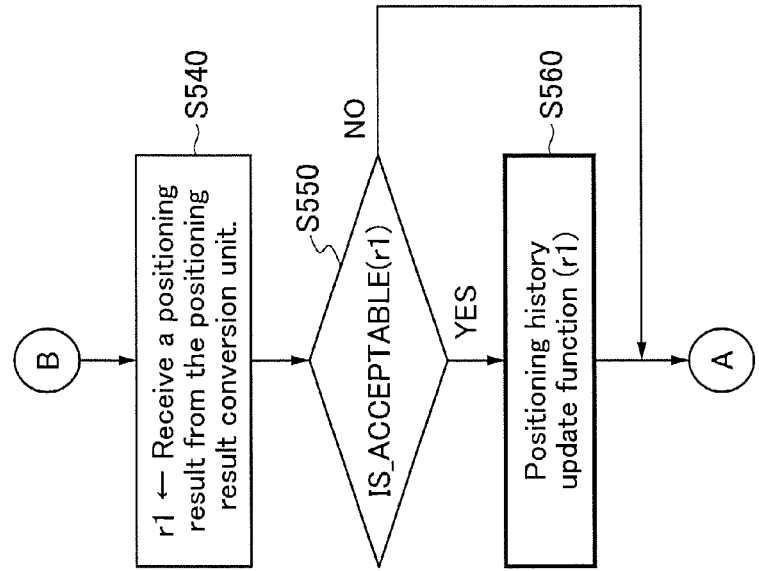
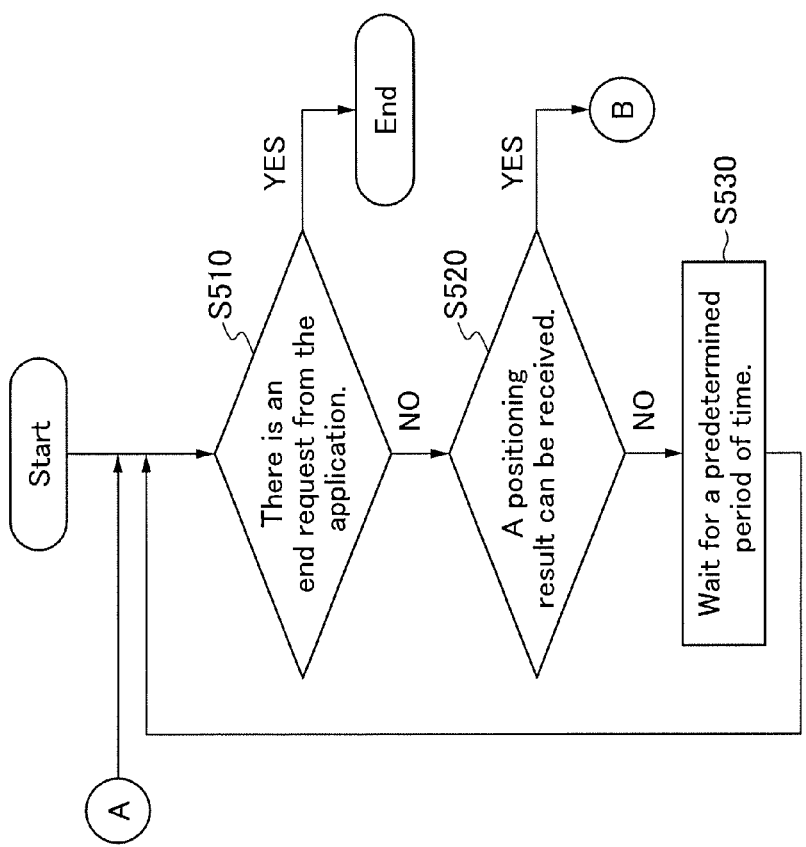
IS_ACCEPTABLE(r): Search the positioning device management master using the location ID of a positioning result r as a key, and return YES if there is a result, or NO otherwise.

FIG.6

⟨Positioning Device Management Master 175⟩

| Location ID | Latitude | Longitude | Level (type or priority) | Valid period (sec.) | Valid distance (m) | List of acquirable positioning result location IDs |
|---|---|---|---|---|---|---|
| RL001 | 35.680 | 139.763 | 1 | 300.0 | 50.0 | RL001, RL002, RL003, RL004, RL005, RL006, RL007, RL008, RL009 |
| RL002 | 35.680 | 139.762 | 2 | 1.1 | 10.0 | RL001, RL002, RL003, RL004, RL006, RL008 |
| RL003 | 35.680 | 139.763 | 3 | 1.1 | 10.0 | RL001, RL002, RL003, RL005, RL007, RL009 |
| RL004 | 35.681 | 139.762 | 4 | 1.1 | 3.0 | RL001, RL002, RL004, RL006 |
| RL005 | 35.680 | 139.764 | 4 | 1.1 | 3.0 | RL001, RL003, RL005 |
| RL006 | 35.680 | 139.761 | 5 | 1.1 | 3.0 | RL001, RL002, RL006 |
| RL007 | 35.680 | 139.763 | 5 | 1.1 | 3.0 | RL001, RL003, RL007 |
| RL008 | 35.680 | 139.762 | 5 | 1.1 | 1.0 | RL001, RL002, RL008 |
| RL009 | 35.680 | 139.763 | 6 | 1.1 | 1.0 | RL001, RL003, RL009 |

FIG.9

⟨Positioning History Memory 165⟩

P001 Time 10:00:00

| Level | Location ID | Time of positioning | Valid period (sec.) | Valid distance (m) |
|---|---|---|---|---|
| 5 | RL008 | 10:00:00 | 1.10 | 3.0 |

P002 Time 10:00:01

| Level | Location ID | Time of positioning | Valid period (sec.) | Valid distance (m) |
|---|---|---|---|---|
| 5 | RL008 | 10:00:00 | 1.10 | 3.0 |
| 2 | RL002 | 10:00:01 | 1.10 | 10.0 |

P003 Time 10:00:02

| Level | Location ID | Time of positioning | Valid period (sec.) | Valid distance (m) |
|---|---|---|---|---|
| 2 | RL002 | 10:00:02 | 1.10 | 10.0 |

P004 Time 10:00:03

| Level | Location ID | Time of positioning | Valid period (sec.) | Valid distance (m) |
|---|---|---|---|---|
| 3 | RL003 | 10:00:03 | 1.10 | 3.0 |
| 2 | RL002 | 10:00:02 | 1.10 | 10.0 |

P005 Time 10:00:04

| Level | Location ID | Time of positioning | Valid period (sec.) | Valid distance (m) |
|---|---|---|---|---|
| 3 | RL003 | 10:00:04 | 1.10 | 3.0 |

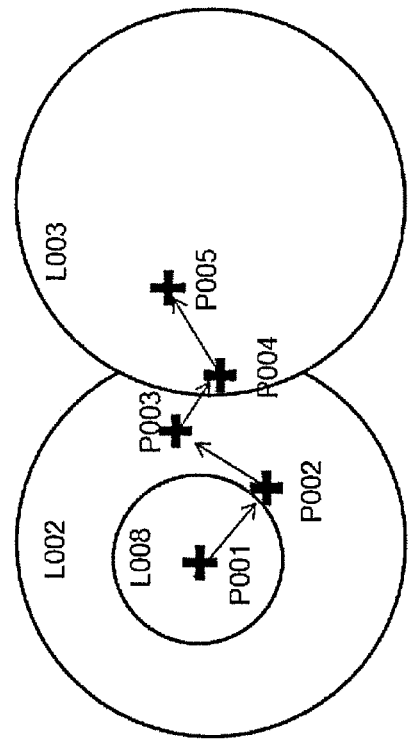

FIG.11

<Activity History Memory 196>

| Time | Velocity vector (m/s) |
|---|---|
| 10:00:00 000 | (1.0,1.0,0.0) |
| 10:00:01 000 | (0.5,1.1,0.0) |
| 10:00:02 000 | (0.6,0.95,0.1) |
| 10:00:03 000 | (0.8,1.05,0.05) |
| 10:00:04 000 | (0.85,1.10,0.1) |
| 10:00:05 000 | (0.7,1.05,0.15) |
| 10:00:06 000 | (0.75,1.0,0.1) |

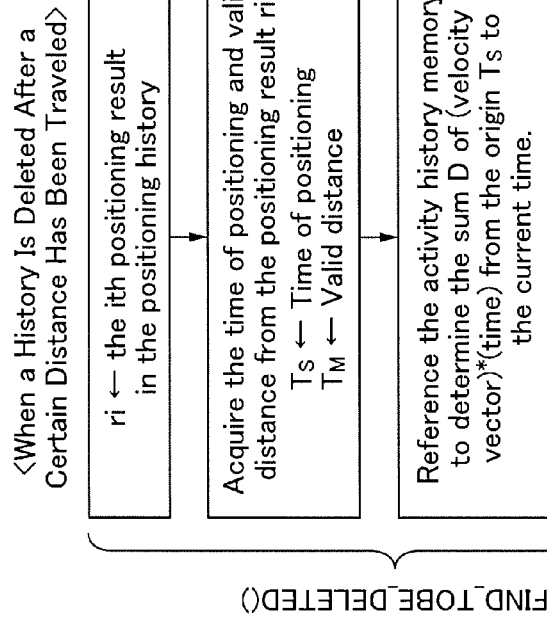
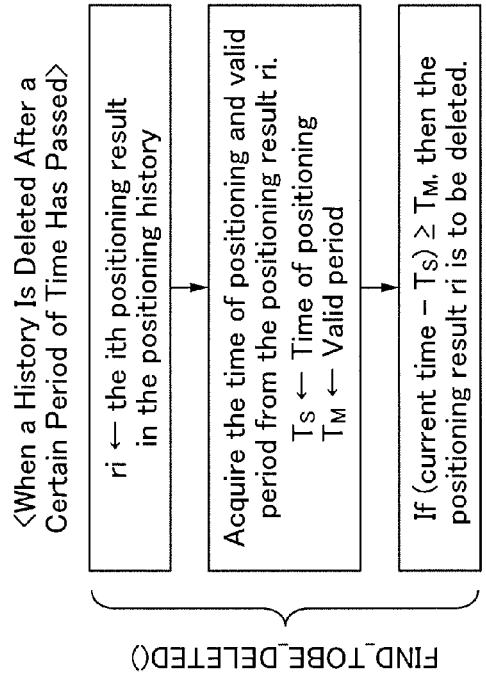
FIG.14

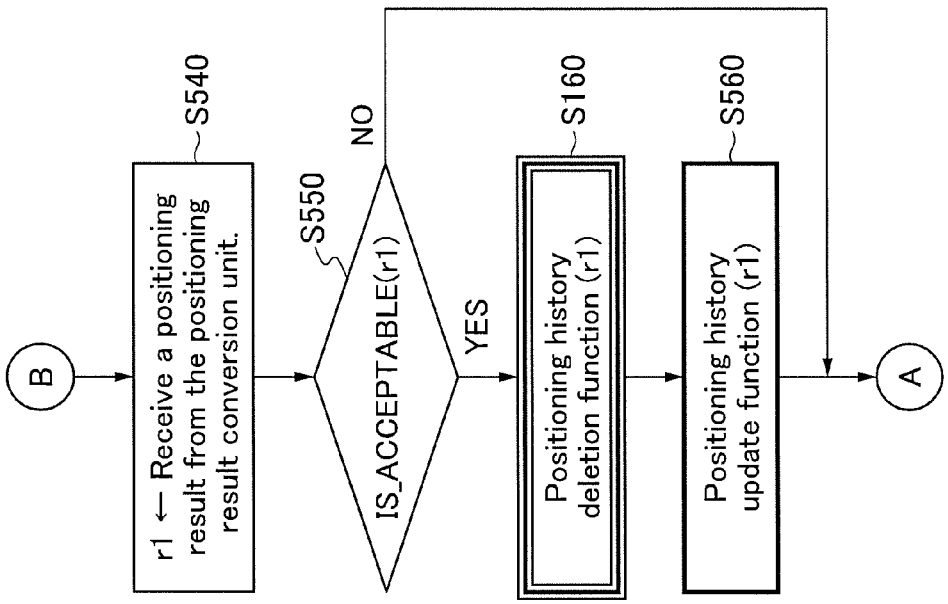
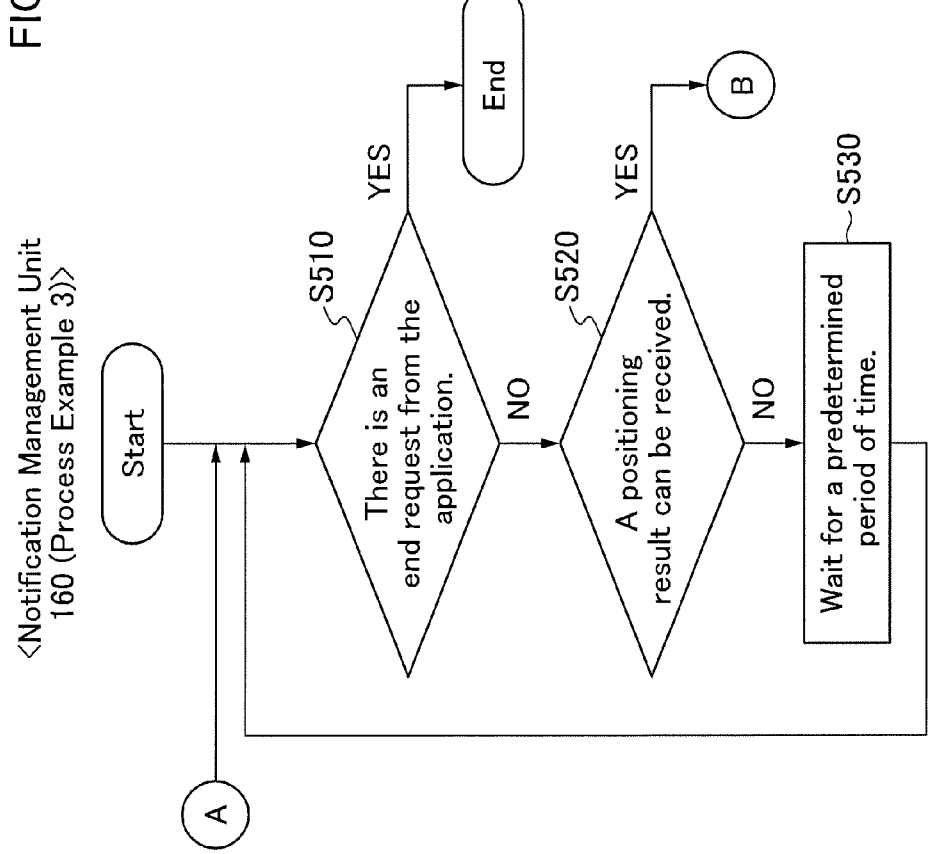
FIG.16

FIG.21

| | Configuration | Process example of the notification management unit | Update and notification example of the positioning history | Timer process example | Deletion example of the positioning history |
|---|---|---|---|---|---|
| Example (A) | 1 | 1 | 1 | — | — |
| Example (B) | 1 | 1 | 2 | — | — |
| Example (C) | 2 | 2 | 1 | 1 | — |
| Example (D) | 2 | 2 | 2 | 1 | — |
| Example (D)' | 2 | 2 | 2 | 2 | — |
| Example (E) | 1 | 3 | 2 | — | 1 |
| Example (F) | 1 | 3 | 1 | — | 2 |
| Example (G) | 1 | 3 | 2 | 1 | 2 |
| Example (H) | 2 | 4 | 2 | 2 | 1 |
| Example (H)' | 2 | 4 | 2 | 1 | 1 |
| Example (I) | 2 | 4 | 1 | 2 | 2 |
| Example (J) | 2 | 4 | 2 | 1 | 2 |
| Example (J)' | 2 | 4 | 2 | 2 | 2 |
| Example (K) | 1 | 3 | 1 | — | 3 |
| Example (L) | 1 | 3 | 2 | — | 3 |

| Location ID | Latitude | Longitude | Level (type or priority) |
|---|---|---|---|
| RG221 | 35.680 | 139.7632 | 1 |
| RS221 | 35.680 | 139.7631 | 3 |
| RS222 | 35.680 | 139.7633 | 3 |

(b)

⟨Example (J), Example (J)'⟩

(a) Numerical values in parentheses represent the time of positioning.

| Location ID | Latitude | Longitude | Level (type or priority) | Valid period (sec.) | Valid distance (m) | List of acquirable positioning result location IDs |
|---|---|---|---|---|---|---|
| RG331 | 35.680 | 139.7631 | 1 | 300.0 | 1000.0 | RG331, RW331, RW332, RS331 |
| RW331 | 35.680 | 139.7630 | 2 | 10.0 | 200.0 | RG331, RW331, RW332, RS331 |
| RW332 | 35.680 | 139.7633 | 2 | 10.0 | 200.0 | RG331, RW331, RW332, RS331 |
| RS331 | - | - | 3 | 3.0 | 3.0 | RG331, RW331, RW332, RS331 |

<Positioning Device Management Master 175>

| Location ID | Latitude | Longitude | Level (type or priority) | List of positioning results required for notification |
|---|---|---|---|---|
| RG371 | 35.681 | 139.762 | 1 | |
| RW371 | 35.681 | 139.763 | 2 | |
| RS371 | 35.681 | 139.762 | 3 | RW371 |
| RS372 | 35.680 | 139.764 | 4 | RS371 |
| RS373 | 35.682 | 139.764 | 5 | |

FIG.39

⟨Positioning Device Management Master 175⟩

| Location ID | Latitude | Longitude | Level (type or priority) | List of positioning results required for acceptance |
|---|---|---|---|---|
| RG371 | 35.681 | 139.762 | 1 | |
| RW371 | 35.681 | 139.763 | 2 | |
| RS371 | 35.681 | 139.762 | 3 | RW371 |
| RS372 | 35.680 | 139.764 | 4 | RS371 |
| RS373 | 35.682 | 139.764 | 5 | RS372 |

FIG.43

| | GNSS (GPS) | QZSS (Michibiki) | Wi-Fi | iBeacon | Sound wave signal | RFID | PDR |
|---|---|---|---|---|---|---|---|
| Signal type | Radio wave | Radio wave | Radio wave | Radio wave | Sound wave/ Ultrasonic | Radio wave | — |
| Indoor use | No | No | Yes if the area is large | Yes | Yes | Yes | Yes |
| Outdoor use | Yes | Yes | Yes | Yes | Sometimes difficult | Yes | Yes |
| Coverage | Large | Large | 100 to 300 m | Approx. 50 m | Approx. 2 to 3 m | Less than 10 cm | — |
| Directivity | No | No | No | No | Yes Easy to limit the coverage | No | — |
| Installation intervals of transmitters | — | — | No | 2 to 3 m or greater A device other than the closest one could be identified if too close | 2 to 3 m or greater Distinction can be made even if close because of the directivity | 10 cm or greater Intervals can be narrowed because of the small coverage | — |
| Simultaneous identification | — | — | Many Somewhat limited | Limited Data acquisition requires time due to radio frequency interference | One device | One device | — |
| Accuracy | Low | High | Medium | Medium to High | High | High | Medium to High |
| Identification accuracy | Over 10 m | 1 m | 3 to over 10 m | 1 to 10 m | 1 to several meters | Less than 10 cm | 1 to several meters |
| Doppler effect | Strong | Strong | Strong | Strong | Weak Sometimes influenced by the wind | Weak | — |
| Update intervals | 1 sec. | 1 sec. | 0.1 to 1 sec. | Approx. 1 sec. | 0.2 to 1 sec. | 0.1 to 0.2 sec. | Approx. 1 sec. |

DEVICE WITH POSITION DETERMINATION MEANS, SERVER APPARATUS FOR COMMUNICATING WITH THAT DEVICE, METHOD FOR RECEIVING SERVICE IN ACCORDANCE WITH POSITION, AND PROGRAM

RELATED APPLICATION

This application claims the benefit of Japanese Patent Application No. 2014-087749 filed on Apr. 21, 2014 in Japan, the contents of which are incorporated herein by reference.

TECHNICAL FIELD

The present invention is intended for a system for, in an environment where devices for outputting positioning signals are installed in their respective places, locating the moment-to-moment position of a moving device and providing information, a process, or other services according to the position, and relates to a technology to determine in the system how to handle a plurality of positioning signals received by the device.

BACKGROUND ART

In recent years as smartphones and wearable devices have become popular, there have been proposed many services that are provided based on the position to which they move (augmented reality, navigation, communication, maintenance, sales support applications, or the like) (e.g. Non-patent document 1).

There are various positioning methods for locating an object on the move. GNSS (Global Navigation Satellite System) is a method in which navigation signals transmitted from satellites are received to determine the current position and direction. QZSS (Quasi-Zenith Satellite System), a method that uses satellites that orbit almost directly over Japan, is a technology that complements GPS, which is a kind of GNSS.

In a Wi-Fi (registered trademark) method, a radio wave transmitted from a Wi-Fi base station is received to estimate the current position from the radio field intensity or the SSID. iBeacon (registered trademark) is a communication function using short-range wireless communications developed by Apple, and conforms to Bluetooth (registered trademark) 4.0LE. In a sound wave signal method, a transmitter (speaker) that generates a sound wave or ultrasonic including an ID is installed, a receiver (microphone) attached to the device receives it, and the position is detected from the ID (e.g. Patent document 1). NFC (Near Field Communication (also called RFID)) is a near field wireless communication technology known as FeliCa (registered trademark), MIFARE, or the like, and can identify the subject by bringing the device close to the system. These methods involve determining in advance the positions corresponding to positioning signals (e.g. the positions of devices that transmit positioning signals), receiving a single or plurality of positioning signals, and estimating the current position from information on the position corresponding to each positioning signal.

PDR (Pedestrian Dead Reckoning) is a method that integrates a very small change detected by sensors of the device to estimate distance and direction, and can estimate the current position using the relative travel distance and direction from the previous position. It can therefore be used in combination with the above-described various methods that involve receiving positioning signals.

PRIOR ART DOCUMENTS

Patent Document

Patent document 1: Japanese Patent Laid-Open Application No. 2013-106278

Non-Patent Document

Non-patent document 1: Tokushu; Ayumidasu Okunai Sokui (Feature article; Indoor Positioning Begins), May 27 issue of Nikkei Electronics (2013), 27-41

SUMMARY OF THE INVENTION

Problems to be Solved by the Invention

The various positioning methods described above have their own characteristics as shown in FIG. 43, and can improve the quality of a service if one application (program for providing the service) can appropriately use positional information obtained by a plurality of positioning methods. For example, the accuracy and availability of each positioning method are influenced by environmental conditions, but a service can be received consistently if a plurality of positioning methods can be used together to perform positioning, even if the environmental conditions change during travel.

Using a plurality of positioning methods in combination, however, would cause the following problem for example. When the device comes to an overlapping area between the coverage of a transmitter of one positioning method and the coverage of a transmitter of another positioning method, the device receives two or more positioning signals. Unless an application that provides a service (to transmit information specific to the relevant place, etc.) with the reception of positioning signals as a trigger determines whether the received positioning signals can be used or not, it would frequently provide the same service (to transmit identical information repeatedly, etc.).

This problem can be solved if the plurality of positioning signals to be received are based on one and the same positioning method, because signals can be discriminated relatively easily by using a measure related to quality or the like (e.g. signal intensity for Wi-Fi, sound pressure for sound wave signals, etc.). If the positioning methods vary, however, it is difficult to discriminate signals because they are received at different times and their measures of quality etc. are different from one another. Even if, for example, received signals are to be accumulated for a certain period of time and be evaluated with a common measure converted from a measure of each positioning method, it is difficult to set the certain period of time because the timing of reception is not synchronized between different positioning methods, and it is also difficult to determine how to achieve the common measure because their evaluation measures essentially differ from one another. Temporarily buffering a signal is also disadvantageous in that it requires time from the reception of a signal to the response to it.

Another scheme to restrain the repeated provision of an identical service is, for example, that If a signal of one positioning method that was received last time was used for receiving a service, a positioning signal of another positioning method that is received this time is not to be used. If this scheme is adopted, an application, which is made to provide a service as if there are different places also when there is an overlap between each coverage of transmitters of two positioning methods, would not be able to provide the service as intended.

While the problem described above is significant when a plurality of positioning methods are used together, there is also a problem when a single positioning method is used. That is, when the same positioning signal as before is received or when a plurality of positioning signals are received at the same time, it is difficult to determine whether those positioning signals should be used (e.g. be notified to an application) to receive a service or not.

Mobile devices may not have a function for a particular positioning method, or may have proven to erroneously detect with a particular positioning method due to their characteristics, depending on their model. There is also the problem of being difficult in selecting signals of positioning methods appropriate for each model by simply using a plurality of positioning methods in combination as a system.

In addition, every positioning method has another problem. That is, if a service to be provided according to position is based on the premise that the device has actually come to the relevant position, the move can be fabricated by duplicating a separately received positioning signal. Taking as an example a service to give points when the device is detected by some positioning to have entered a store, the fabrication would allow points to be acquired when in reality the store has not been entered.

A purpose of the invention is to realize, in a system where a service is provided according to a position to which a device moves, a mechanism by which signals to be used for receiving the service can be appropriately selected from a plurality of positioning signals received by the device.

Means for Solving the Problems

A device of one example consistent with the principle of the invention is capable of being used while moving and of receiving a service according to a position to which the device has moved, and the device comprises: positioning means for, based on positioning signals for location identification separately received from a plurality of positioning devices, determining their respective positional information; holding means for holding positional information determined by the positioning means for each type of the plurality of positioning devices; and notification means for, regarding positional information newly determined by the positioning means, determining with reference to the holding means whether to provide notification of the position in order to receive the service or not, and providing the notification according to the determination.

Advantage of the Invention

The invention allows for appropriately selecting signals to be used for receiving a service according to position from a plurality of positioning signals received by a moving device.

BRIEF DESCRIPTION OF THE DRAWINGS

FIG. 4 shows an example of data stored in a positioning result master;

FIG. 5 is a flow diagram showing an example of a procedure in a notification management unit (Process example 1);

FIG. 6 shows an example of data stored in a positioning device management master;

FIG. 9 shows an example of positioning results held in positioning history memory;

FIG. 11 shows an example of data held in activity history memory;

FIG. 14 is a flow diagram showing an example of the procedure of a function used in the timer process;

FIG. 16 is a flow diagram showing still another example of the procedure in the notification management unit (Process example 3);

FIG. 21 illustrates each example of implementing the above-described configurations and processes appropriately combined together;

FIG. 38 shows an example of a list of positioning results required for notification, the list stored in the device management master;

FIG. 39 shows an example of a list of positioning results required for acceptance, the list stored in the device management master;

FIG. 43 illustrates various positioning methods.

MODES OF EMBODYING THE INVENTION

Figure 1:
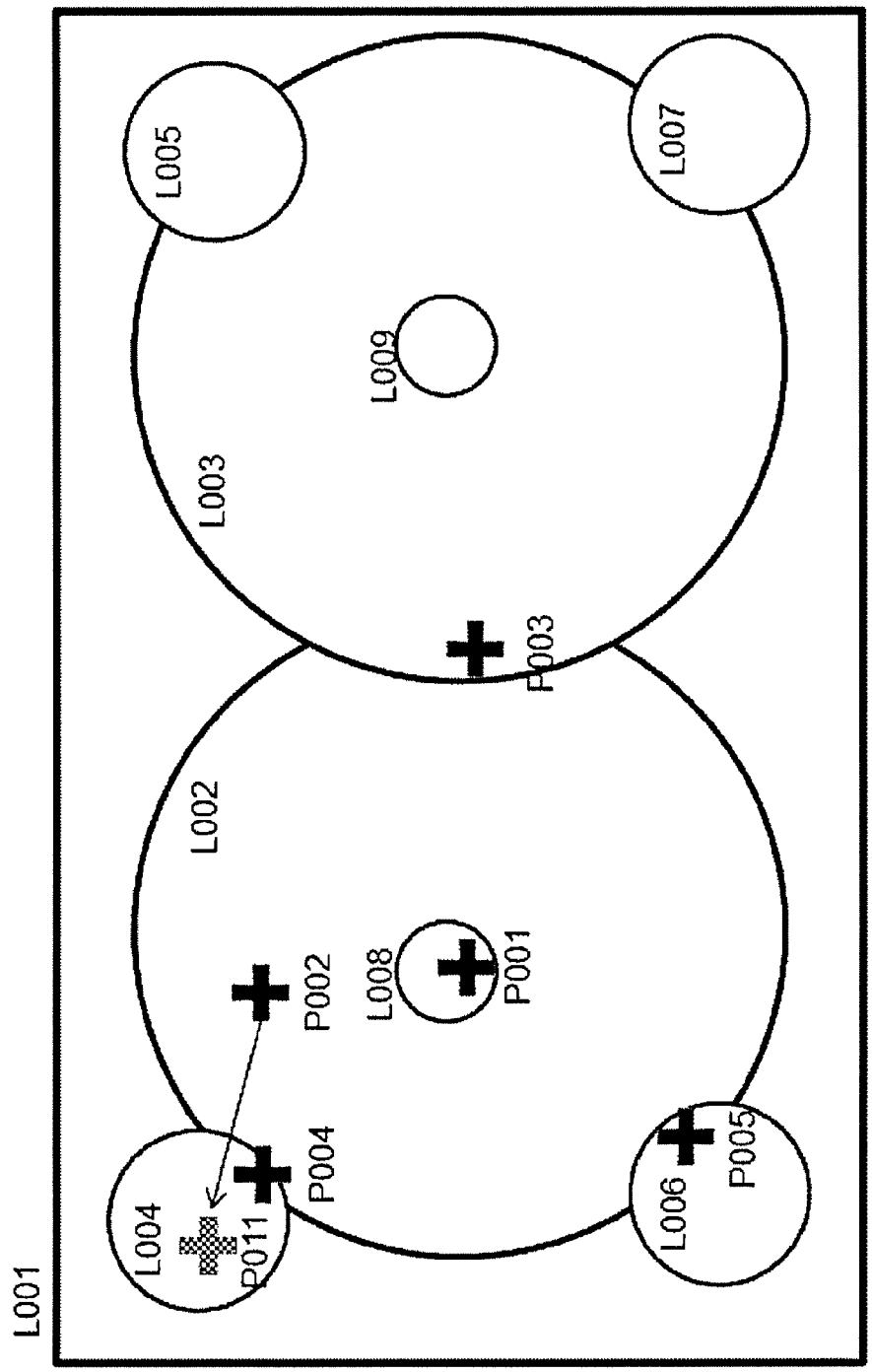
FIG. 1 illustrates how to handle the coverage of positioning devices of an embodiment of the invention.

The above-described configuration of the device of one example consistent with the principle of the invention allows for, right after each positioning signal is received, appropriately determining whether to use positional information based on the positioning signal received right now in order to receive the service or not by reference to positional information based on previously received positioning signals for each type of positioning device that transmits the positioning signal. The "device" herein described may be a portable device including a smartphone, or may be a device attached to a cart or the like that moves through a factory, hospital, store, or the like.

The device described above may further comprise an update means for, when positional information of the same type as positional information held by the holding means is newly determined by the positioning means, updating the held positional information with the newly determined positional information.

This allows, for example, positional information held for the above determination to be kept to one piece for each type, and can facilitate the implementation on small devices.

The notification means of the device described above may comprise means for determining to provide notification regarding the newly determined positional information based on the holding means not holding the same positional information as the newly determined positional information as positional information of the type to which the newly determined positional information belongs.

This allows, for example, for providing notification of the positional information for this time if only positioning signals of types different from the positioning signal received this time have been received previously, and for preventing the provision of notification of the positional information for this time if positional information for when a positioning signal of the same type as the positioning signal received this time was received last time is the same as the positional information for this time, so that repeated notification of the same positional information can be restrained, while positional information can be notified according to purpose when positioning signals of different types should be treated as different positions and be provided with a service.

In the device described above, the type may represent priority, and the notification means may comprise means for determining to provide notification regarding the newly determined positional information based on the priority of the type to which the newly determined positional information belongs being higher than or equal to a highest priority of the priorities of the types to which positional information held by the holding means belongs.

This allows, for example, for preventing notification of the positional information for this time if the type of the positioning signal received this time is lower in priority than the type of the positioning signal received the previous time, so that repeated notification of unnecessary positional information can be restrained.

In the configuration described above, the priority represented by the type may be determined based on the extent of an area where a positioning signal from a positioning device of the relevant type can be received.

This allows, for example, for restraining repeated notification of the same positional information and providing notification of positional information according to purpose when an area where a positioning signal of a low-priority type is received (accuracy of identifying positional information is low as the area is wide) includes an area where a positioning signal of a high-priority type is received (accuracy of identifying positional information is high as the area is narrow) and the two areas should be treated as the same position and be provided with a service.

In the configuration described above, the priority represented by the type may be determined according to the contents of the service.

This allows, for example, for restraining notification of unnecessary positional information and providing notification of positional information according to purpose, when the contents of a service according to one position include the contents of a service according to another position and there is no benefit of receiving the latter after receiving the former, by setting in advance high priority on the positioning signal indicating the former position and low priority on the positioning signal indicating the latter position.

The holding means of the device described above may keep holding positional information until positional information of the same type as the held positional information is newly determined by the positioning means and the held positional information is updated with the newly determined positional information.

This allows, for example, for holding positional information based on a once received positioning signal of one type after the device moves out of the area where the positioning signal is received until a positioning signal of the same type is received, and therefore positional information indicated by a positioning signal received when the device moves into the same area next time will be the same as the held positional information, so that the provision of notification can be prevented. That is, repeated notification of the same positional information can be restrained when the device moves in and out of the same area.

The holding means of the device described above may hold, along with the positional information, temporal information on a time at which the relevant positional information was determined by the positioning means, and the device may further comprise deletion means for deleting positional information held by the holding means based on the temporal information.

This allows, for example, positional information based on a positioning signal to be deleted (become not held) sometime after the device receives the positioning signal and then moves out of the area where the positioning signal is received, so that notification can also be provided when a positioning signal indicating the same positional information is received next time and when a positioning signal of a type whose priority is lower than the deleted positional information is received, and thus a service can be received according to the actual movement to the outside of the area.

In the configuration described above, the deletion means may delete positional information held by the holding means when the deletion means detects that a predetermined time or more has passed since a time at which the relevant positional information was determined by the positioning means, and the device may further comprise means for setting the predetermined time to be able to vary according to the type at least.

In addition, the holding means may update and hold the temporal information when the same positional information of the same type as held positional information is determined by the positioning means, and the deletion means may perform the deletion when it detects that a predetermined time or more has passed since the last time at which held positional information was determined by the positioning means.

The device described above may further comprise: means for determine a relative distance traveled by the device; and deletion means for deleting positional information held by the holding means based on the distance traveled since the relevant positional information was determined by the positioning means.

This, too, allows, for example, positional information based on a positioning signal to be deleted (become not held) sometime after the device receives the positioning signal and then moves out of the area where the positioning signal is received, so that notification can also be provided when a positioning signal indicating the same positional information is received next time and when a positioning signal of a type whose priority is lower than the deleted positional information is received, and a service can be received according to the actual movement to the outside of the area.

In the configuration described above, the deletion means may delete positional information held by the holding means when the deletion means detects that a predetermined distance or more has been traveled since a point in time when the relevant positional information was determined by the positioning means, and the device may further comprise means for setting the predetermined distance to be able to vary according to the type at least.

In addition, the holding means may update and hold information on a point in time at which held positional information was determined by the positioning means when the same positional information of the same type as the held positional information is determined by the positioning means, and the deletion means may perform the deletion when it detects that a predetermined distance or more has been traveled since the last point in time at which held positional information was determined by the positioning means.

In the device described above, the type may represent priority, and the notification means may comprise means for, when positional information is deleted by the deletion means, reading from the holding means positional information that belongs to the type whose priority is lower than the priority of the type to which the relevant positional information belongs, and providing notification thereof.

This allows, for example, sometime after the device receives a positioning signal and then moves out of the area where the positioning signal is received, for using held positional information of another type to provide notification with no need to receive another positioning signal, so that a service can be received immediately according to the actual movement to the outside of the area.

In the device described above, the type may represent priority, and the device may further comprise deletion means for, based on the priority of the type to which the newly determined positional information belongs being lower than a highest priority of the priorities of the types to which positional information held by the holding means belongs, deleting from the holding means positional information that belongs to the type whose priority is higher than the priority of the type to which the newly determined positional information belongs.

This allows, for example, positional information of a type that is higher in priority than the type of a positioning signal received this time to be deleted (become not held) when the type of the positioning signal received this time is lower in priority than the type of a previously received positioning signal whose positional information is held, so that notification can also be provided of positional information based on a positioning signal of a type whose priority is lower than the deleted positional information, and notification can also be provided when a positioning signal indicating the same positional information of the same type as the deleted positional information is received next time, and thus a service can be received according to actual movements about an area where a positioning signal of a high priority is received.

The device described above may further comprise: storage means for storing information that indicates, in an area where a certain positional information of a certain type is determined, positional information of another type that can be determined; and deletion means for deleting from the holding means positional information other than positional information of said another type that information stored in the storage means indicates to be able to be determined regarding the newly determined positional information.

This allows, for example, positional information based on positioning signals that cannot be received at a position indicated by a positioning signal received this time to be deleted (become not held), and therefore positional information accurately representing the position of the moment is held, so that notification can be provided and a service can be received each time when a positioning signal indicating positional information that is not held there is received, since this means that the device has actually moved to a new position.

Positional information determined by the positioning means of the device described above may be identification information of the positioning device indicated by a positioning signal received from the relevant positioning device.

The position notified by the notification means may be represented by the positional information or position coordinates determined from the positional information.

The notification means of the device described above may notify an application program in the device of the position or may notify a server device communicating with the device of the position.

The device described above may further comprise storage means for storing information that indicates the type of each positioning device, and the type to which positional information determined by the positioning means belongs may be determined with reference to the storage means.

When a positioning signal is received but no information is stored in the storage means regarding the positioning device corresponding to the positioning signal, processes on the positional information regarding the relevant positional signal may be controlled not to be performed.

If positioning devices whose information is stored in the storage means are selected according to the model of the device, signals of positioning methods appropriate for each model can be selected to be used.

If positioning devices whose information is stored in the storage means are selected according to the contents of the service, positioning signals can be selected so that notification is provided appropriately for the service to be provided.

The device described above may further comprise storage means for storing pieces of positional information of a predetermined number of types that should be determined in an area including one position, and the notification means may provide the notification when the holding means comes to hold pieces of positional information of the predetermined number of types stored in the storage means.

This allows, for example, for preventing the fabrication of a move unless all positioning signals corresponding to the predetermined number of pieces of positional information are separately received and duplicated, and therefore the fabrication can be made difficult.

The device described above may further comprise storage means for storing pieces of positional information of a predetermined number of types along with an order in which these pieces of positional information should be determined, and the notification means may provide the notification when pieces of positional information of the predetermined number of types stored in the storage means come to be determined by the positioning means in the order stored in the storage means and be held by the holding means.

This allows, for example, for preventing the reception of the service unless all positioning signals corresponding to the predetermined number of pieces of positional information are duplicated and additionally the positions are notified in the predetermined order, and therefore the fabrication can be made more difficult if the order is kept hidden. This also allows, for another example, for providing the notification for receiving the service only to devices that have moved through the predetermined places in the predetermined order.

The device described above may further comprise means for downloading information to be stored in the storage means described above from a positioning information management server.

This allows each device to be easily configured according to the model, service to be received, move to be notified, or the like.

In the device described above, at least part of processes of the holding means and the notification means may be performed by making a request to a positional information provision server for processing.

For example, when the device that moves through a factory, hospital, store, or other environment is used to receive a service dedicated to the environment, a dedicated server in the environment may perform the processes described above except for receiving positioning signals, and the dedicated server may also perform the process of providing the service.

A server device of one example consistent with the principle of the invention communicates with a device capable of being used while moving and of receiving from a service provision means a service according to a position to which the device has moved, the device comprising positioning means for, based on positioning signals for location identification separately received from a plurality of positioning devices, determining their respective positional information, the server device comprising: holding means for receiving positional information determined by the positioning means from the device and holding the positional information for each type of the plurality of positioning devices; and notification means for receiving positional information newly determined by the positioning means from the device, determining with reference to the holding means whether to notify the service provision means of the position or not, and operating to provide the notification according to the determination.

The principle of the invention of the device described above may also be realized by: a server device; a system comprising the device, the server device, and in some cases a plurality of positioning devices; a method practiced in the whole system; a method practiced in each element of a system; and also a program installed on a general-purpose computer to realize the device and/or server device described above (or a recording medium on which such program is recorded).

For example, a method of one example consistent with the principle of the invention is of, for the sake of a device capable of being used while moving and of receiving a service according to a position to which the device has moved, providing notification of the position, the device comprising positioning means for, based on positioning signals for location identification separately received from a plurality of positioning devices, determining their respective positional information, the method comprising: holding positional information determined by the positioning means in memory for each type of the plurality of positioning devices; and determining with reference to the memory whether to provide the notification in order to receive the service or not regarding positional information newly determined by the positioning means.

A program of one example consistent with the principle of the invention is a program, for the sake of a device capable of being used while moving and of receiving a service according to a position to which the device has moved, at least part of which is installed on the device to provide notification of the position, the device comprising positioning means for, based on positioning signals for location identification separately received from a plurality of positioning devices, determining their respective positional information, the program comprising: program code for holding positional information determined by the positioning means in memory for each type of the plurality of positioning devices; and program code for determining with reference to the memory whether to provide the notification in order to receive the service or not regarding positional information newly determined by the positioning means.

For example, when a service is generally received with a smartphone or other portable devices, all or part of this program may be downloaded from the positioning information management server.

The program described above may be provided as a library to the device and may provide the notification to an application installed on the device.

This allows for eliminating the need for application developers to create and integrate a specific positioning mechanism, and allows for eliminating the need to change various application programs in order to use a signal from a new positioning device since it is only required to change the library for that.

Now, a positional information acquisition scheme of an embodiment of the invention will be described, by way of example, with reference to the drawings.

In the embodiment, many positioning devices are used for a moving portable device to acquire positional information indicating its own current position. Positioning devices are devices for transmitting signals for location identification. For example, a Wi-Fi access point is a positioning device for Wi-Fi positioning means, and a sound wave signal transmitter is a positioning device for sound wave signal (or ultrasonic signal) positioning means.

Positioning devices have their own identification information, namely, positioning device Ds, which are included in signals transmitted by positioning devices of Wi-Fi, iBeacon, sound wave, RFID (or NFC), or other types. Positions (coordinate information) of each positioning device is registered, for example, to a positioning information management server, and the portable device can determine its position based on a positioning device ID obtained from a signal received from a positioning device. In addition to a positioning device ID, information on accuracy (the intensity of a received radio wave, sound pressure, accuracy information, etc.) may be obtained from a signal received from a positioning device.

Not a positioning device ID but position (coordinate information) is obtained from a signal transmitted by a positioning device of GNSS (GPS), QZSS (Michibiki), PDR, or other types. Also in the Wi-Fi type, for example, not a positioning device ID but position (coordinate information) is obtained if the portable device has as positioning means a mechanism for estimating the position of the portable device from a plurality of positions determined based on a plurality of positioning device IDs received at the same time.

An area where a signal of a positioning device can be received is called coverage. This area can vary with each measurement. It can also differ depending on measurement means of the portable device.

The embodiment can be used for an application in which the coverage of a positioning device in real space is treated like a GUI widget on a computer display. In such case, positioning devices are arranged in such a way that GUI widgets are arranged, and the acquisition of a positioning device ID (also called a location ID) by the portable device within an area covered by a signal of a positioning device causes the provision of a service corresponding to the location ID similarly to the way that the acquisition of an input event of a pointing device within an area where a GUI widget exists causes the execution of a function corresponding to the GUI widget.

The embodiment can be used not only for an application in which a service corresponding to a location ID is provided but for an application in which a service using coordinate information is provided. Coordinate information obtained by the GNSS method etc. out of information obtained by various positioning means may be converted to a location ID in the former case, and a location ID obtained by the sound wave signal method etc. out of information obtained by various positioning means may be converted to coordinate information in the latter case.

Matters to be addressed in the case where coverages of positioning devices are treated like GUI widgets will be described by use of an example shown in FIG. 1.

First, when coverages overlap one another, a portable device that has moved into the overlapping area obtains a plurality of positioning results. In FIG. 1, for example, the portable device located at P001 is within an area where coverages L002 and L008 overlap each other, and therefore receives both positioning results (RL002 and RL008). In such case, it may be preferable to select one of a plurality of location IDs received and pass it to an application that provides a service, and the portable device of the embodiment can determine which location ID should be passed. Positioning devices for L002 and L008 may be for positioning means of the same type or of different types.

If the portable device, for example, stays at P002 within the coverage L002, it will receive the positioning result RL002 again and again. If compared to a GUI, this means that an input event to a widget repeatedly occurs, but it may be preferable that an event is inputted only once to an application that provides a service. The portable device of the embodiment can limit the number of times to pass a location ID to an application to one when staying within the same area.

In addition, whether the portable device is in an area where coverages overlap one another or not will not be determined until all positioning results are received, and therefore it takes time to get to know that the portable device is located there since it has to wait until all positioning results that reach there are received. Besides, positioning results come separately in no particular order for each positioning device and therefore, in the example in FIG. 1, which of P001 to P005 the portable device is at cannot be determined when it receives RL002. The portable device of the embodiment can accumulate received positioning results and determine the current position from the combination of accumulated positioning results.

The portable device stays and moves and therefore, when it receives RL004 after receiving RL002, it is difficult to distinguish whether the portable device has moved from P002 to P011 or is at P004 within an overlapping area between L002 and L004. The portable device of the embodiment can delete unnecessary accumulated positioning results as appropriate, and therefore can determine whether it has moved or stays in the same area.

(Configuration Example 1)

Figure 2:
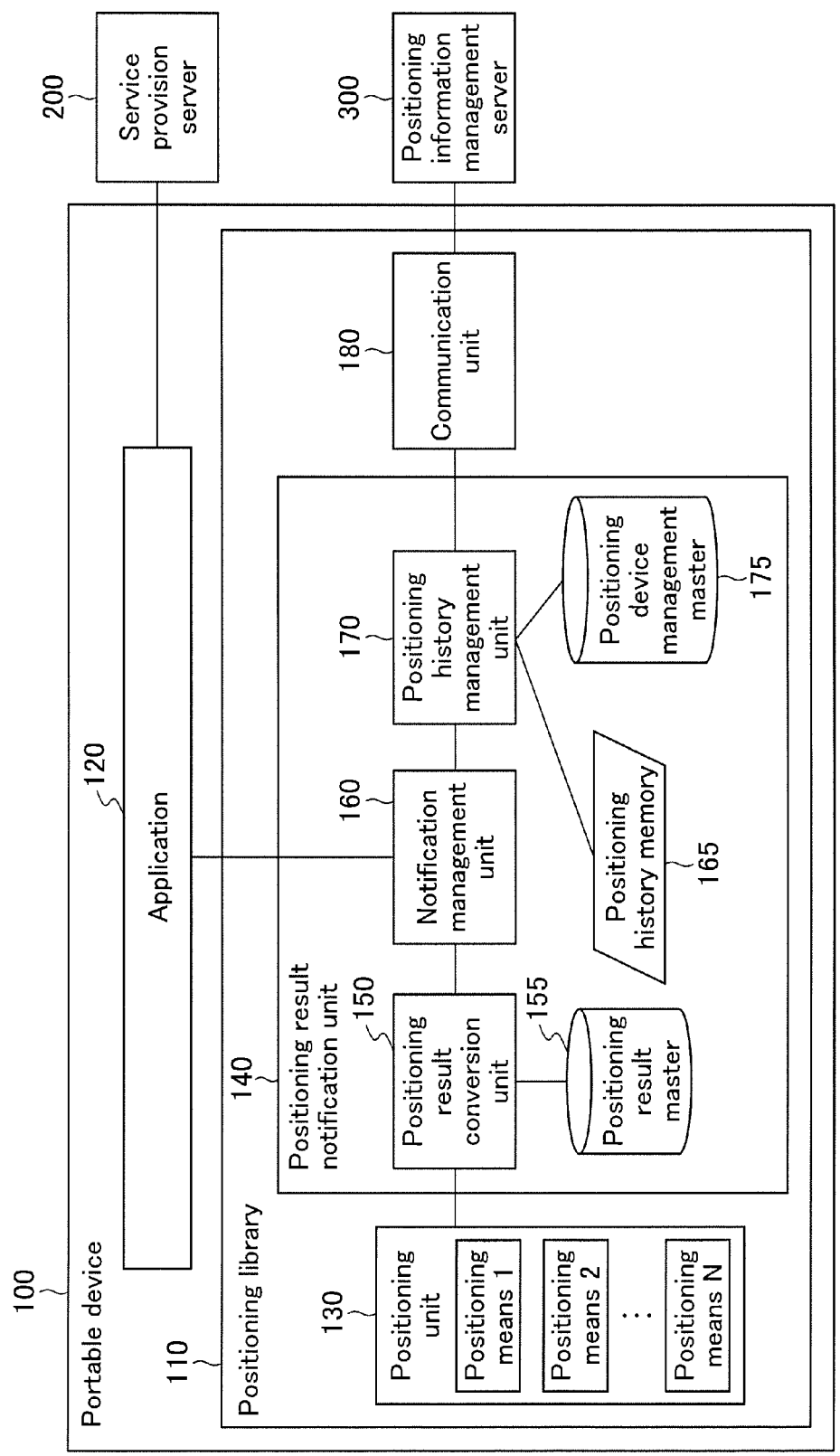
FIG. 2 is a block diagram showing an example of the configuration of a portable device of the embodiment and servers that can be used by the portable device.

FIG. 2 shows an example of the configuration of a portable device of the embodiment and servers that can be used by the portable device. Software constituting the portable device 100 comprises an application 120 and a positioning library 110. The application 120 has a function, for example, to download information from a service provision server 200 and notify a user of it, based on a positioning result (e.g. location ID) notified from the positioning library 110. The service may be provided not by the service provision server 200 but by the application 120.

The positioning library 110 comprises a positioning unit 130, a positioning result notification unit 140, and a communication unit 180. The positioning unit 130 comprises a plurality of positioning means 1 to N. In the present example, positioning means is provided for each positioning method (the type of a signal received from a positioning device and mode of processing the signal). The type of each positioning device (corresponding to "level" described later) can be defined independent of the type of the positioning method. That is, two positioning devices can use the same positioning method and be of different types or, according to applications, may be set to be of the same type even when using different positioning methods.

The positioning result notification unit 140 receives a positioning result from the positioning unit 130, determines whether it is required to notify the application of the positioning result or not, and notifies the application 120 of the positioning result if required. The positioning result to be notified is a location ID in the present example, but may be coordinate information as described above.

The positioning library 110 may download data in a positioning device management master 175 described below from a positioning information management server 300 via the communication unit 180 at the start of the application. In addition, it may also download data in a positioning result master 155 described below as well. As an alternative, data in these masters may be held by the library 110 itself in advance, or may be held by the application 120 in advance and be read therefrom by the library 110.

A positioning result conversion unit 150 converts positioning results received from the positioning unit 130. Positioning results may differ in the contents depending on the positioning means. A positioning result of GNSS, QZSS, or FOR contains coordinate information of the portable device and information indicating the positioning method, while a positioning result of Wi-Fi, iBeacon, a sound wave signal, or RFID contains a location ID and information indicating the positioning method. The present example does not use coordinate information but a location ID in the process of determining whether it is required to notify of a positioning result or not, and therefore converts coordinate information in a positioning result of GNSS, QZSS, or FOR to a location ID using the positioning result conversion unit 150. Data in the positioning result master 155 is used for the conversion.

A notification management unit 160 performs a process to receive start and end requests from the application to start and end the positioning, and a process to selectively notify the application 120 of a positioning result.

A positioning history management unit 170, in cooperation with the notification management unit 160, determines whether it is required to notify the application of a received positioning result or not, and updates and deletes a positioning history as required. Whether the notification is required or not is determined with reference to positioning history memory 165 and the positioning device management master 175. The positioning history management unit 170 also exercises the management of the storage and deletion of positioning results over the positioning history memory 165 according to a criterion for a desired determination.

(Positioning Result Master)

FIG. 4 shows an example of data in the positioning result master 155. The positioning result master 155 manages information representing location IDs, locations, and positioning means as being related to one another. In this example, a location is a polygon represented by a set of the coordinates of points, and coordinate values of sets of apexes of polygons are stored in the positioning result master 155. Whether given coordinates correspond to a location or not is determined based on a result of a determination made on whether the coordinates are in the polygon of the location or not.

The accuracy of coordinates obtained from positioning means differs for each positioning method. GNSS has a margin of error of more than 10 meters, while PDR has a margin of error of only a few meters. It is therefore preferable to use PDR to divide a location determined by GNSS coordinates into finer locations to be able to be used differently.

(Positioning Result Conversion Process)

Figure 3:
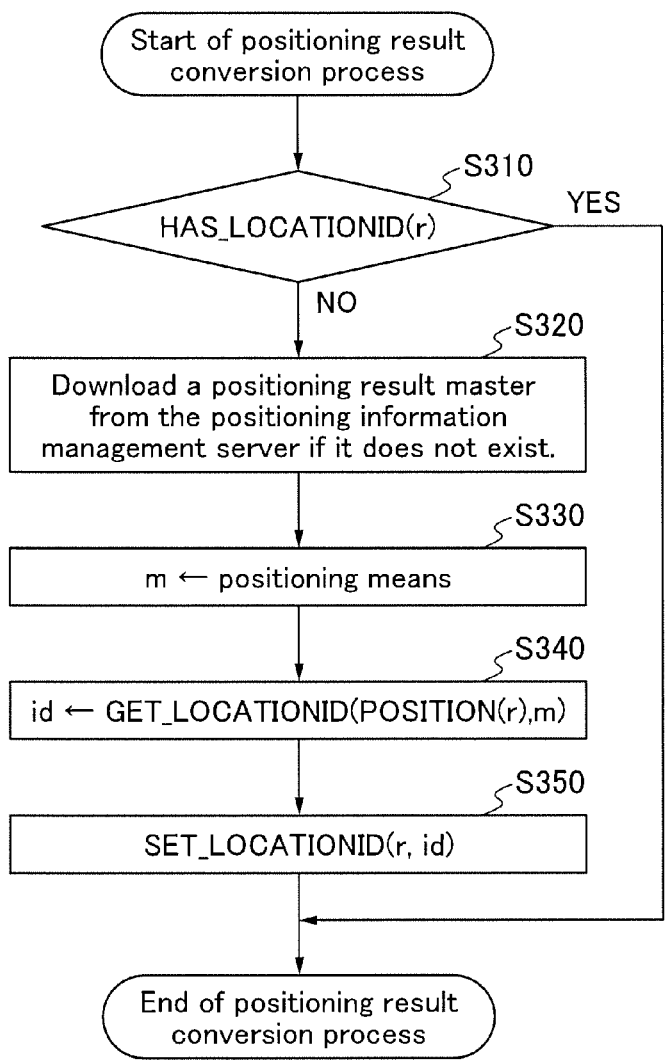
FIG. 3 is a flow diagram showing an example of a procedure in a positioning result conversion unit.

FIG. 3 shows a process flow of the positioning result conversion unit 150. The present example does not use coordinate information but a location ID to determine whether it is required to notify of a positioning result or not, and therefore converts coordinate information in a positioning result to a location ID when the positioning result does not contain a location ID. Specifically, whether there is a location ID in a positioning result or not is checked in step S310, and the process is ended if there is a location ID. If there is no location ID, whether there is a positioning result master 155 or not is checked in the next step S320, and it is downloaded from the positioning information management server 300 if there is no positioning result master 155. A value representing the positioning means is substituted into a variable m in step S330. Whether the coordinates in the positioning result are in a location contained in the positioning result master 155 or not is determined, and a location ID whose polygon contains the coordinates and whose positioning means is m is substituted into a variable id in step S340. The location ID of the variable id is set as the location ID of the positioning result in the last step S350.

(Process Example 1)

FIG. 5 shows an example of a process flow of the notification management unit 160 (hereinafter called "Process example 1"). The notification management unit 160 starts and ends the library 110 upon request to start and end it from the application 120. Specifically, the notification management unit 160 upon receiving a start request from the application checks whether there is an end request from the application or not in step S510, and ends the process if there is an end request. If there is no end request, it checks in step S520 whether it can receive a positioning result from the positioning result conversion unit 150 or not (whether a positioning result has been newly received by any positioning means in the positioning unit 130 and a location ID has been obtained or not). If it cannot receive a positioning result, the process returns to step S510 after waiting a predetermined period of time.

If the notification management unit 160 can receive a positioning result, it receives the positioning result from the positioning result conversion unit 150 in step S540. The notification management unit 160 then checks in step S550 whether the location ID of the received positioning result is included in data in the positioning device management master 175 or not. If the positioning device management master 175 does not contain the location ID, the positioning result is discarded without being processed.

By using the positioning device management master 175 in this way, location IDs to be processed by the library 110 can be limited to those received from part of multiple positioning devices that actually are installed and transmit signals. For example, the availability of positioning results can be changed for each application by limiting the contents of data to be stored as the positioning device management master 175 to part of multiple positioning devices arranged, and using different part to be stored for each application. In step S560, a positioning history update function is executed with the positioning result being as a parameter. As operation examples shown in FIG. 7 or 8, this function writes the positioning result received in step S540 to the positioning history memory 165, as well as determines whether it is required to notify the application 120 of the positioning result or not and notifies of the positioning result if required.

(Positioning Device Management Master)

FIG. 6 shows an example of data in the positioning device management master 175. The positioning device management master 175 in the present example can manage six items of data for each location ID. "Latitude" and "longitude" represent the position of a positioning device.

"Level (type or priority)" represents the type of a positioning device or the priority of a positioning result. In an application in which the "level" represents the type of a positioning device, the "level" is just used to distinguish whether each positioning result belongs to the same type or to a different type. In an application in which the "level"

represents the priority of a positioning result, on the other hand, the "level" is used, according to its height, to determine which of a plurality of positioning results received in an overlapping area between coverages is to be notified, to determine whether it is required to notify of a positioning result received (or held as a history) or not, or to determine whether it is required to delete a positioning result held as a history or not.

"Valid period" is a period of time for holding a received positioning result in the positioning history memory 165 as valid, and a positioning result is deleted from the positioning history memory 165 when the time elapsed since the positioning result is stored in the positioning history memory exceeds the "valid period." "Valid distance" is a distance allowed to travel while holding a received positioning result in the positioning history memory 165 as valid, and a positioning result is deleted from the positioning history memory 165 when distance traveled since the positioning result is stored in the positioning history memory exceeds the "valid distance."

"List of acquirable positioning result location IDs" is a list of location IDs that can be received somewhere in the area where the relevant location ID can be received. This list is used to find out if, when a positioning result is received, the received location ID can be acquired where the last positioning result was obtained (the last positioning result is still valid) or not (the last positioning result becomes invalid because of travel).

(Update Example 1)

Figure 7:
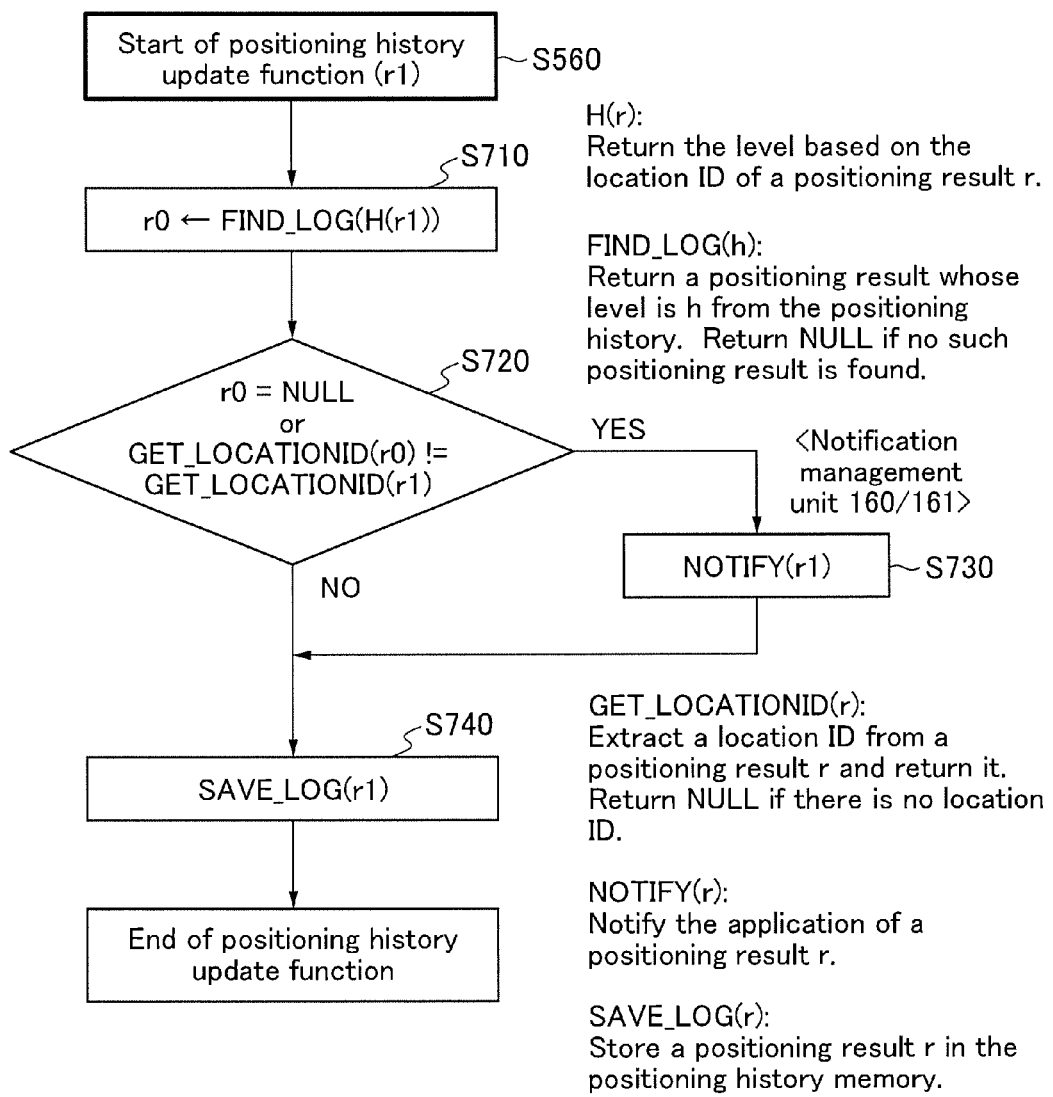
FIG. 7 is a flow diagram showing an example of a procedure in a positioning history update function (Update example 1)

FIG. 7 shows an example of a process flow of the positioning history update function S560 (hereinafter called "Update example 1"). In this example, a received positioning result is notified if it is not held in the positioning history memory 165. Specifically, first in step S710, the level (type or priority) of a location ID of a received positioning result r1 is acquired from the positioning device management master 175. A positioning result having the same level is then extracted from the positioning history memory 165 and is substituted into a variable r0. If the positioning history memory 165 does not hold a positioning result of the same level, NULL is substituted into the variable r0.

Whether it is required to notify of r1 or not is determined according to the values of the positioning results r0 and r1 in step S720. In Update example 1, r1 is notified in step S730 when r0 is NULL and when the location IDs of r0 and r1 are not the same. This mechanism allows for avoiding repeated notification of the same positioning result to the application 120 when the same positioning results are received in succession. The positioning history memory 165 holds positioning results for each level (type or priority), so that repeated notification can be avoided for each group of positioning results of the same level.

The received positioning result r1 is stored in the positioning history memory 165 along with the time of positioning in step S740. The positioning history memory 165 can be made to hold one positioning result at most for each level by overwriting r0 with r1.

(Update Example 2)

Figure 8:
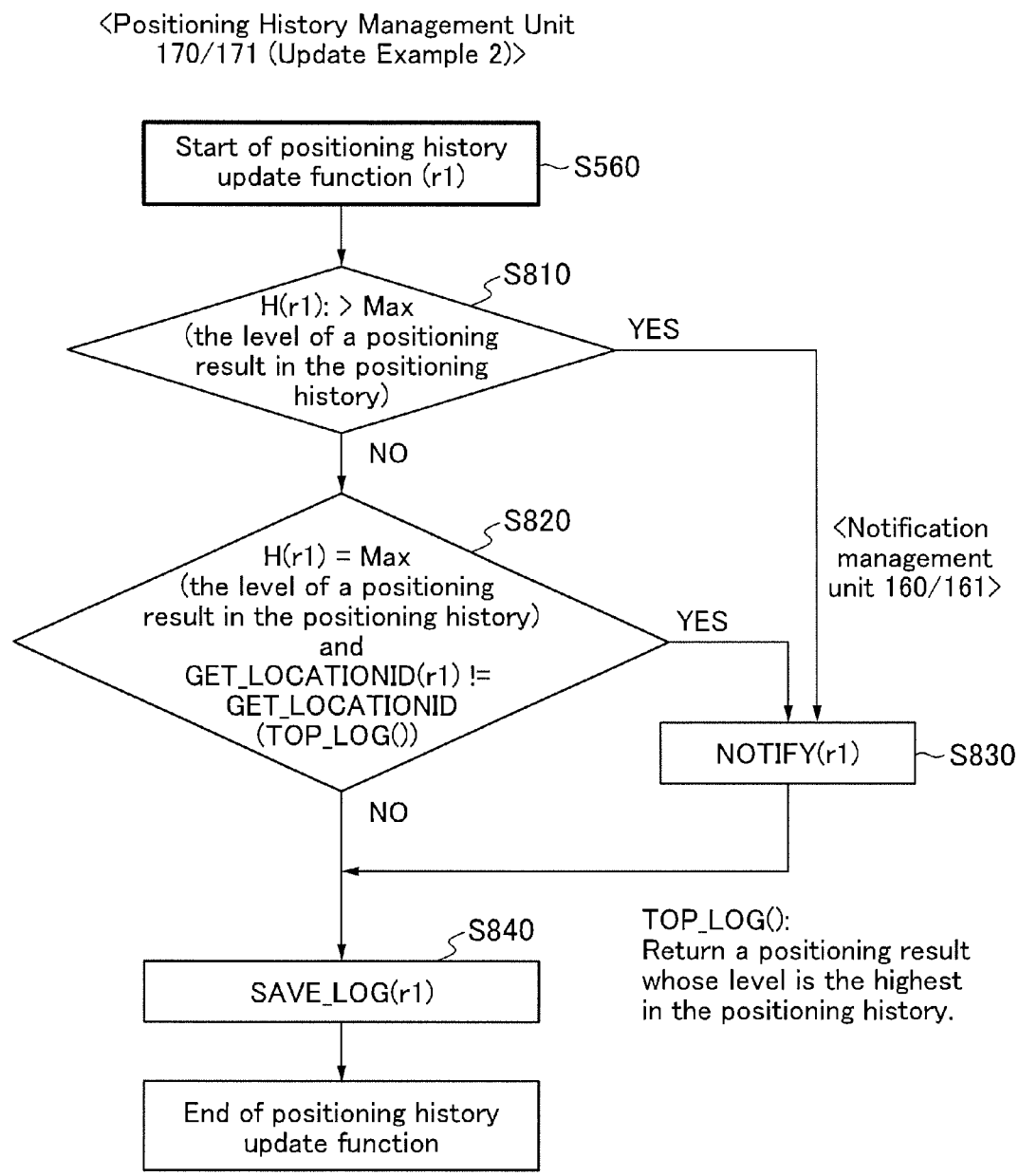
FIG. 8 is a flow diagram showing another example of the procedure in the positioning history update function (Update example 2)

FIG. 8 shows another example of the process flow of the positioning history update function S560 (hereinafter called "Update example 2"). In this example, a received positioning result is notified if it is not held in the positioning history memory 165 and its level is higher than or equal to the highest level of positioning results in the history. Specifically, first in step S810, the level (type or priority) of a location ID of a received positioning result r1 is acquired from the positioning device management master 175. The level is then compared with the highest level of location IDs of positioning results held in the positioning history memory 165 (let rm be the positioning result with the location ID of the highest level) and, if r1 is higher in level, r1 is notified in step S830. If the level of r1 is lower than or equal to the highest level of location IDs of positioning results held in the positioning history memory 165, the process of step S820 is executed.

If the level of the location ID of the received positioning result r1 is equal to the level of the location ID of rm and the location IDs of r1 and rm are not the same in step S820, the application 120 is notified of r1 in step S830.

The positioning result r1 is stored in the positioning history memory 165 along with the time of positioning in step S840. The positioning history memory 165 can be made to hold one positioning result at most for each level by overwriting r0 with r1.

(Positioning History Memory)

FIG. 9 shows an example of positioning results held in the positioning history memory 165. This example shows in a time series how they are deleted after a certain period of time has passed since their positioning as in Process example 2 described below. The five tables are the contents of the positioning history memory 165 after positioning is done at each point of positioning (position to which the portable device moves). The diagram in the lower right represents the arrangement of coverages (circle) and points of positioning (+) of positioning devices, where three positioning devices L002, L003, and L008 are used, the location IDs of positioning results received from the positioning devices are RL002, RL003, and RL008, respectively, and their levels are 2, 3, and 5, respectively. For convenience of description, suppose that positioning is done at intervals of one second starting with P001 and then in the order of P002, P003, P004, and P005.

First, when the positioning result RL008 is received at the point of positioning P001, the positioning result RL008 is stored in the positioning history memory 165 as: level 5; valid period 1.10 seconds; valid distance 3.0 m; and time of positioning 10:00:00. "Level," "valid period," and "valid distance" are acquired with reference to the positioning device management master 175 in FIG. 6. Then, when the positioning result RL002 is received at the point of positioning P002, the positioning result RL002 is stored in the positioning history memory as: level 2; valid period 1.10 seconds; valid distance 3.0 m; and time of positioning 10:00:01.

After that, the positioning result RL008 is deleted from the positioning history memory 165 on its way to the point of positioning P003 as its holding time exceeds its valid period. The positioning result RL002 received at the next point of positioning P003 is stored as: level 2; valid period 1.10 seconds; valid distance 10.0 m; and time of positioning 10:00:02, and the positioning result RL003 received at the point of positioning P004 is stored as: level 5; valid period 1.10 seconds; valid distance 3.0 m; and time of positioning 10:00:03.

The positioning result RL002 is deleted from the positioning history memory on its way to the point of positioning P005 as its holding time exceeds its valid period. The positioning result RL003 received at the point of positioning P005 is then stored as: level 3; valid period 1.10 seconds; valid distance 3.0 m; and time of positioning 10:00:04. In this way, the deletion of a positioning result after the elapse of a certain period of time is done independent of positioning. Likewise, the deletion of a positioning result from the positioning history memory after a travel of a certain distance from its point of positioning is also done independent of positioning.

(Configuration Example 2)

Figure 10:
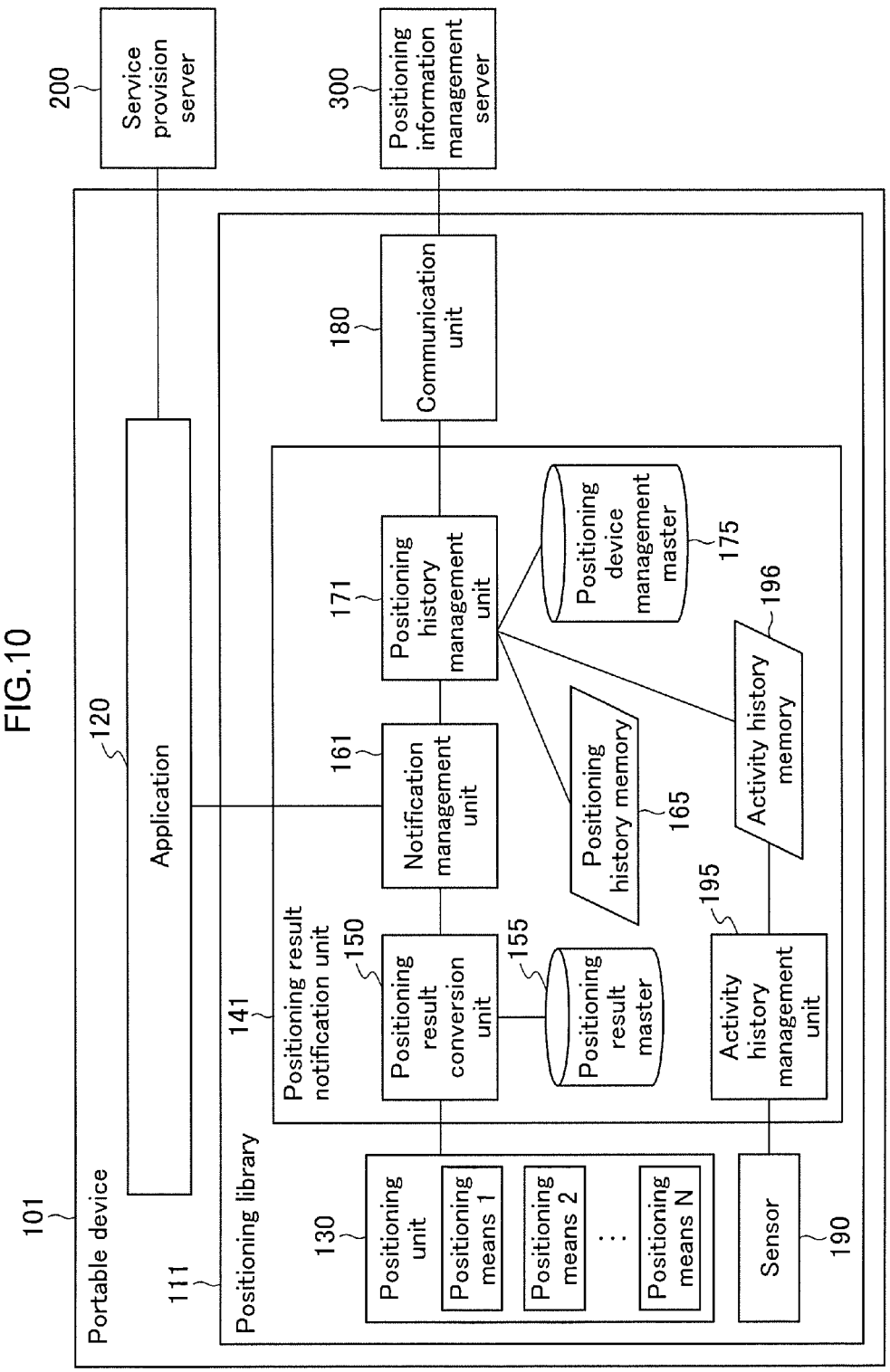
FIG. 10 is a block diagram showing another example of the configuration of the portable device of the embodiment.

FIG. 10 shows another example of the configuration of the portable device of the embodiment. This example is the configuration of a portable device having a function to derive velocity from an observation value obtained from a sensor of the portable device and record it along with time, and a function to manage positioning history using the record of velocity.

Software constituting the portable device 101 comprises an application 120 and a positioning library 111. The application 120 has a function, for example, to download information from a service provision server 200 and notify a user of it, based on a positioning result (e.g. location ID) notified from the positioning library 111.

The positioning library 111 comprises a positioning unit 130, a positioning result notification unit 141, and a communication unit 180. The positioning result notification unit 141 receives a positioning result from the positioning unit 130, determines whether it is required to notify the application of the positioning result or not, and notifies the application 120 of the positioning result if required. The positioning result to be notified is a location ID in the present example, but may be coordinate information as previously described.

The positioning library 111 may download data in a positioning device management master 175 described below from a positioning information management server 300 via the communication unit 180 at the start of the application. In addition, it may also download data in a positioning result master 155 described below as well. As an alternative, data in these masters may be held by the library 111 itself in advance, or may be held by the application 120 in advance and be read therefrom by the library 111.

A positioning result conversion unit 150, as previously described, converts positioning results received from the positioning unit 130.

A positioning history management unit 171, in cooperation with a notification management unit 161, determines whether it is required to notify the application of a received positioning result or not, and updates and deletes a positioning history as required. Whether the notification is required or not is determined with reference to activity history memory 196 as well as positioning history memory 165 and the positioning device management master 175. The positioning history management unit 171 also exercises the management of the storage and deletion of positioning results over the positioning history memory 165 according to a criterion for a desired determination.

An activity history management unit 195 acquires a measurement value related to the moving velocity of the portable device from a sensor 190 to execute the management of storing the moving velocity in the activity history memory 196 along with the measurement time. FIG. 11 shows an example of data in the activity history memory 196. In this example, the velocity is managed as a velocity vector. The velocity vector is a representation of the velocity in a coordinate system with latitude, longitude, and altitude directions. An acceleration obtained from an acceleration sensor of the portable device is converted for the above-described coordinate system based on attitude information of the portable device and is integrated to obtain a value, which is used as the velocity vector. The velocity vector is used because, as described below with reference to FIG. 14, the distance between two points is preferable to the total distance as the distance traveled by the portable device.

(Process Example 2)

Figure 12:
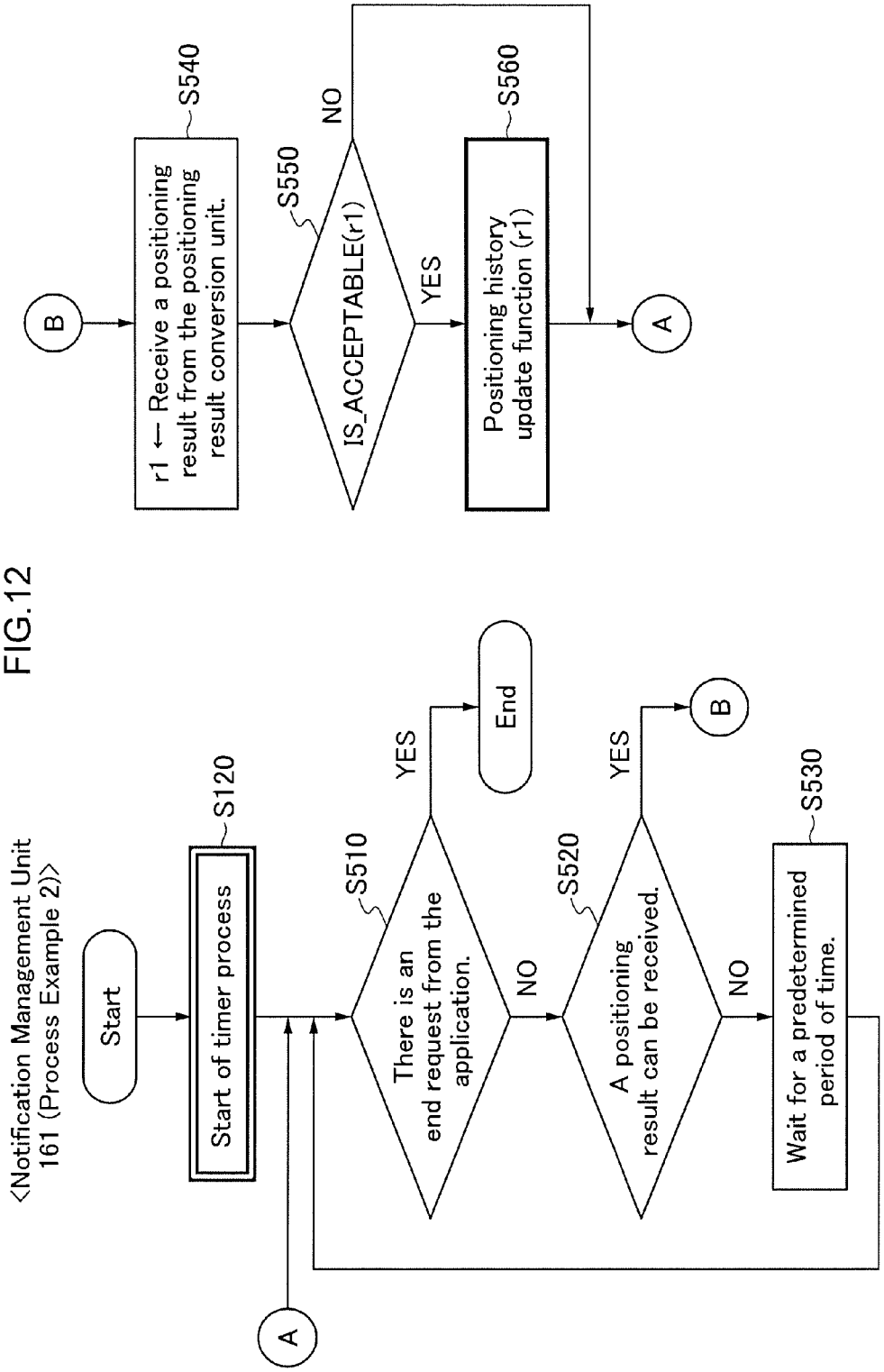
FIG. 12 is a flow diagram showing another example of the procedure in the notification management unit (Process example 2)

FIG. 12 shows another example of the process flow of the notification management unit 161 (hereinafter called "Process example 2"). In this example, a timer process is started to delete a positioning result from the positioning history memory after a certain period of time has passed or a certain distance has been traveled.

The notification management unit 161 starts and ends the library 111 upon request to start and end it from the application 120. Specifically, the notification management unit 161 upon receiving a start request from the application starts a timer process in step S120. As shown in operation examples in FIG. 13 or 15, the timer process involves deleting a positioning result held in the positioning history memory based on time elapsed or distance travelled since the time of positioning or, after the deletion, notifying of a positioning result held in the positioning history memory based on the level of location ID.

The notification management unit 161 then checks whether there is an end request from the application or not in step S510, and ends the process if there is an end request. If there is no end request, it checks in step S520 whether it can receive a positioning result from the positioning result conversion unit 150 or not (whether a positioning result has been newly received by any positioning means in the positioning unit 130 and a location ID has been obtained or not). If it cannot receive a positioning result, the process returns to step S510 after waiting a predetermined period of time.

If the notification management unit 161 can receive a positioning result, it receives the positioning result from the positioning result conversion unit 150 in step S540. The notification management unit 161 then checks in step S550 whether the location ID of the received positioning result is included in data in the positioning device management master 175 or not. If the positioning device management master 175 does not contain the location ID, the positioning result is discarded without being processed.

In step S560, a positioning history update function is executed with the positioning result being as a parameter. As operation examples shown in FIG. 7 or 8, this function writes the positioning result received in step S540 to the positioning history memory 165, as well as determines whether it is required to notify the application 120 of the positioning result or not and notifies of the positioning result if required.

Figure 13:
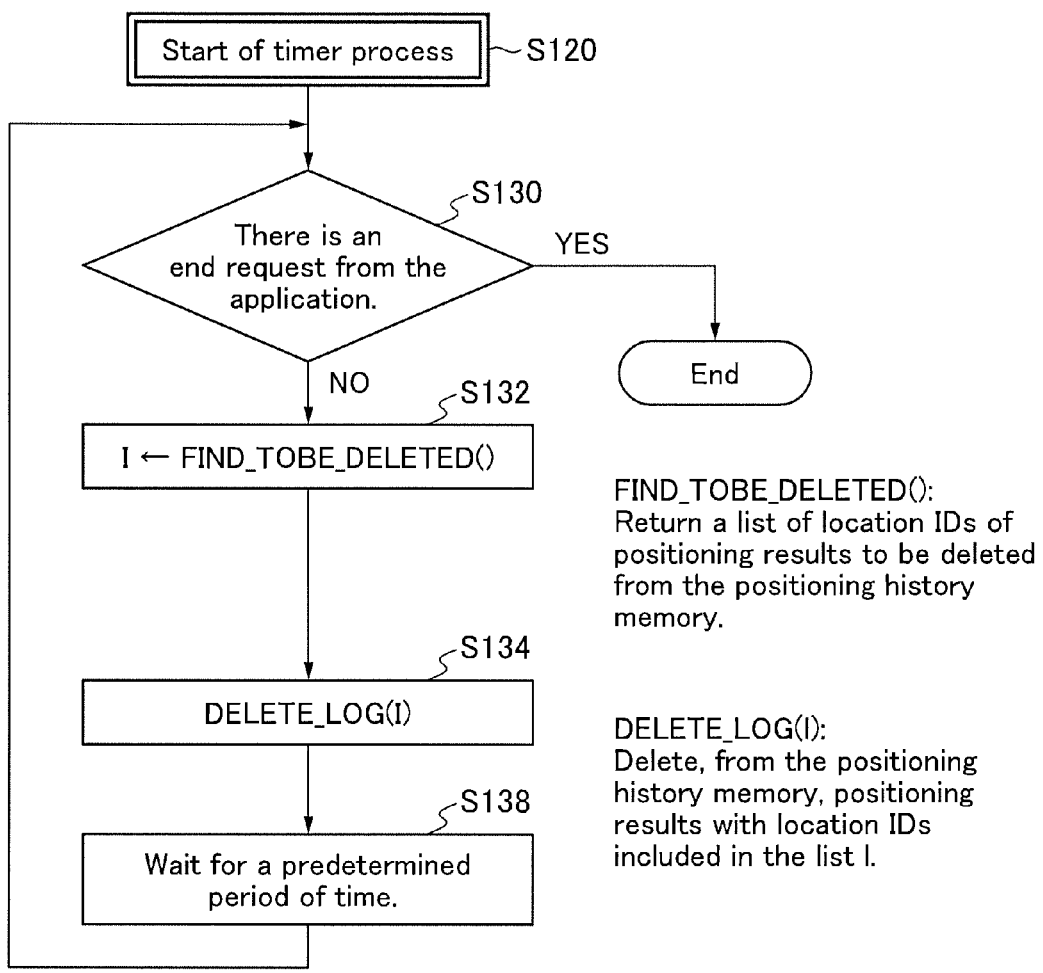
FIG. 13 is a flow diagram showing an example of a procedure of a timer process.

FIG. 13 shows, as an example of the process flow of the timer process start S120 in FIG. 12, an example in which the positioning history management unit 171 is made to make the deletion using a timer. The notification management unit 161 checks whether there is an end request from the application or not in step S130. If there is an end request, it ends the timer process. If there is no end request from the application, it executes a process FIND_TO_BE_DELETED( ) to acquire a list of positioning results to be deleted from the positioning history memory and substitutes it into a variable I in step S132. The list of positioning results to be deleted is made based on a determination method described below. The notification management unit 161 then deletes positioning results on the list I from the positioning history memory in step S134. At the end, the process returns to step S130 after waiting a predetermined period of time.

Figure 15:
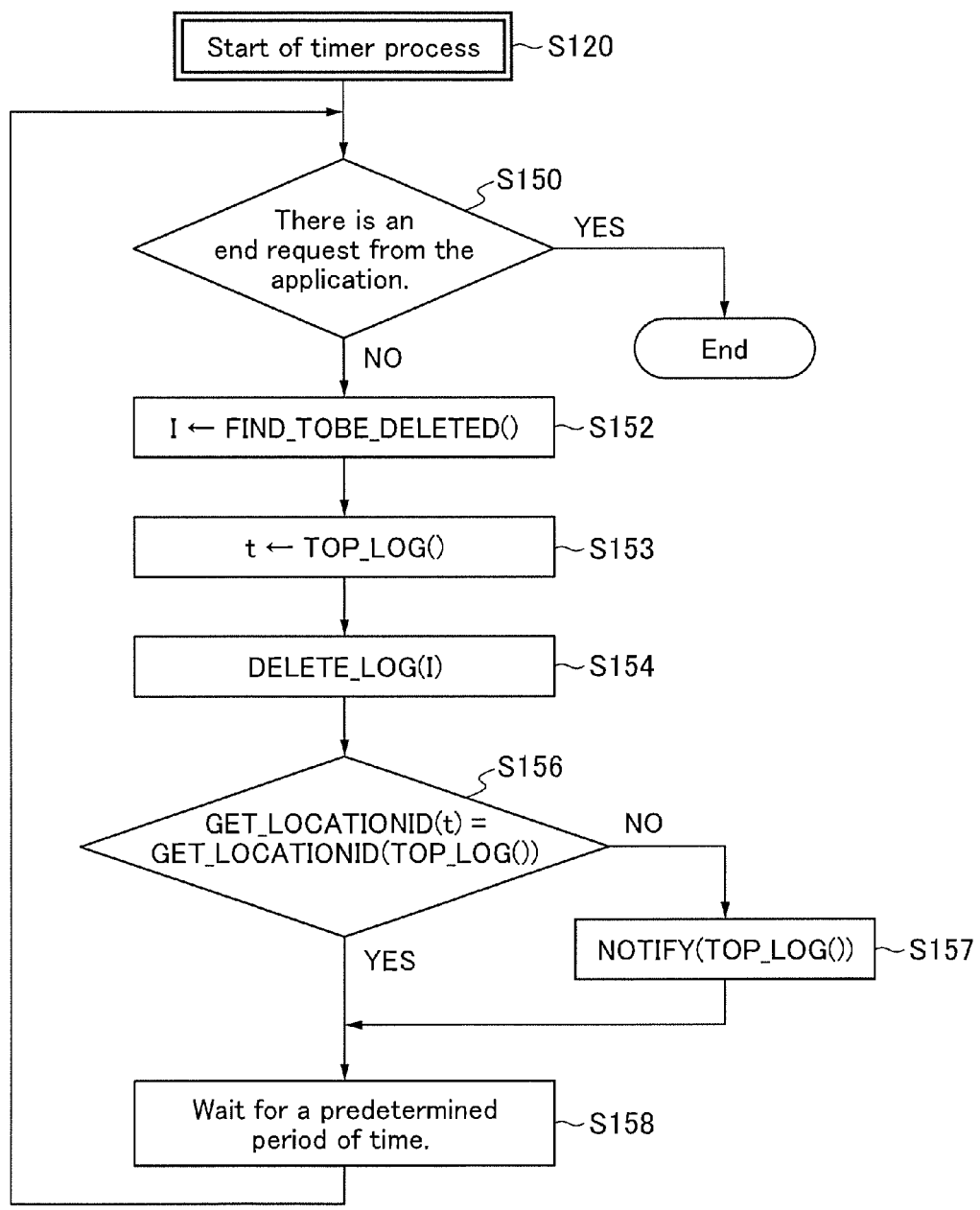
FIG. 15 is a flow diagram showing another example of the procedure of the timer process.

FIG. 14 shows flows of the process to determine, in the process FIND_ TO_ BE_DELETED( ) in S132 in FIG. 13 or in S152 in FIG. 15 which returns a list of positioning results to be deleted from the positioning history memory, that positioning results are to be deleted. The left side of FIG. 14 is the determination process flow for a case where a history is deleted after a certain period of time has passed, and the right side is the determination process flow for a case where a history is deleted after a certain distance has been traveled. One of the two methods described above is used in the present embodiment according to the intended use.

In the case where a history is deleted after a certain period of time has passed, the time of positioning TS and valid period TM for a positioning result ri held in the positioning history are acquired and, if the difference between the current time and TS is greater than or equal to TM, the positioning result ri is to be deleted.

In the case where a history is deleted after a certain distance has been traveled, the time of positioning TS and valid distance DM for a positioning result ri held in the positioning history are acquired first. Then, the activity history memory is referenced to estimate the current position (coordinates) D with reference to the time TS being the origin and, if the difference between the origin and the position D ($\|D\|$) is greater than or equal to DM, it is determined that the positioning result ri is to be deleted. The travel distance in this flow is the point-to-point distance between the position at the time of positioning and the current position, and it is preferable not to use the total distance obtained in such a way as to measure the travel distance of a car.

There may be various methods of estimating D from the contents of the activity history memory 196, and one example of those is shown by an equation below the flow on the right side of FIG. 14. T is the current time, Ti is the time of the ith item in the activity history memory, and Vi is the velocity vector of the ith item in the activity history memory. The lower-case a is the greatest i under the condition T >Ti. The lower-case b is the greatest i under the condition Ti<TS. The first term of the equation is for estimating the movement vector for the movement from the time Ta to the current time with the current velocity vector being considered as Va. The third term of the equation is for estimating the movement vector for the movement from the time TS to the time T(b−1) with the velocity vector at the time of positioning being considered as Vb. The second term of the equation is the sum of the movement vectors for the movement from the time T(b−1) to the time Ta.

FIG. 15 shows, as another example of the process flow of the timer process start S120 in FIG. 12, an example in which the provision of notification is triggered by the positioning history management unit 171 being made to make the deletion. The notification management unit 161 checks whether there is an end request from the application or not in step S150. If there is an end request, it ends the timer process. If there is no end request from the application, it acquires a list of positioning results to be deleted from the positioning history memory and substitutes it into a variable I in step S152. The list of positioning results to be deleted is made based on the determination method described above. The notification management unit 161 then acquires from the positioning history memory a positioning result t whose level of location ID is the highest (step S153), and then deletes positioning results contained in the positioning result list I from the positioning history memory (step S154).

The notification management unit 161 then extracts anew from positioning results in the current (after the deletion) positioning history memory a positioning result whose level of location ID is the highest (TOP_LOG( )), and compares it with the previous positioning result t. If the location IDs or levels of both positioning results are not the same, the notification management unit 161 notifies the application of the positioning result obtained by using TOP_LOG( ). At the end, the process returns to step S150 after waiting a certain period of time.

In this example, when a positioning result of a certain level (type or priority) is regarded as invalid and deleted due to the elapse of time and if a positioning result of a level lower than that remains in the positioning history memory, the positioning result of the lower level may be notified anew to the application so that the application can immediately get a valid position to replace the position that became invalid. Moreover, for example, also when a received positioning result has been stored in the positioning history memory without being notified because of its level (type or priority) being lower than positioning results in the positioning history memory, the execution of the flow in this example allows the application to be notified.

While there has been described an example in which the tinier process loop in FIG. 13 operates in parallel with the operation of the main process loop in FIG. 12 (or FIG. 20 described later), the main process loop may be configured so that when a positioning result is stored in the positioning history memory, the count of a timer that expires when the valid period of the positioning result elapses is started and, when the timer expires, the positioning result is deleted from the positioning history memory.

(Process Example 3)

FIG. 16 shows still another example of the process flow of the notification management unit 160 (hereinafter called "Process example 3"). The notification management unit 160 starts and ends the library 110 upon request to start and end it from the application 120. Specifically, the notification management unit 160 upon receiving a start request from the application checks whether there is an end request from the application or not in step S510, and ends the process if there is an end request. If there is no end request, it checks in step S520 whether it can receive a positioning result from the positioning result conversion unit 150 or not (whether a positioning result has been newly received by any positioning means in the positioning unit 130 and a location ID has been obtained or not). If it cannot receive a positioning result, the process returns to step S510 after waiting a predetermined period of time.

If the notification management unit 160 can receive a positioning result, it receives the positioning result from the positioning result conversion unit 150 in step S540. The notification management unit 160 then checks in step S550 whether the location ID of the received positioning result is included in data in the positioning device management master 175 or not. If the positioning device management master 175 does not contain the location ID, the positioning result is discarded without being processed.

In step S160, a positioning history deletion function is executed with the positioning result being as a parameter. As operation examples shown in FIG. 17, 18, or 19, this function presumes location IDs outside of the coverage based on a predetermined rule, and deletes positioning results having those location IDs from the positioning history memory 165.

In step S560, a positioning history update function is executed with the positioning result being as a parameter. As operation examples shown in FIG. 7 or 8, this function writes the positioning result received in step S540 to the positioning history memory 165, as well as determines whether it is required to notify the application 120 of the positioning result or not and notifies of the positioning result if required.

(Deletion Example 1)

Figure 17:
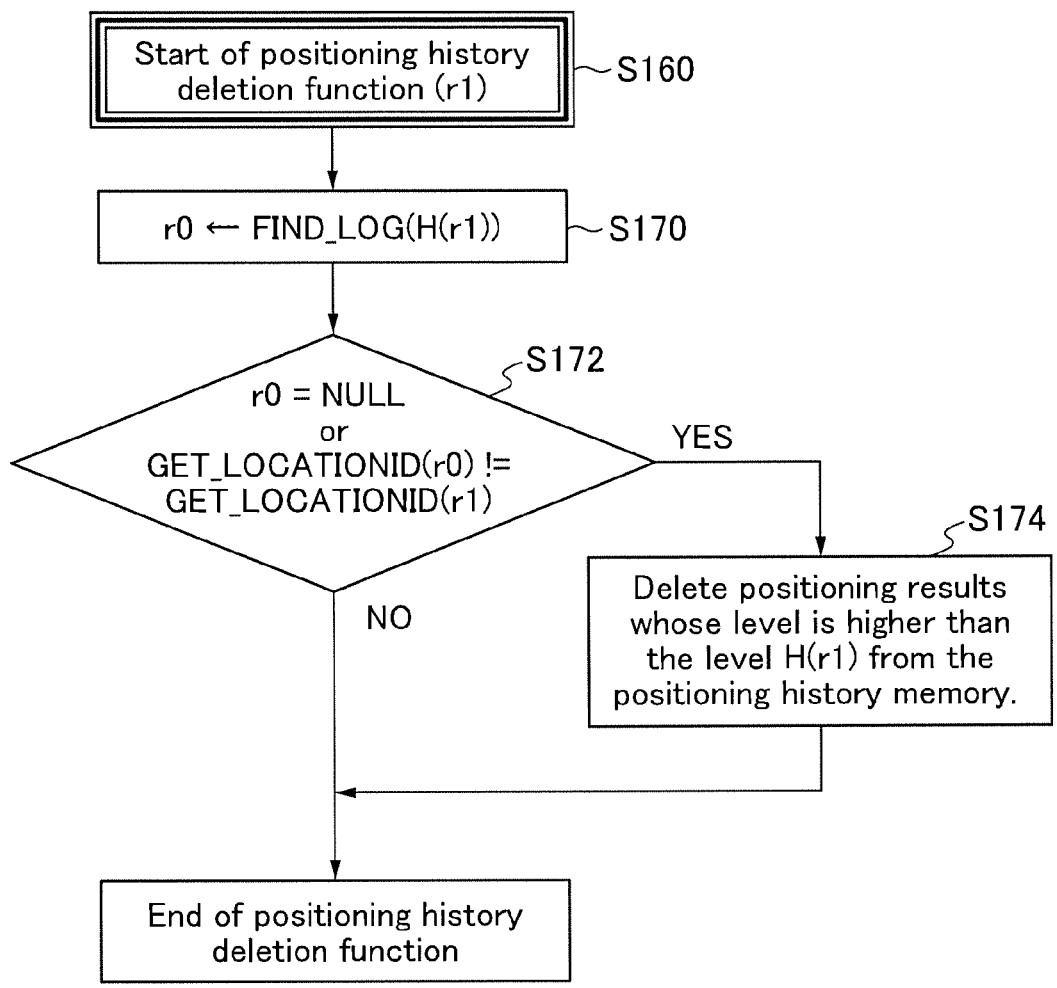
FIG. 17 is a flow diagram showing an example of the procedure of a positioning history deletion function (Deletion example 1)

FIG. 17 shows an example of a process flow of the positioning history deletion function S160 (hereinafter called "Deletion example 1"). In Deletion example 1, when a received positioning result r1 is not in the positioning history memory, positioning results whose level (type or priority) is higher than that of the location ID of r1 are deleted from the positioning history memory 165. Specifically, in step S170, a positioning result whose level is the same as that of the location ID of a received positioning result is extracted from the positioning history memory 165 and is substituted into a variable r0. If the positioning history memory 165 does not hold a positioning result of the same level, NULL is substituted into the variable r0.

A positioning result is deleted from the positioning history memory according to the contents of r0 and r1 in step S172. If r0 is NULL or if the location IDs of r0 and r1 are not the same, a positioning result that is higher in level than r1 is deleted from the positioning history memory 165 in step S174.

If coverages are arranged in such a way that one contains another, a change in the coverage on the including side can be regarded as a change in the coverage on the included side. The deletion method in Deletion example 1 uses this to delete from the history a positioning result having been received from the positioning device on the included side. Deletion example 1 is therefore particularly useful in a case where a level of location ID is assigned for each type of positioning device and a higher level is assigned for a positioning method with a narrower coverage in the positioning device management master 175.

(Deletion Example 2)

Figure 18:
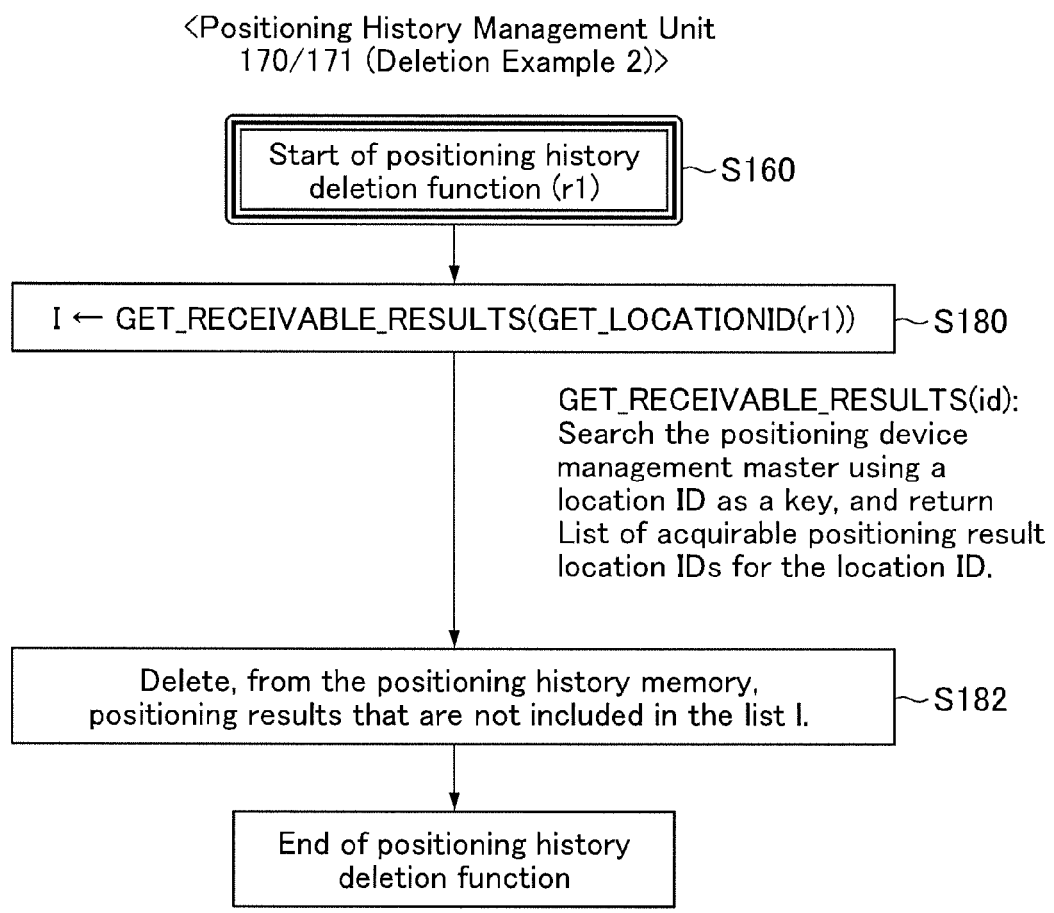
FIG. 18 a flow diagram showing another example of the procedure of the positioning history deletion function (Deletion example 2)

FIG. 18 shows another example of the process flow of the positioning history deletion function S160 (hereinafter called "Deletion example 2"). In Deletion example 2, positioning results that cannot be received where the location ID of a received positioning result r1 is received are deleted from the positioning history memory 165. Specifically, in step S180, "List of acquirable positioning result location IDs" for the location ID of a received positioning result r1 (GET_LOCATIONID(r1)) is acquired from the positioning device management master 175 and is substituted into a variable I. Positioning results not included in the list I are then deleted from the positioning history memory 165 in step S182.

Location IDs that cannot be acquired where a positioning result is received can be known from the arrangement of coverages of positioning devices. The deletion method in Deletion example 2 uses this to delete from the positioning history memory 165 a positioning result that cannot be acquired at the current position. Deletion example 2 can therefore be applied no matter how levels (types or priorities) of positioning devices are assigned.

(Deletion Example 3)

Figure 19:
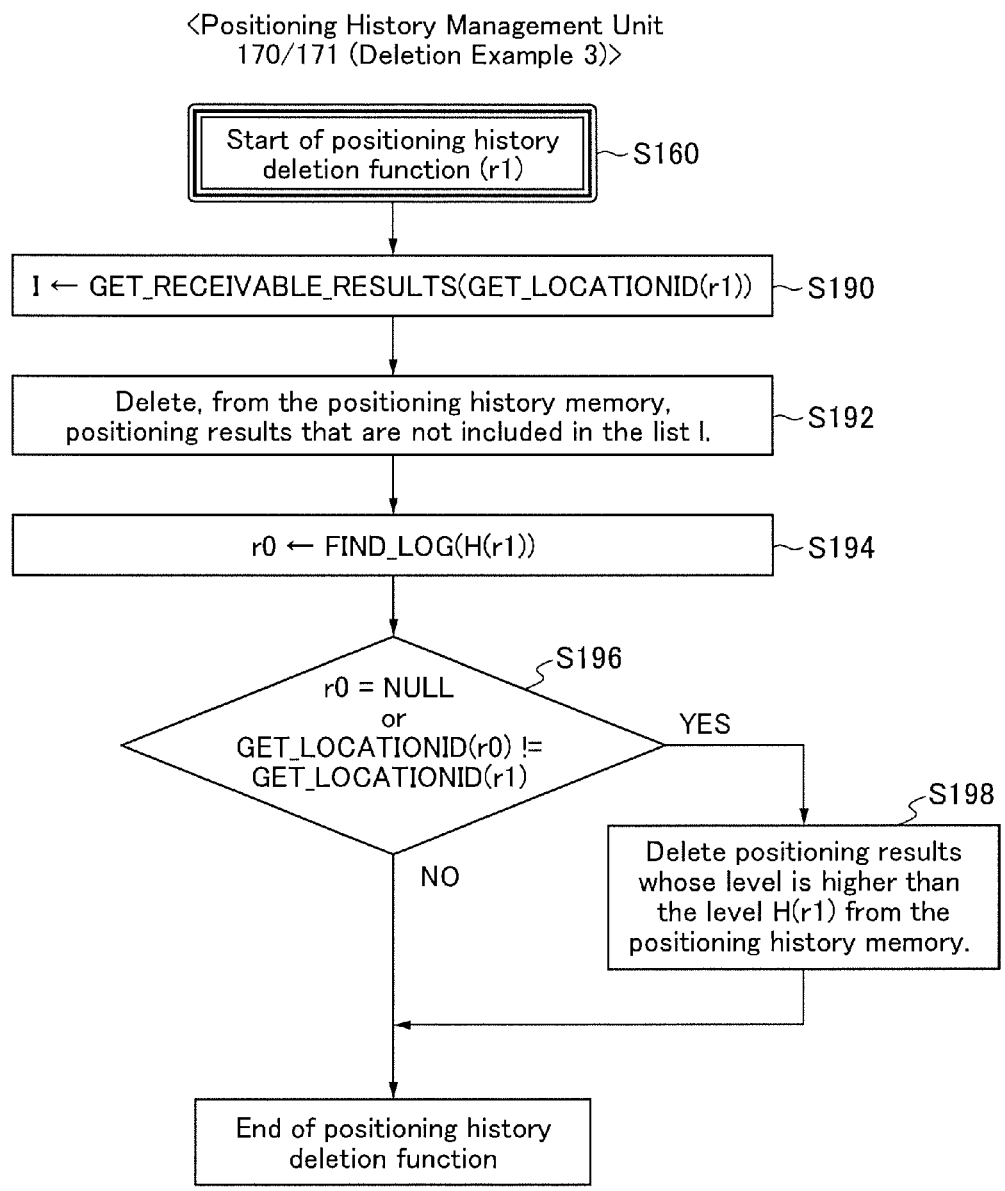
FIG. 19 a flow diagram showing still another example of the procedure of the positioning history deletion function (Deletion example 3)

FIG. 19 shows still another example of the process flow of the positioning history deletion function S160 (hereinafter called "Deletion example 3"). Deletion example 3 is a combination of the two deletion methods, Deletion examples 1 and 2, in which the different deletion processes in Deletion examples 1 and 2 are executed. Specifically, in step S190, "List of acquirable positioning result location IDs" for the location ID of a received positioning result r1 (GET_LOCATIONID(r1)) is acquired from the positioning device management master 175 and is substituted into a variable I. Positioning results not included in the list I are then deleted from the positioning history memory 165 in step S192.

Then, in step S194, a positioning result whose level (type or priority) is the same as that of the location ID of a received positioning result is extracted from the positioning history memory 165 and is substituted into a variable r0. If the positioning history memory 165 does not hold a positioning result of the same level, NULL is substituted into the variable r0. A positioning result is deleted from the positioning history memory according to the contents of r0 and r1 in step S196. If r0 is NULL or if the location IDs of r0 and r1 are not the same, a positioning result with a location ID whose level is higher than that of r1 is deleted from the positioning history memory 165 in step S198.

Deletion example 1 allows for deleting a positioning result from the history even when coverages overlap one another, but sometimes cannot allow for deleting from the history a positioning result that is not acquirable. Deletion example 2, on the other hand, is suited to rationally deleting a positioning result from the history when coverages are isolated from one another, and sometimes fails in the deletion if coverages are densely arranged. By combining Deletion examples 1 and 2, Deletion example 3 allows for increasing cases where the deletion is done appropriately.

(Process Example 4)

Figure 20:
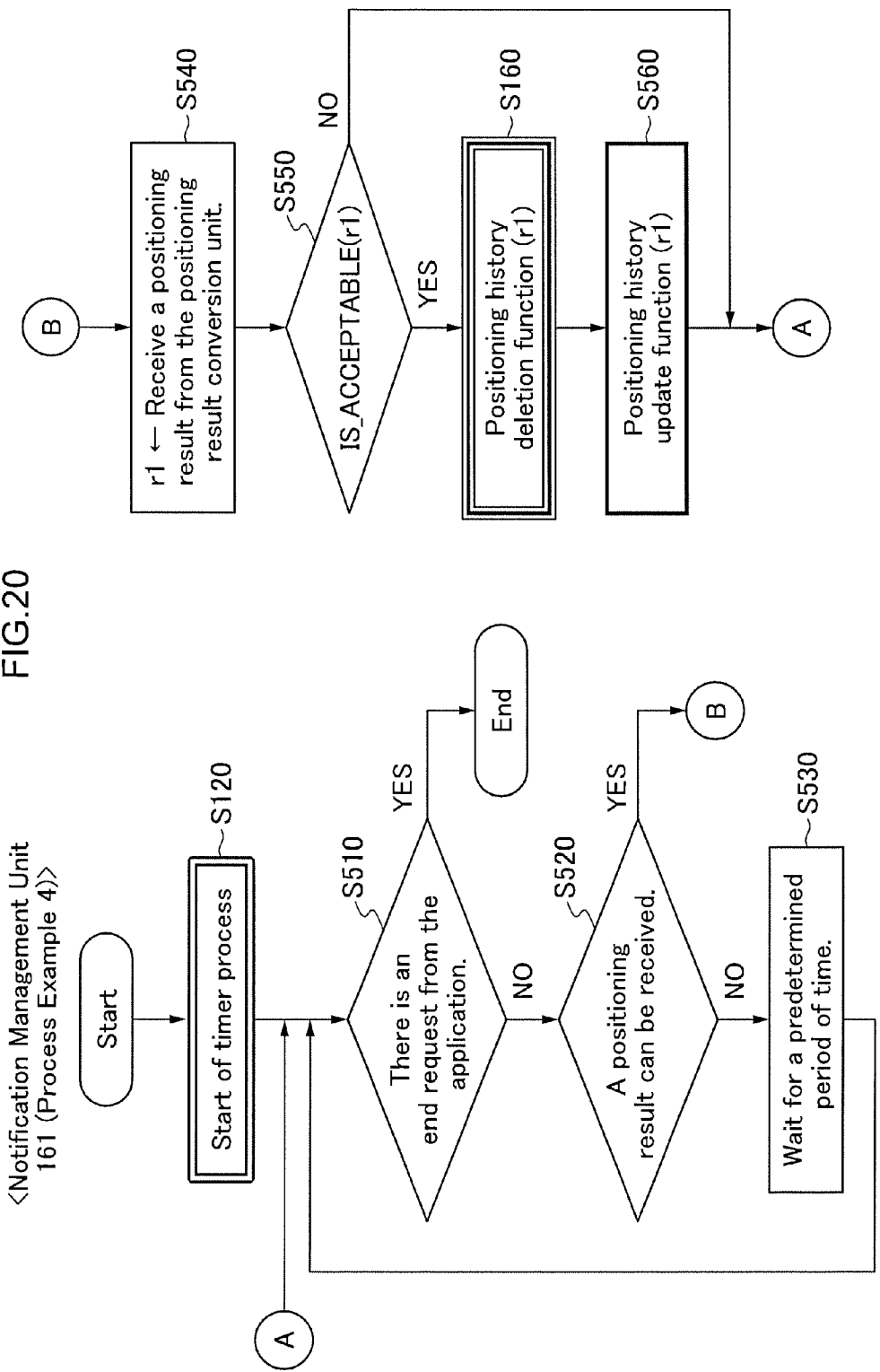
FIG. 20 is a flow diagram showing yet another example of the procedure in the notification management unit (Process example 4)

FIG. 20 shows yet another example of the process flow of the notification management unit 161 (hereinafter called "Process example 4"). Process example 4 is an example in which a timer process is executed to delete a positioning result from the history after a certain period of time has passed or a certain distance has been traveled and a positioning history deletion process is performed based on a received positioning result.

The notification management unit 161 starts and ends the library 111 upon request to start and end it from the application 120. Specifically, the notification management unit 161 upon receiving a start request from the application starts a timer process in step S120. As shown in operation examples in FIG. 13 or 15, the timer process involves deleting a positioning result held in the positioning history memory based on time elapsed or distance travelled since the time of positioning or, after the deletion, notifying of another positioning result based on the level of location ID.

The notification management unit 161 then checks whether there is an end request from the application or not in step S510, and ends the process if there is an end request. If there is no end request, it checks in step S520 whether it can receive a positioning result from the positioning result conversion unit 150 or not (whether a positioning result has been newly received by any positioning means in the positioning unit 130 and a location ID has been obtained or not). If it cannot receive a positioning result, the process returns to step S510 after waiting a predetermined period of time.

If the notification management unit 161 can receive a positioning result, it receives the positioning result from the positioning result conversion unit 150 in step S540. The notification management unit 161 then checks in step S550 whether the location ID of the received positioning result is included in data in the positioning device management master 175 or not. If the positioning device management master 175 does not contain the location ID, the positioning result is discarded without being processed.

In step S160, a positioning history deletion function is executed with the positioning result being as a parameter. As operation examples shown in FIG. 17, 18, or 19, this function presumes location IDs outside of the coverage based on a predetermined rule, and deletes positioning results having those location IDs from the positioning history memory 165.

In step S560, a positioning history update function is executed with the positioning result being as a parameter. As operation examples shown in FIG. 7 or 8, this function stores the positioning result received in step S540 in the positioning history memory 165, as well as determines whether it is required to notify the application 120 of the positioning result or not and notifies of the positioning result if required.

Now, Examples (A) through (L) shown in FIG. 21 will be specifically described below as examples in which the above-described configurations and processes are appropriately combined and implemented.

(Example (A))

Example (A) involves providing the application with notification if a received positioning result is not held in the positioning history memory.

How a positioning result is notified to the application in Example (A) will be described with reference to an arrangement example of positioning devices shown in FIG. 22 (*a*). G221, S221, and S222 are positioning devices of a GNSS, sound wave signal, and sound wave signal type, respectively. The location IDs of positioning results to be received from them are RG221, RS221, and RS222, respectively. Each circle drawn in FIG. 22 (*a*) schematically represents a coverage where a positioning result is received from each positioning device, and a rectangle schematically represents an area where coordinates are converted to Location ID RG221 (an actual coverage takes a complicated form due to various environmental factors, and may also vary depending on the receiving portable device). P221 through P225 are points of positioning (positions to which the portable device moves) to be used for description, which is given of a case where P221, P222, P223, P224, and P225 are moved through in this order. For convenience of description, suppose that a positioning result with a location ID indicated above each point of positioning is received at each point of positioning.

Figure 22:
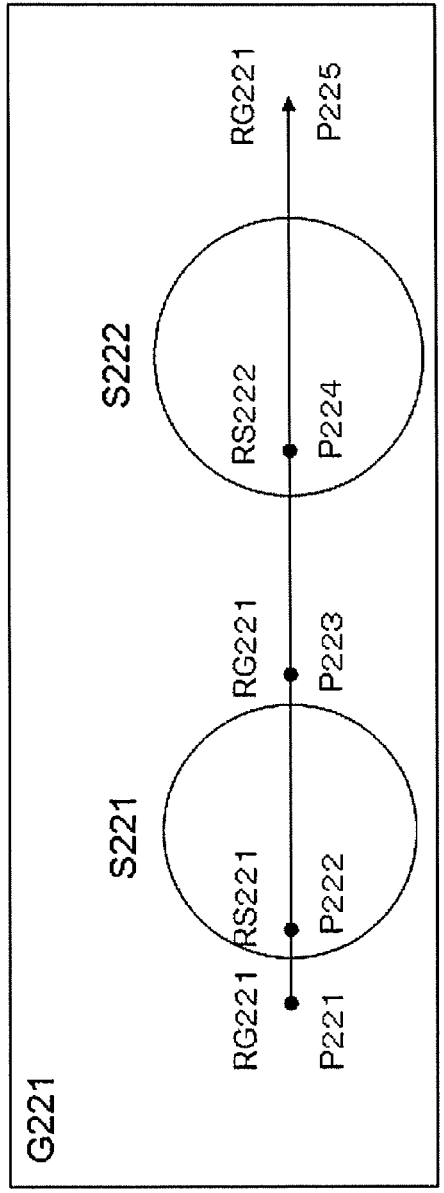
FIG. 22 illustrates Example (A)

FIG. 22 (*b*) shows data in the positioning device management master 175 to be used in Example (A). Latitude and Longitude represent the position of Location ID, and Level (the type of positioning device or the priority of positioning result) is set to 1 for RG221 and to 3 for RS221 and RS222. Time and distance do not cause positioning results to be deleted from the positioning history memory 165 in Example (A), and therefore there is no information on Valid period and Valid distance shown in FIG. 6. "List of acquirable positioning result location IDs" also does not cause positioning results to be deleted from the positioning history memory 165, and therefore there is no such information shown in FIG. 6.

In Example (A), a positioning result RG221 received at the point of positioning P221 is the first positioning result received after the start of positioning, while the positioning history memory 165 holds no positioning result, so it is notified to the application. The level of a positioning result RS221 received at the point of positioning P222 is 3, while the positioning history memory does not hold a positioning result whose level is 3, so it is notified to the application. A positioning result RG221 is received at the point of positioning P223 but is not notified because the positioning history memory holds the same positioning result. The level of a positioning result RS222 received at the point of positioning P224 is 3, while the positioning history memory holds the positioning result RS221 of the same level. Since both positioning results are the same in level but different in location ID, the received positioning result RS222 is notified to the application. A positioning result RG221 is received at the point of positioning P225 but is not notified because the positioning history memory holds the same positioning result.

In Example (A), the portable device may receive the same positioning result repeatedly while it stays in one coverage, but the positioning result received secondarily or later is not notified to the application because it is held in the positioning history memory. This can prevent the application from being notified of the same positional information repeatedly.

Since it is for each level that a positioning result notified last time is not notified in Example (A), every positioning result can be made to be notified only once by assigning different levels to all location IDs. Example (A) is therefore suited to be used, for example, for arranging a plurality of check points and notifying of arrival at each check point only once, as with a Stamp Rally.

Additionally, in Example (A), if there are positioning results of the same level, α and β, α is stored in the positioning history memory when the positioning result α is received, and α is deleted from the positioning history memory and β is stored there when β is received next time, so that α can be notified when α is received after that. Example (A) can thus be used for counting the number of move between two points, since in a case where there are two positioning results of the same level, a received positioning result can be made to be notified only when they are alternately received. Moreover, since two positioning results can be obtained in a place where coverages of the same level overlap each other, those can be notified alternately and continuously. This is advantageous, for example, in cautioning that the current place is to be watched out for.

(Example (B))

Example (B) involves providing notification if a received positioning result is higher in level (the type of positioning device or the priority of positioning result) than a positioning result notified last time or if a received positioning result and a positioning result notified last time are the same in level of location ID but different in location ID.

How a positioning result is notified to the application in Example (B) will be described with reference to an arrangement example of positioning devices shown in FIG. 23 (*a*). G231, W231, and S231 are the coverages of positioning devices of a GNSS, Wi-Fi, and sound wave signal type, respectively. Each circle drawn in FIG. 23 (*a*) schematically represents a coverage where a positioning result is received from each positioning device, and a rectangle schematically represents an area where coordinates are converted to Location ID RG231 (an actual coverage takes a complicated form due to various environmental factors, and may also vary depending on the receiving portable device). The location IDs of positioning results to be received from the coverages are RG231, RW231, and RS231, respectively. P231 through P235 are points of positioning (positions to which the portable device moves) to be used for description, which is given of a case where P231, P232, P233, P234, and P235 are moved through in this order. For convenience of description, suppose that a positioning result with a location ID indicated above each point of positioning is received at each point of positioning.

Figure 23:
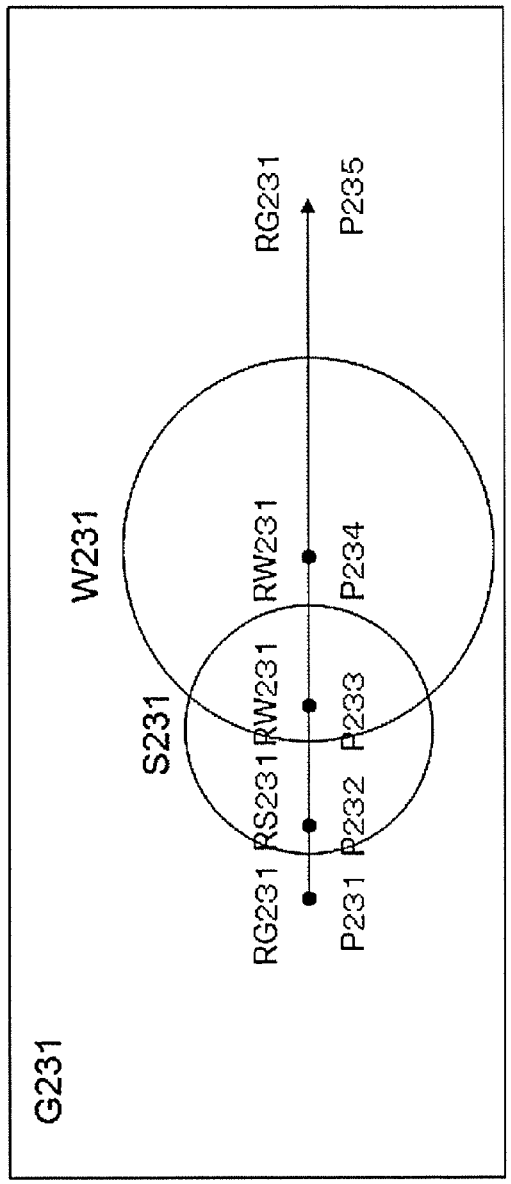
FIG. 23 illustrates Example (B)

FIG. 23 (*b*) shows data in the positioning device management master 175 to be used in Example (B). Latitude and Longitude represent the position of Location ID, and Level (the type of positioning device or the priority of positioning result) is set to 1 for RG231, to 2 for RW231, and to 3 for RS231. Time and distance do not cause positioning results to be deleted from the positioning history memory 165 in Example (B), and therefore there is no information on Valid period and Valid distance shown in FIG. 6. "List of acquirable positioning result location IDs" also does not cause positioning results to, be deleted from the positioning history memory 165, and therefore there is no such information shown in FIG. 6.

In Example (B), a positioning result RG231 received at the point of positioning P231 is the first positioning result received after the start of positioning, while the positioning history memory holds no positioning result, so it is notified to the application. The level of a positioning result RS231 received at the point of positioning P232 is 3, while the positioning history memory does not hold a positioning result whose level is 3 or higher, so the positioning result RS231 is notified to the application. A positioning result RW231 is received at the point of positioning P233 but is not notified because its level is 2 and the positioning history memory holds the positioning result RS231 whose level is 3. A positioning result RW231 is also received at the point of positioning P234 but is not notified to the application because of the same reason. A positioning result RG231 is received at the point of positioning P235 but is not notified to the application because it is held in the positioning history memory.

As described above, the level of the location ID of a positioning result to be notified is higher than or equal to the level of the location ID of a positioning result notified last time in Example (B). For example, suppose a case in which positioning devices based on Wi-Fi are separately placed at entrances of a large store and are assigned with different location IDs so as to be able to provide different entrance information for their respective entrances, and positioning devices based on iBeacon or sound wave signals are placed for their respective pieces of merchandise so that their own information can be received by putting the portable device close to the respective pieces of merchandise. In this case, a user who has received merchandise information once is allowed to avoid being provided with entrance information if the levels of location Ds derived from Wi-Fi are set lower than those derived from iBeacon or sound wave signals.

(Example (C))

Example (C) is Example (A) implemented with the addition of a function to delete a positioning result from the positioning history memory 165 after a certain period of time has passed or a certain distance has been traveled. Example (A) involves providing the application with notification only if a received positioning result is not held in the positioning history memory 165. A positioning result held in the positioning history memory 165 can be deleted in Example (C) and therefore, even in a case in Example (A) where the application cannot be provided with notification because of a received positioning result being held in the positioning history memory 165, notification can be provided after a certain period of time has passed or a certain distance has been traveled.

How a positioning result is notified to the application in Example (C) will be described with reference to an arrangement example of positioning devices shown in FIG. 24 (*a*). G241, W241, and S241 are the coverages of positioning devices of a GNSS, Wi-Fi, and sound wave signal type, respectively. The location IDs of positioning results to be received from them are RG241, RW241, and RS241, respectively. Each circle drawn in FIG. 24 (*a*) schematically represents the coverage of each positioning device, and a rectangle schematically represents an area where coordinates are converted to Location ID RG241 (an actual coverage takes a complicated form due to various environmental factors, and may also vary depending on the receiving portable device). P241 through P245 are points of positioning (positions to which the portable device moves) to be used for description, which is given of a case where P241, P242, P243, P244, and P245 are moved through in this order. For convenience of description, suppose that a positioning result with a location ID indicated above each point of positioning is received at each point of positioning at the time indicated in parentheses below each label of point of positioning. Though two S241 are placed, they can be distinguished from each other based on whether RW241 is held in the history or not when a positioning result RS241 is received, since S241 on the right side is contained in W241.

Figure 24:
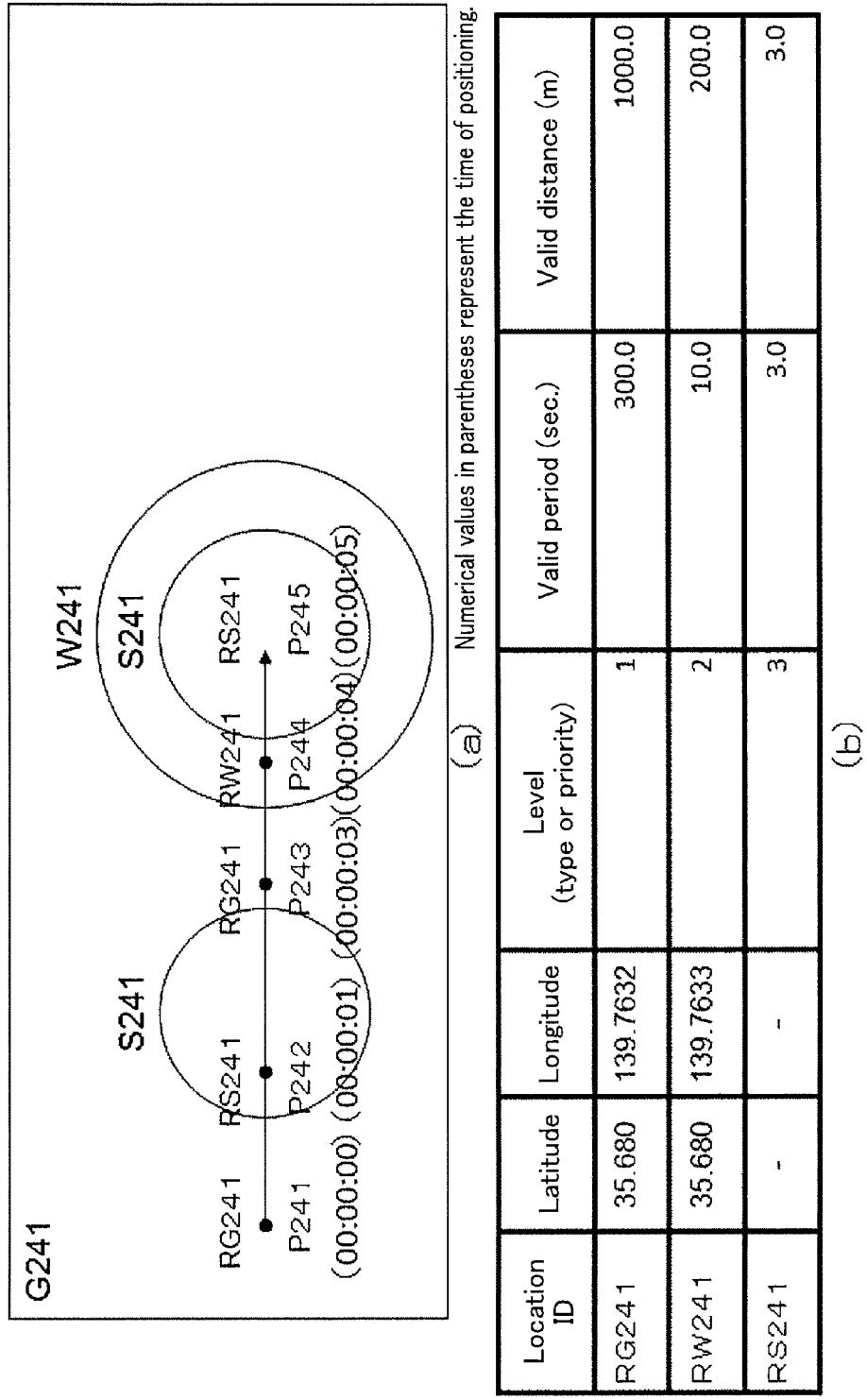
FIG. 24 illustrates Example (C)

FIG. 24 (*b*) shows data in the positioning device management master 175 to be used in Example (C). Latitude and Longitude represent the position of Location ID, and Level (the type of positioning device or the priority of positioning result) is set to 1 for RG241, to 2 for RW241, and to 3 for RS241. Valid period and Valid distance are values to be used to determine whether a positioning result held in the positioning history memory 165 can be deleted or not, and are used to be compared with the time elapsed since the time of positioning and with the distance between the position at the time of positioning and the current position, respectively. "List of acquirable positioning result location IDs" does not cause positioning results to be deleted from the positioning history memory 165, and therefore there is no such information shown in FIG. 6. Location ID RS241 exists in two places, and therefore Latitude and Longitude are not set for it.

In Example (C), a positioning result RG241 received at the point of positioning P241 is the first positioning result received after the start of positioning, while the positioning history memory 165 holds no positioning result, so it is notified to the application. The level of a positioning result RS241 received at the point of positioning P242 is 3, while the positioning history memory does not hold a positioning result whose level is 3, so it is notified to the application. A positioning result RG241 is received at the point of positioning P243 but is not notified because the positioning history memory holds the same positioning result. The level of a positioning result RW241 received at the point of positioning P244 is 2, while the positioning history memory does not hold a positioning result whose level is 2, so RW241 is notified to the application. After this, the positioning result RS241 held in the positioning history memory is deleted therefrom because the time elapsed since its time of positioning exceeds its valid period of 3.0 seconds. A positioning result RS241 is received at the point of positioning P245 and is notified to the application because the positioning history memory does not hold a positioning result of the same level as RS241.

A positioning result held in the positioning history memory is deleted in Example (C) as described above and therefore, when the same location ID is transmitted in different places or when the same place is visited again, the last positioning result is already deleted (if a certain period of time has passed or a certain distance has been traveled without the same positioning result as the last one being received, even if a different positioning result of the same level has not been received after the last reception) and the current positioning result can be notified anew.

Example (C) can also be used for an application that records the number of entry into a certain coverage and time of staying there, if it is preferred not to count them when a user moves to the outside only for a short time and comes back into the same coverage.

(Example (D))

Example (D) is Example (B) implemented with the addition of a function to delete a positioning result from the positioning history memory 165 after a certain period of time has passed or a certain distance has been traveled. Example (B) involves providing notification if a received positioning result is higher in level of location ID (the type of positioning device or the priority of positioning result) than a positioning result notified last time or if a received positioning result and a positioning result notified last time are the same in level but different in positioning result. A positioning result held in the positioning history memory can be deleted in Example (D) and therefore, even in a case in Example (B) where the application cannot be notified of a received positioning result because of the level of the received positioning result being lower than the highest level of positioning results held in the positioning history memory or because of the received positioning result being the same as a positioning result held in the positioning history memory, notification can be provided if a certain period of time has passed or a certain distance has been traveled.

How the application is provided with notification in Example (D) will be described below with reference to FIGS. 25 and 26.

First, how a positioning result is notified to the application in Example (D) will be described with reference to an arrangement example of positioning devices shown in FIG. 25 (a). G251, W251, and S251 are the coverages of positioning devices of a GNSS, Wi-Fi, and sound wave signal type, respectively. The location IDs of positioning results to be received from them are RG251, RW251, and RS251, respectively. Each circle drawn in FIG. 25 (a) schematically represents the coverage of each positioning device, and a rectangle schematically represents an area where coordinates are converted to Location ID RG251 (an actual coverage takes a complicated form due to various environmental factors, and may also vary depending on the receiving portable device). P251 through P254 are points of positioning (positions to which the portable device moves) to be used for description, which is given of a case where P251, P252, P253, and P254 are moved through in this order in FIG. 25 (a). For convenience of description, suppose that a positioning result with a location ID indicated above each point of positioning is received at each point of positioning at the time indicated in parentheses below each label of point of positioning.

Figure 25:
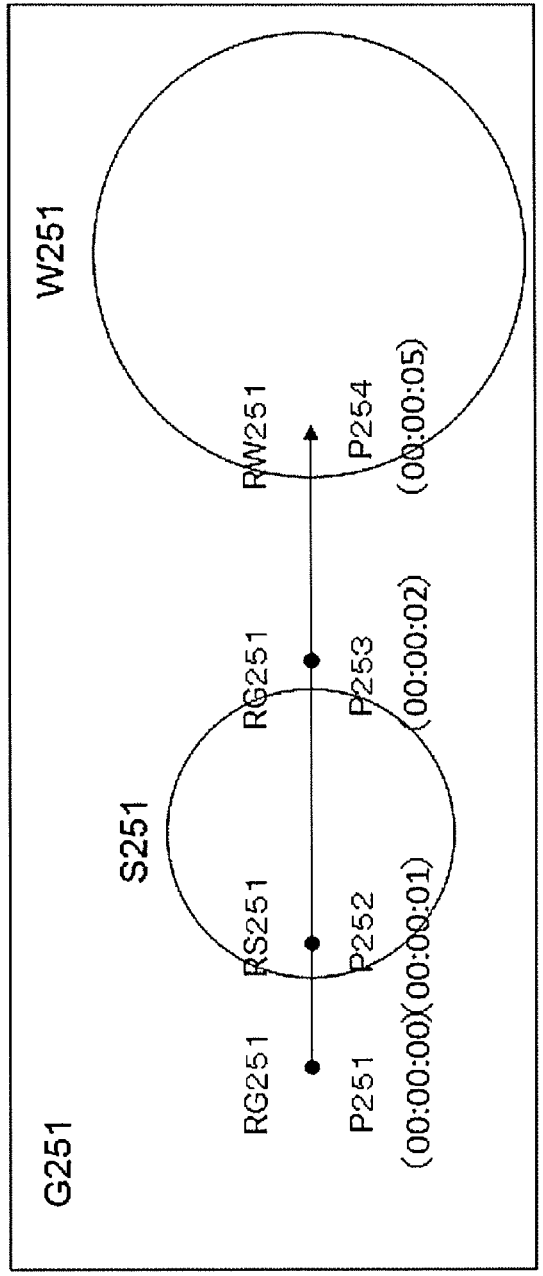
FIG. 25 illustrates Example (D) where notification is provided.

FIG. 25 (b) shows data in the positioning device management master 175 to be used in Example (D). Latitude and Longitude represent the position of Location ID, and Level (the type of positioning device or the priority of positioning result) is set to 1 for RG251, to 2 for RW251, and to 3 for RS251. Valid period and Valid distance are values to be used to determine whether a positioning result held in the positioning history memory 165 can be deleted or not, and are used to be compared with the time elapsed since the time of positioning and with the distance between the position at the time of positioning and the current position, respectively. "List of acquirable positioning result location IDs" does not cause positioning results to be deleted from the positioning history memory, and therefore there is no such information shown in FIG. 6.

In Example (D), a positioning result RG251 received at the point of positioning P251 is the first positioning result received after the start of positioning, while the positioning history memory 165 holds no positioning result, so it is notified to the application. The level of a positioning result RS251 received at the point of positioning P252 is 3, while the positioning history memory does not hold a positioning result whose level is 3 or higher, so it is notified to the application. A positioning result RG251 is received at the point of positioning P253 but is not notified to the application because the positioning history memory holds RG251.

On the way from the point of positioning P253 to P254, the positioning result RS251 held in the positioning history memory is deleted from the positioning history memory 165 because the time elapsed since its time of positioning exceeds its valid period of 3.0 seconds. After that, a positioning result RW251 is received at the point of positioning P254 and is notified to the application because the positioning history memory does not hold a positioning result except RG251.

Secondly, how a positioning result is notified to the application in Example (D) will be described with reference to an arrangement example of positioning devices shown in FIG. 26 (a). The deletion of a positioning result from the history would cause a positioning result received later to be notified in the arrangement example in FIG. 25, but in the arrangement example in FIG. 26 the deletion of a positioning result from the history does not cause a positioning result to be notified because the same positioning result is received before and after the deletion of the positioning result from the history.

G261, W261, and S261 are the coverages of positioning devices of a GNSS, Wi-Fi, and sound wave signal type, respectively. The location Ds of positioning results to be received from them are RG261, RW261, and R3261, respectively. Each circle drawn in FIG. 26 (a) schematically represents the coverage of each positioning device, and a rectangle schematically represents an area where coordinates are converted to Location ID RG261 (an actual coverage takes a complicated form due to various environmental factors, and may also vary depending on the receiving portable device). P261 through P265 are points of positioning (positions to which the portable device moves) to be used for description, which is given of a case where P261, P262, P263, P264, and P265 are moved through in this order in FIG. 26 (a). For convenience of description, suppose that a positioning result with a location ID indicated above each point of positioning is received at each point of positioning at the time indicated in parentheses below each label of point of positioning.

Figure 26:
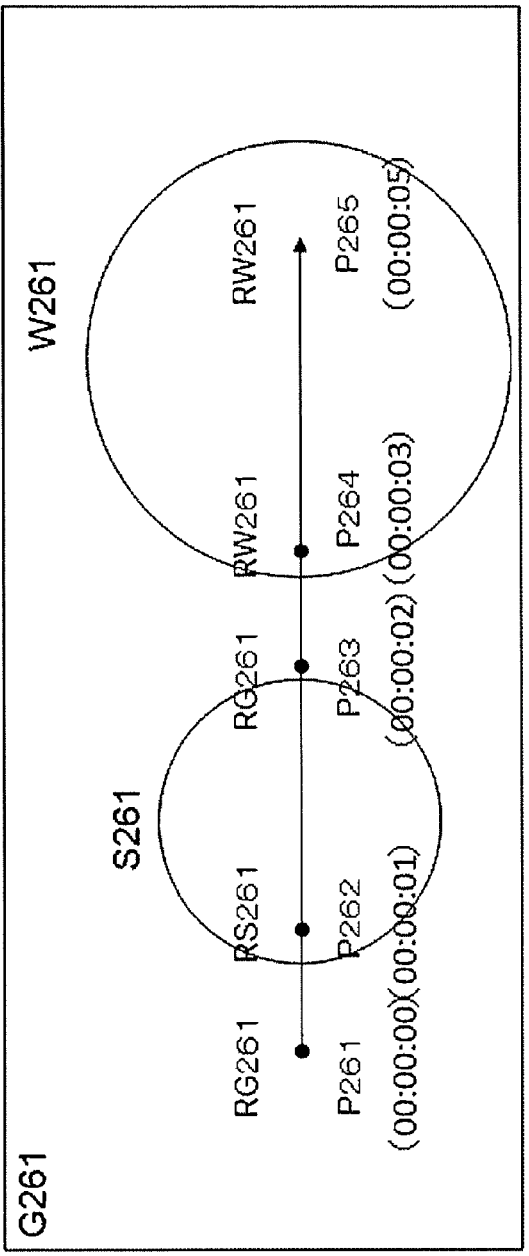
FIG. 26 illustrates Example (D) where notification is not provided and Example (D')

FIG. 26 (b) shows data in the positioning device management master 175 to be used in Example (D). Latitude and Longitude represent the position of Location ID, and Level (the type of positioning device or the priority of positioning result) is set to 1 for RG261, to 2 for RW261, and to 3 for RS261. Valid period and Valid distance are values to be used to determine whether a positioning result held in the positioning history memory can be deleted or not, and are used to be compared with the time elapsed since the time of positioning and with the distance between the position at the time of positioning and the current position, respectively. "List of acquirable positioning result location IDs" does not cause positioning results to be deleted from the positioning history memory 165, and therefore there is no such information shown in FIG. 6.

In Example (D), a positioning result RG261 received at the point of positioning P261 is the first positioning result received after the start of positioning, while the positioning history memory 165 holds no positioning result, so it is notified to the application. The level of a positioning result RS261 received at the point of positioning P262 is 3, while the positioning history memory does not hold a positioning result whose level is 3 or higher, so it is notified to the application. A positioning result RG261 is received at the point of positioning P263 but is not notified to the application because the positioning history memory holds RG261. The level of a positioning result RW261 received at the point of positioning P264 is 2, while the positioning history memory holds the positioning result RS261 whose level is 3, so RW261 is not notified to the application. On the way from the point of positioning P264 to P265, the positioning result RS261 held in the positioning history memory is deleted from the positioning history memory 165 because the time elapsed since its time of positioning exceeds its valid period of 3.0 seconds. After that, a positioning result RW261 is received at the point of positioning P265 but is not notified to the application because the positioning history memory holds RW261.

Since a positioning result held in the positioning history memory is deleted after the valid period has passed or the valid distance has been traveled in Example (D) as described above, a positioning result of a low level may be notified even after a positioning result of a higher level is received. As described in the arrangement example in FIG. 26, however, if a stored positioning result is not notified because of its low level, the positioning result is stored in the positioning history memory, and therefore the positioning result not notified the last time and received again after the deletion of a positioning result of a high level from the history is not notified.

Example (D) can realize, for example, an application that provides notification only when the portable device has failed to move between two coverages within a certain period of time. Specifically, supposing that the portable device moves between two coverages from α to β, the levels of the coverages are set so as to satisfy α>β. In this case, even if the portable device moves from α to β and receives a positioning result in β, the positioning result in β is not notified because the positioning result in a is held in the positioning history memory. If time to move from α to β is more than or equal to the valid period of α, however, the positioning result α in the positioning history memory is deleted during the move and the positioning result in β can be notified, so that an application can be realized that notifies of information only when the portable device has failed to reach β within a certain period of time.

(Example (D)') Example (D)' is a variation of Example (D), and is different therefrom in that the application is notified of a positioning result of the highest level in the positioning history memory when a positioning result is deleted from the positioning history memory in the timer process. Example (D)' will be described with reference to FIG. 26 used to describe Example (D).

In Example (D)', a positioning result RG261 received at the point of positioning P261 is the first positioning result received after the start of positioning, while the positioning history memory 165 holds no positioning result, so it is notified to the application. The level of a positioning result RS261 received at the point of positioning P262 is 3, while the positioning history memory does not hold a positioning result whose level is 3 or higher, so it is notified to the application. A positioning result RG261 is received at the point of positioning P263 but is not notified to the application because the positioning history memory holds the same RG261. A positioning result RW261 is received at the point of positioning P264 but is not notified to the application because the positioning history memory holds a positioning result whose level is higher than that of RW261. On the way from the point of positioning P264 to P265, the positioning result RS261 held in the positioning history memory is deleted from the positioning history memory 165 because the time elapsed since its time of positioning exceeds its valid period of 3.0 seconds. In Example (D)', the application is notified of a positioning result whose level is the highest in the positioning results held in the positioning history memory when a positioning result is deleted from the positioning history memory, and therefore RW261 is notified to the application. A positioning result RW261 is received at the point of positioning P265 following the same one received at the point of positioning P264, but is not notified to the application because the positioning history memory holds RW261.

Since in Example (D) the application is notified of a positioning result of the highest level held in the positioning history memory when a positioning result held in the positioning history memory is deleted after the valid period has passed or the valid distance has been traveled as described above, even a stored positioning result not notified because of its low level can be notified immediately after the positioning result that prevented the stored positioning result from being notified is deleted. Particularly, as described in FIG. 26 for Example (D), even a positioning result not notified because of its remaining in the history can be notified when a positioning result of a higher level is deleted from the history.

With use of Example (D)', a mechanism can be realized by which, in an arrangement example where there are two coverages α and β and a coverage γ that contains them and the portable device moves from α being a departure place toward β being a destination, information is notified if the portable device has not reached the destination β after a predetermined period of time has passed on the way from α to β. The levels of the coverages α, β, and γ are set so as to satisfy γ<α<β. First, positioning results α and γ are received in the departure place, so the positioning results α and γ are held in the positioning history memory. A positioning result γ is received on the way from the coverage α to β, but is not notified because the positioning results γ and α are held in the positioning history memory. If the valid period of α has passed on the way, the positioning result α is deleted from the positioning history memory. A positioning result of the highest level in the positioning history memory is then notified, and therefore the positioning result γ is notified. When the destination is reached, a positioning result β is received and is notified without fail because its level is higher than those of α and γ. As seen above, γ is notified only after the valid period of β has passed on the way from α to β.

(Example (E))

Example (E) is Example (B) implemented with the addition of a function to delete from the positioning history memory a positioning result whose level is higher than or equal to that of a received positioning result if the received positioning result is not held in the positioning history memory.

How the application is provided with notification in Example (E) will be described below with reference to FIGS. 28 and 29.

Figure 27:
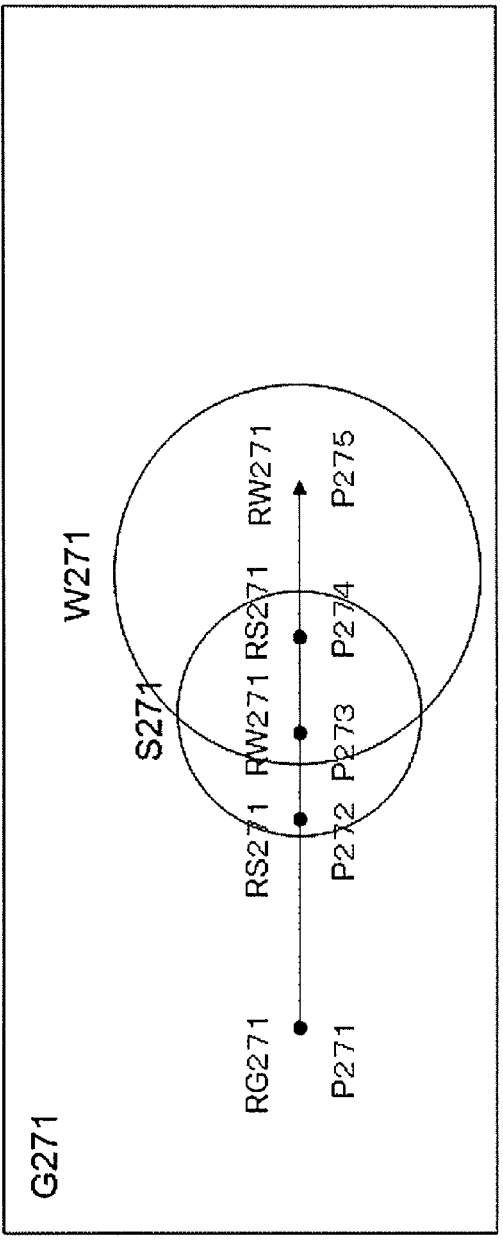
FIG. 27 illustrates Example (E) where notification is provided.

First, how a positioning result is notified to the application in Example (E) will be described with reference to an arrangement example of positioning devices shown in FIG. 27 (a). G271, W271, and S271 in FIG. 27 are the coverages of positioning devices of a GNSS, Wi-Fi, and sound wave signal type, respectively. The location IDs of positioning results to be received from them are RG271, RW271, and RS271, respectively. Each circle drawn in FIG. 27 (*a*) schematically represents the coverage of each positioning device, and a rectangle schematically represents an area where coordinates are converted to Location ID RG271 (an actual coverage takes a complicated form due to various environmental factors, and may also vary depending on the receiving portable device). P271 through P275 are points of positioning (positions to which the portable device moves) to be used for description, which is given of a case where P271, P272, P273, P274, and P275 are moved through in this order. For convenience of description, suppose that a positioning result with a location ID indicated above each point of positioning is received at each point of positioning.

FIG. 27 (*b*) shows data in the positioning device management master 175 to be used in Example (E). Latitude and Longitude represent the position of Location ID, and Level (the type of positioning device or the priority of positioning result) is set to 1 for RG271, to 2 for RW271, and to 3 for RS271. Time and distance do not cause positioning results to be deleted from the positioning history memory 165 in Example (E), and therefore there is no information on Valid period and Valid distance shown in FIG. 6. "List of acquirable positioning result location Ds" also does not cause positioning results to be deleted from the positioning history memory 165, and therefore there is no such information shown in FIG. 6.

In Example (E), a positioning result RG271 received at the point of positioning P271 is the first positioning result received after the start of positioning, while the positioning history memory 165 holds no positioning result, so it is notified to the application. The level of a positioning result RS271 received at the point of positioning P272 is 3, while the positioning history memory does not hold a positioning result whose level is 3 or higher, so it is notified to the application. A positioning result RW271 is received at the point of positioning P273. Since the positioning result RW271 is not held in the positioning history memory, the positioning result RS271 whose level of location ID is higher than that of RW271 is deleted from the positioning history memory 165, and the positioning result RW271 is notified to the application. A positioning result R5271 is received at the point of positioning P274 and is notified to the application because the positioning history memory does not hold a positioning result whose level is higher than that of RS271. A positioning result RW271 is received at the point of positioning P275 following the same one received at the point of positioning P273, but is not notified to the application because the positioning history memory holds RW261.

As described above, when a positioning result that is not held in the positioning history memory 165 is received, a positioning result whose level is higher than that of the received positioning result is deleted from the positioning history memory in Example (E). This mechanism allows an identical positioning result to be notified twice to the application if a positioning result whose level is lower than that of the identical positioning result is received while the identical positioning result is received twice. If the order of received positioning results is different from the above, however, an identical positioning result is not notified twice even if the arrangement is the same as that in FIG. 27. Such an example will be described below with reference to FIG. 28.

How a positioning result is notified to the application in Example (E) will be described with reference to an arrangement example of positioning devices shown in FIG. 28 (*a*). G281, W281, and S281 are the coverages of positioning devices of a GNSS, Wi-Fi, and sound wave signal type, respectively. The location IDs of positioning results to be received from them are RG281, RW281, and RS281, respectively. Each circle drawn in FIG. 28 (*a*) schematically represents the coverage of each positioning device, and a rectangle schematically represents an area where coordinates are converted to Location ID RG281 (an actual coverage takes a complicated form due to various environmental factors, and may also vary depending on the receiving portable device). P281 through P285 are points of positioning (positions to which the portable device moves) to be used for description, which is given of a case where P281, P282, P283, P284, and P285 are moved through in this order. For convenience of description, suppose that a positioning result with a location ID indicated above each point of positioning is received at each point of positioning.

Figure 28:
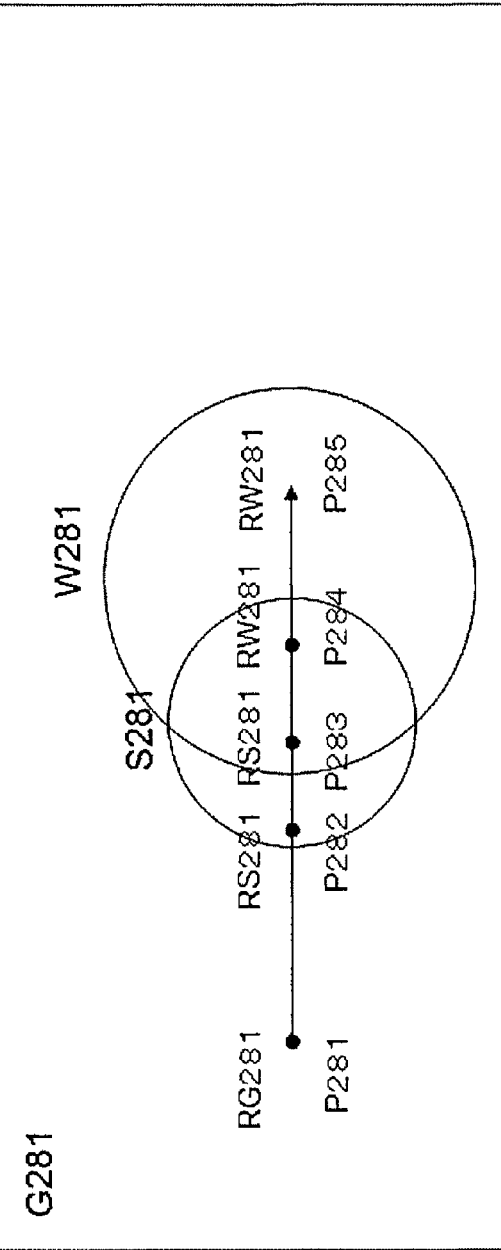
FIG. 28 illustrates Example (E) where notification is not provided.

FIG. 28 (*b*) shows data in the positioning device management master 175 to be used in Example (E). Latitude and Longitude represent the position of Location ID, and Level is set to 1 for RG281, to 2 for RW281, and to 3 for RS281. Time and distance do not cause positioning results to be deleted from the positioning history memory 165 in Example (E), and therefore there is no information on Valid period and Valid distance shown in FIG. 6. "List of acquirable positioning result location IDs" also does not cause positioning results to be deleted from the positioning history memory 165, and therefore there is no such information shown in FIG. 6.

In Example (E), a positioning result RG281 received at the point of positioning P281 is the first positioning result received after the start of positioning, while the positioning history memory 165 holds no positioning result, so it is notified to the application. The level of a positioning result RS281 received at the point of positioning P282 is 3, while the positioning history memory does not hold a positioning result whose level is 3 or higher, so it is notified to the application. A positioning result RS281 is received at the point of positioning P283, but is not notified to the application because the positioning history memory holds RS281. A positioning result RW281 is received at the point of positioning P284, while RW281 is not held in the positioning history memory, so the positioning result RS281 whose level of location ID is higher than that of RW281 is deleted from the positioning history memory, and RW281 is notified to the application. A positioning result RW281 is received at the point of positioning P285 following the same one received at the point of positioning P284, but is not notified to the application because the positioning history memory holds RW281.

The difference between the two examples described above is whether a positioning result RS281 is received after a positioning result RW281 was received in the area where the coverages S281 and W281 overlap or not. If the user stays long enough in the area where the coverages S281 and W281 overlap, RW281 is received and then RS281 is received, so the received RS281 can be notified to the application. On the other hand, if the user stays short enough in the area where the coverages S281 and W281 overlap, RS281 cannot be received after RW281 is received, so RS281 cannot be notified. Example (E) can thus be used, for example, in a case where there are two coverages of different levels and if, on the way from one coverage with a higher level to the other with a lower level, a positioning result of the higher level is received twice, it is determined that the user has been staying there for a long time and the user is to be encouraged to move forward.

Example (E) can be used to determine whether, between departure from one coverage and return to the same, the portable device has passed through another coverage or not based on the presence or absence of notification at the time of the return (Examples (F) and (G) can also be used in the same manner). Suppose that the two coverages are α and β. Now, suppose a case in which the portable device departs from α and returns back to α. The coverage β exists outside of α, and the levels of α and β are set so as to satisfy α>β. A positioning result α is received within the coverage α, and therefore α is stored in the positioning history memory. If the portable device goes out of α and returns to α without passing through the coverage β, a positioning result α is received but is not notified because α is held in the positioning history memory. On the other hand, If the portable device goes out of the coverage α and moves to the coverage β, a positioning result β is received. Since β is lower in level than α and β is not held in the positioning history memory, α is deleted from the positioning history memory and β is stored in the positioning history memory. Then, when the portable device returns to the coverage α, a positioning result α is received and is notified to the application because α is not held in the positioning history memory. As seen above, Example (E) allows notification of positioning result to be provided when the portable device returns to the coverage α and only when it has gone out of α and has passed through β.

In addition, Example (E) can be used to, even in a case where coverages having an identical location ID are scattered on a plurality of places, notify of a positioning result of each coverage each time it is received if those coverage are made to be separately contained in other coverages. For example, suppose that there are two coverages α1 and α2, the location ID of which is identical, i.e. α. The coverage α2 is set to be contained in a coverage β, and the levels of their location IDs are set so as to satisfy α>β. In this case, when the portable device stays in the coverage α1 and receives a positioning result α1 first, α1 is stored in the positioning history memory. Next, when the portable device moves to the coverage α2, it receives a positioning result β. Since β is lower in level than α, the positioning result α1 in the positioning history memory is deleted. After that, when a positioning result α2 is received, α2 is notified to the application because there is no positioning result with the location ID of α2, i.e. α, in the positioning history memory. This effect can also be obtained when there are more than two coverages with the location ID α if the coverages containing them have a different location ID.

(Example (F))

Example (F) is Example (A) implemented with the addition of a function to refer to the positioning device management master 175 to delete from the positioning history memory a positioning result that is not included in "List of acquirable positioning result location IDs" for the location ID of a received positioning result.

How a positioning result is notified to the application in Example (F) will be described with reference to an arrangement example of positioning devices shown in FIG. 29 (a). G291, W291, and S291 are the coverages of positioning devices of a GNSS, Wi-Fi, and sound wave signal type, respectively. The location IDs of positioning results to be received from them are RG291, RW291, and RS291, respectively. Each circle drawn in FIG. 29 (a) schematically represents the coverage of each positioning device, and a rectangle schematically represents an area where coordinates are converted to Location ID RG291 (an actual coverage takes a complicated form due to various environmental factors, and may also vary depending on the receiving portable device). P291 through P295 are points of positioning (positions to which the portable device moves) to be used for description, which is given of a case where P291, P292, P293, P294, and P295 are moved through in this order in FIG. 29 (a). For convenience of description, suppose that a positioning result with a location ID indicated above each point of positioning is received at each point of positioning.

Figure 29:
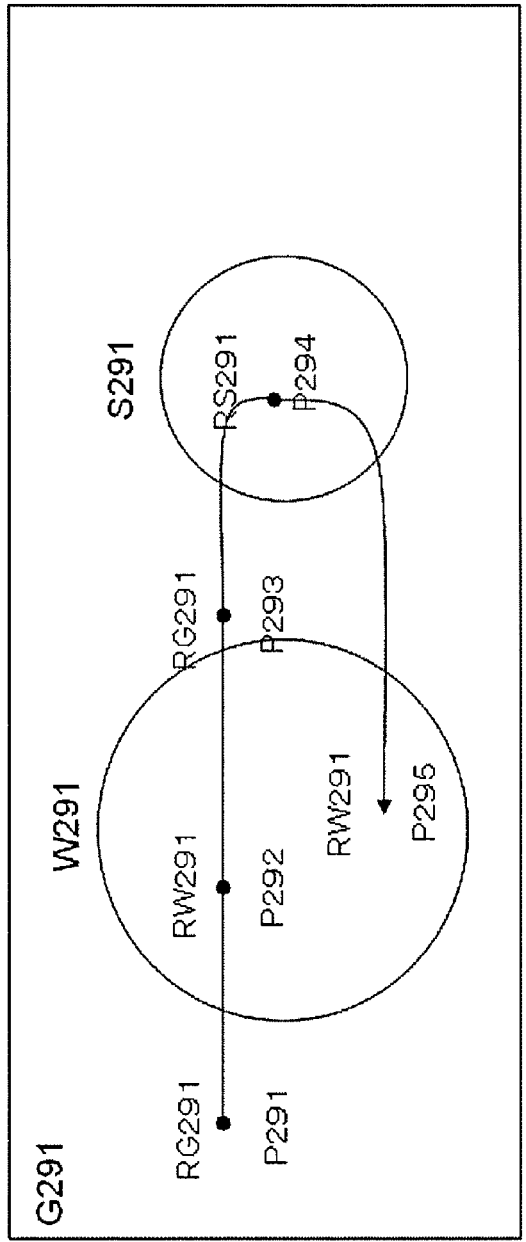
FIG. 29 illustrates Example (F)

FIG. 29 (b) shows data in the positioning device management master 175 to be used in Example (F). Latitude and Longitude represent the position of Location ID, and Level is set to 1 for RG291, to 2 for RW291, and to 3 for RS291. Time and distance do not cause positioning results to be deleted from the positioning history memory 165 in Example (F), and therefore there is no information on Valid period and Valid distance shown in FIG. 6. "List of acquirable positioning result location IDs" is a list of location IDs that can be received somewhere in the area where the relevant location ID can be received, and is used to, based on the location ID of a received positioning result, delete from the positioning history memory 165 a positioning result with a location ID that cannot be received.

In Example (F), a positioning result RG291 received at the point of positioning P291 is the first positioning result received after the start of positioning, while the positioning history memory 165 holds no positioning result, so it is notified to the application. The level of a positioning result RW291 received at the point of positioning P292 is 2, while the positioning history memory does not hold a positioning result whose level is 2 or higher, so it is notified to the application. A positioning result RG291 is received at the point of positioning P293, but is not notified to the application because the positioning history memory holds RG291. A positioning result RS291 is received at the point of positioning P294, where the positioning result RW291 that is not included in "List of acquirable positioning result location IDs" for Location ID RS291 (RG291 and RS291) is deleted from the positioning history memory 165. The received positioning result RS291 is notified to the application because it is not held in the positioning history memory 165. A positioning result RW291 is received at the point of positioning P295, where the positioning result RS291 that is not included in "List of acquirable positioning result location IDs" for Location ID RW291 (RG291 and RW291) is deleted from the positioning history memory 165. The received positioning result RW291 is then notified to the application because it is not held in the positioning history memory.

In the arrangement example in FIG. 29 (a), the positioning result RW291 received at the point of positioning P295 is not notified because RW291 is held in the positioning history memory in Example (A), but can be notified in Example (F).

A certain change made to the positioning device management master in Example (F) allows a positioning result of a specified location ID to be notified to the application each time it is received. This uses the mechanism by which a positioning result with a location ID that is not included in "List of acquirable positioning result location IDs" is deleted from the positioning history memory. This is because, if "List of acquirable positioning result location IDs" for a location ID in the positioning device management master does not include the location ID itself, the positioning history deletion function deletes a positioning result with the same location ID as that of a received positioning result in step S160 in Process example 3, so that the received positioning result will never be held in the positioning history memory and, accordingly, will be notified to the application. The operation of notifying of a positioning signal independently of the course of events each time it is received from a positioning device is suited to tracking a moving portable device or recording its move.

Example (F) also allows for notifying of a received positioning result each time it is received even if there are a plurality of coverages that are assigned with different levels (Examples (A) and (B), too, allow for the same thing if an identical level is assigned). For example, "List of acquirable positioning result location IDs" is set to α and β for coverages α and β, respectively. Each level may be assigned with any height. Now, a positioning result α is notified in the coverage α, and is stored in the positioning history memory. When the portable device moves to the coverage β, α is deleted from the positioning history memory because α is not held in "List of acquirable positioning result location IDs" for β. The received positioning result β is not held in the positioning history memory, and is therefore notified and stored in the positioning history memory. When the portable device moves to the coverage α again, a positioning result α is received. Since β is not held in "List of acquirable positioning result location IDs" for α, the positioning result β is deleted from the positioning history memory and α is notified. As seen above, Example (F) allows for notifying of a received positioning result regardless of the setting of the level by adjusting the setting of "List of acquirable positioning result location IDs."

(Example (G))

Example (G) is Example (B) implemented with the addition of a function to refer to the positioning device management master to delete from the positioning history memory a positioning result that is not included in "List of acquirable positioning result location IDs" for the location ID of a received positioning result.

How a positioning result is notified to the application in Example (G) will be described with reference to an arrangement example of positioning devices shown in FIG. 30 (*a*). G301, W301, and S301 are the coverages of positioning devices of a GNSS, Wi-Fi, and sound wave signal type, respectively. The location IDs of positioning results to be received from them are RG301, RW301, and RS301, respectively. Each circle drawn in FIG. 30 (*a*) schematically represents the coverage of each positioning device, and a rectangle schematically represents an area where coordinates are converted to Location ID RG301 (an actual coverage takes a complicated form due to various environmental factors, and may also vary depending on the receiving portable device). P301 through P305 are points of positioning (positions to which the portable device moves) to be used for description, which is given of a case where P301, P302, P303, P304, and P305 are moved through in this order in FIG. 30 (*a*). For convenience of description, suppose that a positioning result with a location ID indicated above each point of positioning is received at each point of positioning.

Figure 30:
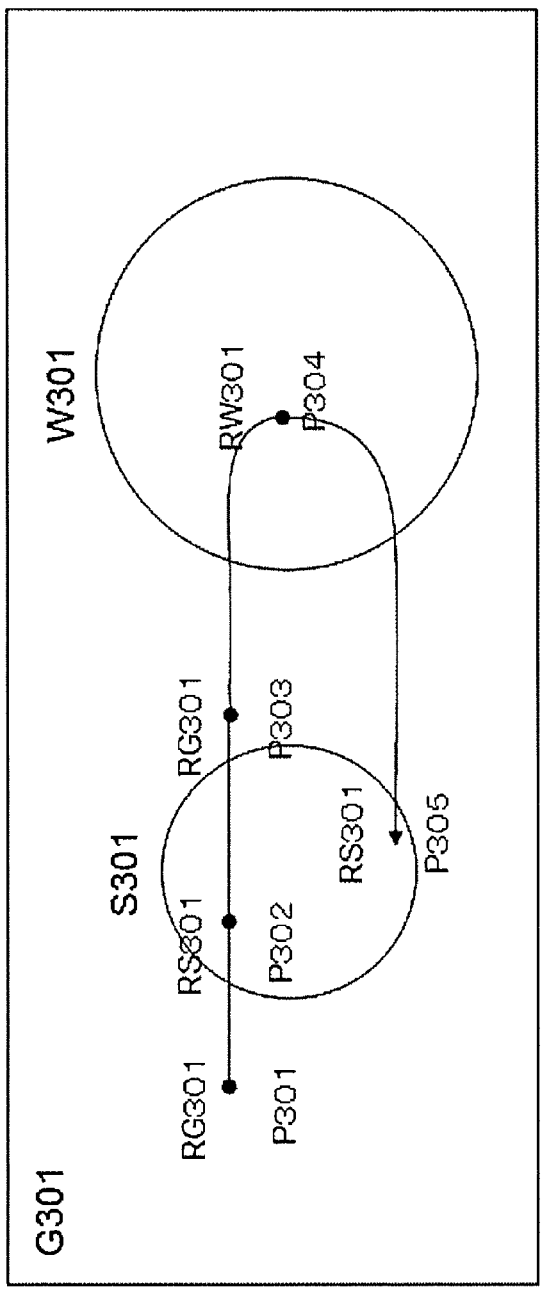
FIG. 30 illustrates Example (G)

FIG. 30 (*b*) shows data in the positioning device management master 175 to be used in Example (G). Latitude and Longitude represent the position of Location ID, and Level is set to 1 for RG301, to 2 for RW301, and to 3 for RS301. Time and distance do not cause positioning results to be deleted from the positioning history memory 165 in Example (G), and therefore there is no information on Valid period and Valid distance shown in FIG. 6. "List of acquirable positioning result location IDs" is a list of location IDs that can be received somewhere in the area where the relevant location ID can be received, and is used to, based on the location ID of a received positioning result, delete from the positioning history memory 165 a positioning result with a location ID that cannot be received.

In Example (G), a positioning result RG301 received at the point of positioning P301 is the first positioning result received after the start of positioning, while the positioning history memory 165 holds no positioning result, so it is notified to the application. The level of a positioning result RS301 received at the point of positioning P302 is 3, while the positioning history memory does not hold a positioning result whose level is 3 or higher, so it is notified to the application. A positioning result RG301 is received at the point of positioning P303, but is not notified to the application because the positioning history memory holds RG301. A positioning result RW301 is received at the point of positioning P304, where the positioning result RS301 that is not included in "List of acquirable positioning result location IDs" for Location ID RW301 (RG301 and RW301) is deleted from the positioning history memory 165. The received positioning result RW301 is notified to the application because it is not held in the positioning history memory 165. A positioning result RS301 is then received at the point of positioning P305, where the positioning result RW301 that is not included in "List of acquirable positioning result location IDs" for Location ID RS301 (RG301 and RS301) is deleted from the positioning history memory 165. The received positioning result RS301 is then notified to the application because it is not held in the positioning history memory.

If Example (B) is applied to the arrangement example in FIG. 30 (*a*), the positioning result RW301 received at the point of positioning P304 is not notified because the positioning history memory holds RS301 whose level is higher than that of RW311. The positioning result RS311 received at the point of positioning P315 is not notified because the positioning history memory holds RS311. In Example (G), on the other hand, the positioning results RW311 and RS311 received at the points of positioning P314 and P315, respectively, can be notified.

Example (G) allows for determining if, between departure from one coverage and return to the same, the portable device has passed through another coverage based on the presence or absence of notification at the time of the return (Examples (E) and (F), too, allow for the same thing). Suppose that there are two coverages α and β, which do not overlap each other. Now, suppose a case in which the portable device departs from the coverage α and returns back to α. "List of acquirable positioning result location IDs" for the location ID of α is set so as not to hold β, and "List of acquirable positioning result location IDs" for the location ID of β is set so as not to hold α. A positioning result α is received in the departure place, i.e. the coverage α, and therefore α is stored in the positioning history memory. If the portable device goes out of α and returns to α without passing through the coverage β, a positioning result α is received but is not notified because α is held in the positioning history memory. On the other hand, If the portable device goes out of the coverage α, passes through the coverage β, and returns to α, α is deleted from the positioning history memory when the portable device moves to the coverage β and receives a positioning result β because "List of acquirable positioning result location IDs" for the location ID of β does not hold α. The portable device then moves to the coverage α and receives a positioning result α, which is notified to the application because α is not held in the positioning history memory. As seen above, Example (E) allows notification to be provided when the portable device returns to the coverage α and only when it has gone out of α and has passed through β. A similar mechanism can also be created with Example (E), but it would be required to set the levels of α and β so as to satisfy β<α in Example (E). In contrast, the setting of the levels need not be taken into account in Example (G).

Example (G) can also be used to create a coverage where the positioning history memory can be cleared when a positioning result is received. Specifically, "List of acquirable positioning result location IDs" is set to (α), (β), (α, β, γ), and (α, β, δ) for coverages α, β, γ, and δ, respectively, and the level is set to 10, 30, 20, and 40 for the coverages α, β, γ, and δ, respectively. The coverages α and β are the coverages where the positioning history memory is cleared, and a description will be made of effects to be caused when the portable device moves to each coverage. First, the coverage α will be described. If the portable device moves to the coverage α and receives a positioning result α, α is stored in the positioning history memory after positioning results other than α in the positioning history memory are deleted. Then, if the portable device moves to the coverage γ, a positioning result γ is received and is notified to the application because it is higher in level than α. After that, if the portable device moves to the coverage δ, γ is deleted from the positioning history memory because "List of acquirable positioning result location IDs" for δ is (α, β, c), and the positioning result δ is notified because it is higher in level than α.

In the next place, the coverage β will be described. If the portable device moves to the coverage β and receives a positioning result β, the positioning result β is stored in the positioning history memory after positioning results other than β in the positioning history memory are deleted because "List of acquirable positioning result location IDs" for β is (β) . Then, if the portable device moves to the coverage γ, a positioning result γ is received but the received positioning result γ is not notified because it is lower in level than β. If the portable device moves to the coverage δ, a positioning result δ is received and is notified to the application because it is higher in level than β. As seen above, Example (G) can be used not only to create a coverage where the positioning history memory is cleared when a positioning result is received, but also to set for each coverage a limit to the priority of a positioning result to be notified after that.

(Example (H))

Example (H) is Example (E) implemented with the addition of a function to delete a positioning result from the positioning history memory 165 after a certain period of time has passed or a certain distance has been traveled. Example (E) deletes from the positioning history memory a positioning result whose level is higher than or equal to that of a received positioning result if the received positioning result is not held in the positioning history memory.

How a positioning result is notified to the application in Example (H) will be described with reference to an arrangement example of positioning devices shown in FIG. 31 (*a*). G311, W311, and S311 are the coverages of positioning devices of a GNSS, Wi-Fi, and sound wave signal type, respectively. The location IDs of positioning results to be received from them are RG311, RW311, and RS311, respectively. Each circle drawn in FIG. 31 (*a*) schematically represents the coverage of each positioning device, and a rectangle schematically represents an area where coordinates are converted to Location ID RG311 (an actual coverage takes a complicated form due to various environmental factors, and may also vary depending on the receiving portable device). P311 through P316 are points of positioning (positions to which the portable device moves) to be used for description, which is given of a case where P311, P312, P313, P314, P315, and P316 are moved through in this order in FIG. 31 (*a*). For convenience of description, suppose that a positioning result with a location ID indicated above each point of positioning is received at each point of positioning at the time indicated in parentheses below each label of point of positioning.

Figure 31:
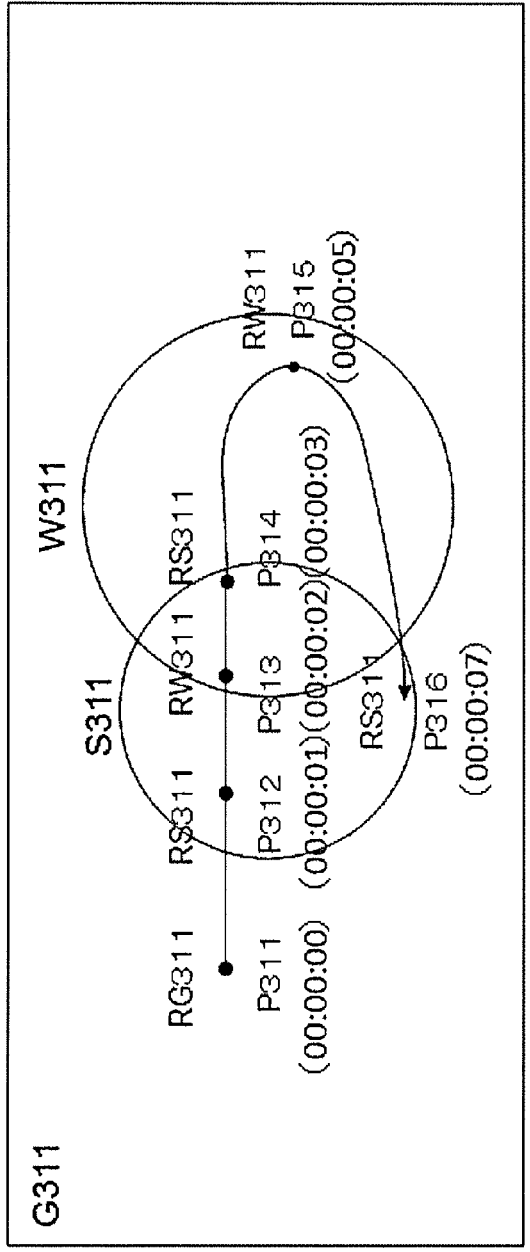
FIG. 31 illustrates Examples (H) and (H')

FIG. 31(*b*) shows data in the positioning device management master 175 to be used in Example (H). Latitude and Longitude represent the position of Location ID, and Level is set to 1 for RG311, to 2 for RW311, and to 3 for RS311. Valid period and Valid distance are values to be used to determine whether a positioning result held in the positioning history memory 165 can be deleted or not, and are used to be compared with the time elapsed since the time of positioning and with the distance between the position at the time of positioning and the current position, respectively. "List of acquirable positioning result location IDs" does not cause positioning results to be deleted from the positioning history memory 165, and therefore there is no such information shown in FIG. 6.

In Example (H), a positioning result RG311 received at the point of positioning P311 is the first positioning result received after the start of positioning, while the positioning history memory 165 holds no positioning result, so it is notified to the application. The level of a positioning result RS311 received at the point of positioning P312 is 3, while the positioning history memory does not hold a positioning result whose level is 3 or higher, so it is notified to the application. A positioning result RW311 is received at the point of positioning P313, while RW311 is not held in the positioning history memory 165, so the positioning result RS311 whose level of location ID is higher than that of RW311 is deleted from the positioning history memory 165, and the positioning result RW311 is notified to the application. A positioning result RS311 is received at the point of positioning P314, and is notified to the application because the positioning history memory does not hold a positioning result whose level of location ID is higher than or equal to that of RS311. A positioning result RW311 is received at the point of positioning P315, but is not notified because a positioning result whose Location ID is RW311 is held in the positioning history memory. On the way from the point of positioning P315 to P316, the positioning result RS311 held in the positioning history memory is deleted from the positioning history memory because the time elapsed since its time of positioning exceeds its valid period. A positioning result RS311 is also received at the point of positioning P316, and is notified to the application because the positioning history memory 165 does not hold a positioning result whose level of location ID is higher than or equal to that of RS311.

Unlike Example (E), Example (H) allows for deleting a positioning result of the highest level held in the positioning history memory after a certain period of time has passed or a certain distance has been traveled, and therefore allows for notifying of a positioning result with the same location ID as that of a deleted positioning result.

Example (H) allows for, even in a case where coverages having an identical location ID are scattered on a plurality of places, notifying of a positioning result received in each coverage if those coverage are made to be separately contained in other coverages. This effect is the same as that of Example (E), but is different therefrom in Example (H) in that a positioning result held in the positioning history memory can be deleted after a certain period of time has passed or a certain distance has been traveled since it was received for the last time, so that a positioning result notified once can be allowed to be notified again, for example, after an hour.

(Example (H)')

Example (H)') is a variation of Example (H), and is different therefrom in that the application is notified of a positioning result of the highest level in the positioning history memory when a positioning result is deleted from the positioning history memory in the timer process.

How a positioning result is notified to the application in Example (H)' will be described with reference to FIG. 31 used to describe Example (H).

Notification is provided by the same mechanism as in Example (H) between the points of positioning P311 and P315. On the way from the point of positioning P315 to P316, the positioning result RS311 held in the positioning history memory is deleted from the positioning history memory because the time elapsed since its time of positioning exceeds its valid period. RW311 is then notified to the application because a positioning result of the highest level held in the positioning history memory is RW311. A positioning result RS311 is received at the point of positioning P316, and is notified to the application because the positioning history memory 165 does not hold a positioning result whose level of location ID is higher than or equal to that of RS311.

In Example (H)', if a positioning result deleted from the positioning history memory after a certain period of time has passed or a certain distance has been traveled had the highest level in the history, a positioning result with a location ID whose level is the second highest is notified to the application. In Example (H), when a positioning result not held in the positioning history memory is received, a positioning result higher than that is deleted, so the positioning result notified by the mechanism described above is a once-notified positioning result, which means that the same positioning result may thus be notified twice.

Example (H)' allows for, even in a case where coverages having an identical location ID are scattered on a plurality of places, notifying of a positioning result received in each coverage if those coverage are made to be separately contained in other coverages. This effect is the same as that of Example (H), but in Example (H) a positioning result in a containing coverage can be notified again after a certain period of time has passed or a certain distance has been traveled. For example, suppose that there are two coverages α1 and α2, the location ID of which is identical, i.e. α, where the coverage α2 is set to be contained in another coverage β, and the levels of their location IDs are set so as to satisfy α>β. The valid periods of α and β are set to 60 seconds for α and to 90 seconds for β. With these settings, β can be notified again after 60 seconds have passed since a positioning result with Location ID α was received for the last time only if the coverage α2 has been passed through. The mechanism for providing the notification again will be described below. In the coverage α2, positioning results α2 and β are received and therefore are held in the positioning history memory finally. After that, if the portable device moves out of the coverage α2 and 60 seconds has passed since then, the positioning result α2 is deleted from the positioning history memory (except when the portable device has moved to the coverage α1 within the period of time). The level of β remaining in the positioning history memory is then the highest, and therefore the positioning result β is notified.

(Example (I))

Example (I) is Example (F) implemented with the addition of a function to delete a positioning result from the positioning history memory 165 after a certain period of time has passed or a certain distance has been traveled.

How a positioning result is notified to the application in Example (I) will be described with reference to an arrangement example of positioning devices shown in FIG. 32 (a). G321, W321, and S321 are the coverages of positioning devices of a GNSS, Wi-Fi, and sound wave signal type, respectively. The location IDs of positioning results to be received from them are RG321, RW321, and RS321, respectively. Each circle drawn in FIG. 32 (a) schematically represents the coverage of each positioning device, and a rectangle schematically represents an area where coordinates are converted to Location ID RG321 (an actual coverage takes a complicated form due to various environmental factors, and may also vary depending on the receiving portable device). P321 through P326 are points of positioning (positions to which the portable device moves) to be used for description, which is given of a case where P321, P322, P323, P324, P325, and P326 are moved through in this order in FIG. 32 (a). For convenience of description, suppose that a positioning result with a location ID indicated above each point of positioning is received at each point of positioning. Though two S321 are placed, they can be distinguished from each other based on whether RW321 is held in the history or not when a positioning result RS321 is received, since S321 on the left side is contained in W321.

Like Example (F), Example (I) has an implementation to refer to the positioning device management master to delete from the positioning history memory 165 a positioning result that is not included in "List of acquirable positioning result location IDs" for the location ID of a received positioning result. This implementation, however, does not work in the present arrangement example, since there is no difference in location ID in "List of acquirable positioning result location IDs" as shown in the positioning device management master described below.

Figure 32:
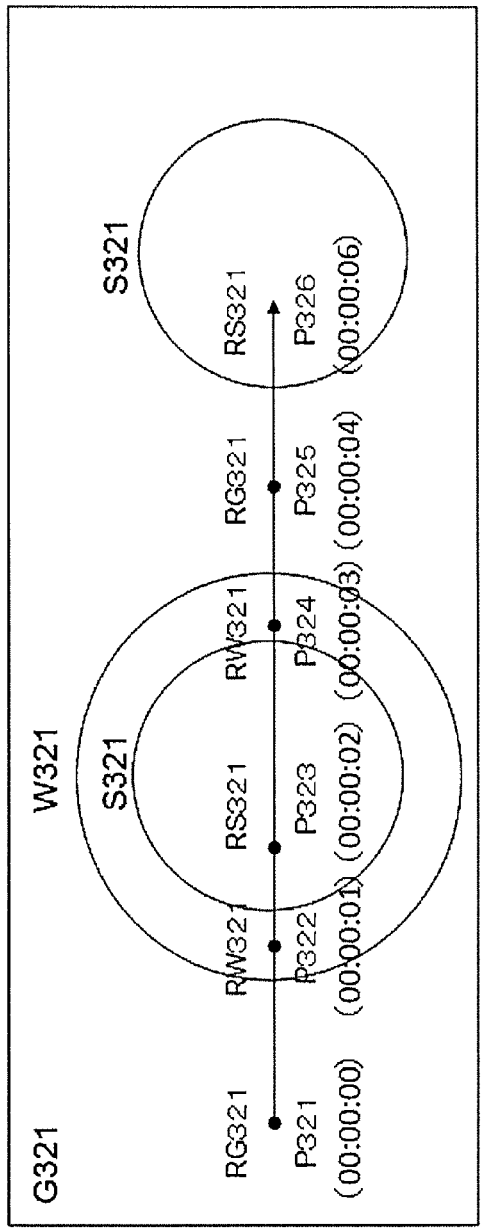
FIG. 32 illustrates Example (I)

FIG. 32 (b) shows data in the positioning device management master 175 to be used in Example (I). Latitude and Longitude represent the position of Location ID, and Level is set to 1 for RG321, to 2 for RW321, and to 3 for RS321. Valid period and Valid distance are values to be used to determine whether a positioning result held in the positioning history memory 165 can be deleted or not, and are used to be compared with the time elapsed since the time of positioning and with the distance between the position at the time of positioning and the current position, respectively. "List of acquirable positioning result location IDs" is a list of location IDs that can be received somewhere in the area where the relevant location ID can be received, and is used to, based on the location ID of a received positioning result, delete from the positioning history memory 165 a positioning result with a location ID that cannot be received. RS321 exists in two places, and therefore Latitude and Longitude are not set to specific values.

In Example (I), a positioning result RG321 received at the point of positioning P321 is the first positioning result received after the start of positioning, while the positioning history memory 165 holds no positioning result, so it is notified to the application. A positioning result RW321 received at the point of positioning P322 is notified to the application because it is not held in the positioning history memory 165. A positioning result RS321 is received at the point of positioning P323, and is notified to the application because RS321 is not held in the positioning history memory. A positioning result RW321 is received at the point of positioning P324, but is not notified because RW321 is held in the positioning history memory. RG321 received at the next point of positioning P325 also is not notified because it is held in the positioning history memory.

On the way from the point of positioning P325 to P326, the positioning result RS321 held in the positioning history memory is deleted from the positioning history memory because the time elapsed since its time of positioning exceeds its valid period of 3.0 seconds. A positioning result RS321 is received at the point of positioning P326, and is notified to the application because RS321 is not held in the positioning history memory.

Example (F) allows for notifying of the same positioning result as previously received one by deleting from the positioning history memory a positioning result that is not included in List of acquirable positioning result location IDs for the location ID of a received positioning result. On the other hand, Example (I) allows for notifying of the same positioning result as previously received one even when a positioning result is not deleted from the positioning history memory based on "List of acquirable positioning result location IDs," since Example (I) allows for deleting a positioning result of the highest level held in the positioning history memory after a certain period of time has passed or a certain distance has been traveled.

Like Example (F), Example (I) allows for notifying of a positioning result received in a coverage each time it is received even if there are a plurality of coverages that are assigned with different levels. Example (F), however, would not allow for notifying of a received positioning result if the portable device moved from the inside to the outside of a coverage and has returned again to the same coverage. In Example (I), since a positioning result is deleted from the positioning history memory after a certain period of time has passed or a certain distance has been traveled since the positioning result was received for the last time, a received positioning result can be notified if the portable device moved out of a coverage and then returned to the coverage after a certain period of time had passed or a certain distance had been traveled.

(Example (J))

Example (J) is Example (G) implemented with the addition of a function to delete a positioning result from the positioning history memory 165 after a certain period of time has passed or a certain distance has been traveled.

How a positioning result is notified to the application in Example (J) will be described with reference to an arrangement example of positioning devices shown in FIG. 33 (a). G331, W331, W332, and S331 are the coverages of positioning devices of a GNSS, Wi-Fi, Wi-Fi, and sound wave signal type, respectively. The location IDs of positioning results to be received from them are RG331, RW331, RW332, and RS331, respectively. Each circle drawn in FIG. 33 (a) schematically represents the coverage of each positioning device, and a rectangle schematically represents an area where coordinates are converted to Location ID RG331 (an actual coverage takes a complicated form due to various environmental factors, and may also vary depending on the receiving portable device). P331 through P336 are points of positioning (positions to which the portable device moves) to be used for description, which is given of a case where P331, P332, P333, P334, P335, and P336 are moved through in this order in FIG. 33 (a). For convenience of description, suppose that a positioning result with a location ID indicated above each point of positioning is received at each point of positioning. Though two S331 are placed, they can be distinguished from each other based on whether either RW331 or RW332 is held in the history or not when a positioning result RS331 is received, since S331 on the left side is contained in W331 and S331 on the right side is contained in W332.

Like Example (G), Example (J) has an implementation to refer to the positioning device management master to delete from the positioning history memory a positioning result that is not included in "List of acquirable positioning result location IDs" for the location ID of a received positioning result. This implementation, however, does not work, since there is no difference in location ID in "List of acquirable positioning result location IDs" as shown in the positioning device management master described below.

Figure 33:
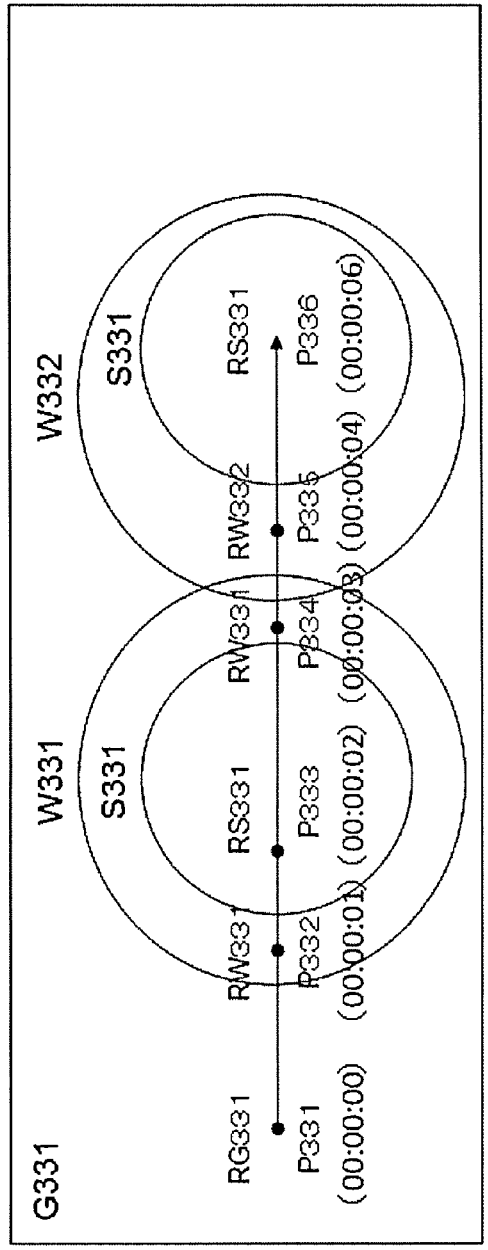
FIG. 33 illustrates Examples (J) and (J')

FIG. 33 (b) shows data in the positioning device management master 175 to be used in Example (J). Latitude and Longitude represent the position of Location ID, and Level is set to 1 for RG331, to 2 for RW331 and RW332, and to 3 for RS331. Valid period and Valid distance are values to be used to determine whether a positioning result held in the positioning history memory 165 can be deleted or not, and are used to be compared with the time elapsed since the time of positioning and with the distance between the position at the time of positioning and the current position, respectively. "List of acquirable positioning result location IDs" is a list of location Ds that can be received somewhere in the area where the relevant location ID can be received, and is used to, based on the location ID of a received positioning result, delete from the positioning history memory 165 a positioning result with a location ID that cannot be received. RS331 exists in two places, and therefore Latitude and Longitude are not set to specific values.

In Example (J), a positioning result RG331 received at the point of positioning P331 is the first positioning result received after the start of positioning, while the positioning history memory 165 holds no positioning result, so it is notified to the application. The level of a positioning result RW331 received at the point of positioning P332 is 2, while the positioning history memory 165 does not hold a positioning result with a location ID whose level is 2 or higher, so it is notified to the application. A positioning result RS331 is received at the point of positioning P333, and is notified to the application because the positioning history memory 165 does not hold a positioning result with a location ID whose level is higher than or equal to that of RS331, i.e. 3. A positioning result RW331 is received at the point of positioning P334, but is not notified because RW331 is held in the positioning history memory. A positioning result RW332 is received at the point of positioning P335, but is not notified because the positioning history memory 165 holds the positioning result, RS331, with a location ID whose level is higher than or equal to that of RW332, i.e. 2.

On the way from the point of positioning P335 to P336, the positioning result RS331 held in the positioning history memory is deleted from the positioning history memory 165 because the time elapsed since its time of positioning exceeds its valid period of 3.0 seconds. A positioning result RS331 is received at the point of positioning P336, and is notified to the application because the positioning history memory does not hold a positioning result with a location ID whose level is higher than or equal to that of RS331, i.e. 3.

Example (G) allows for notifying of the same positioning result as previously received one by deleting from the positioning history memory a positioning result that is not included in List of acquirable positioning result location IDs for the location ID of a received positioning result. On the other hand, Example (J) allows for notifying of the same positioning result as previously received one even when a positioning result is not deleted from the positioning history memory based on "List of acquirable positioning result location IDs," since Example (J) allows for deleting a positioning result of the highest level held in the positioning history memory after a certain period of time has passed or a certain distance has been traveled.

Like Example (G), Example (J) allows for creating a coverage where the positioning history memory can be cleared when a positioning result is received. While the conditions on the levels of positioning results for notification can be set in Example (G), those conditions can be invalidated in Example (J) after a certain period of time has passed or a certain distance has been traveled. Specifically, "List of acquirable positioning result location IDs" is set to (α), (β), and (α, β, γ) for coverages α, β, and γ, respectively, the level is set, for example, to 10, 30, and 20 for the coverages α, β, and γ, respectively, and the valid period is set to 60 seconds, 60 seconds, and 30 seconds for the coverages α, β, and γ, respectively. With these settings, while a received positioning result γ would not be notified immediately after the portable device moves from the coverage β to the coverage γ because γ is lower in level than δ, a received positioning result γ could be notified if the portable device has stayed in a place other than the coverage β for 60 seconds or more because β is deleted from the positioning history memory.

(Example (J)')

Example (J)' is a variation of Example (J), and is different therefrom in that the application is notified of a positioning result of the highest level held in the positioning history memory 165 after a positioning result is deleted from the positioning history memory in the timer process.

How a positioning result is notified to the application in Example (J)' will be described with reference to FIG. 33 used to describe Example (J).

Notification is provided by the same mechanism as in Example (J) between the points of positioning P331 and P335. After that, on the way from the point of positioning P335 to P336, the positioning result RS331 held in the positioning history memory is deleted from the positioning history memory 165 because the time elapsed since its time of positioning exceeds its valid period of 3.0 seconds. After the deletion, RS332 is the positioning result of the highest level held in the positioning history memory, and is therefore notified to the application. A positioning result RS331 is received at the point of positioning P336, and is notified to the application because the positioning history memory does not hold a positioning result whose level is higher than or equal to that of the positioning result RS331, i.e. 3.

When a positioning result of a high level is deleted in Example (J), a positioning result of the next highest level is notified in Example (J)'. The positioning history memory 165 in Example (J) may hold a received positioning result without notification because of its low priority, while in Example (J)' such a positioning result can be notified to the application.

Like Example (J), Example (J)' allows for creating a coverage where the positioning history memory can be cleared when a positioning result is received. The conditions on the levels of positioning results for notification are just invalidated after a certain period of time has passed or a certain distance has been traveled in Example (J), whereas in Example (J)' a positioning result of the highest level in the positioning history memory is notified after the invalidation. Specifically, "List of acquirable positioning result location IDs" is set to (α), (β), and (α, β, γ) for coverages α, β, and γ, respectively, the level is set to 10, 30, and 20 for the coverages α, β, and γ, respectively, and the valid period is set to 60 seconds, 60 seconds, and 30 seconds for the coverages α, β, and γ, respectively. With these settings, a received positioning result γ would not be notified immediately after the portable device moves from the coverage β to the coverage γ because γ is lower in level than β, whereas if the portable device has stayed in a place other than the coverage β for 60 seconds or more, the positioning result β is deleted from the positioning history memory and a positioning result γ is notified even if a positioning result γ is not received.

(Example (K))

Example (K) is a combination of two examples, Examples (E) and (F), and two ways are used in it as the method of deleting a positioning result from the positioning history memory 165, which are: a method in which a positioning result whose level is higher than that of a received positioning result is deleted from the positioning history memory if the received positioning result is not held in the positioning history memory; and a method in which a positioning result that is not included in "List of acquirable positioning result location IDs" for the location ID of a received positioning result is deleted from the positioning history memory 165. Notification is provided when a received positioning result is not held in the positioning history memory 165.

How a positioning result is notified to the application in Example (K) will be described with reference to an arrangement example of positioning devices shown in FIG. 34 (*a*). G341, W341, S341, and S342 are the coverages of positioning devices of a GNSS, Wi-Fi, sound wave signal, and sound wave signal type, respectively. The location IDs of positioning results to be received from them are RG341, RW341, RS341, and RS342, respectively. Each circle drawn in FIG. 34 (*a*) schematically represents the coverage of each positioning device, and a rectangle schematically represents an area where coordinates are converted to Location ID RG341 (an actual coverage takes a complicated form due to various environmental factors, and may also vary depending on the receiving portable device). P341 through P348 are points of positioning (positions to which the portable device moves) to be used for description, which is given of a case where P341, P342, P343, P344, P345, P346, P347, and P348 are moved through in this order in FIG. 34 (*a*). For convenience of description, suppose that a positioning result with a location ID indicated above each point of positioning is received at each point of positioning.

Figure 34:
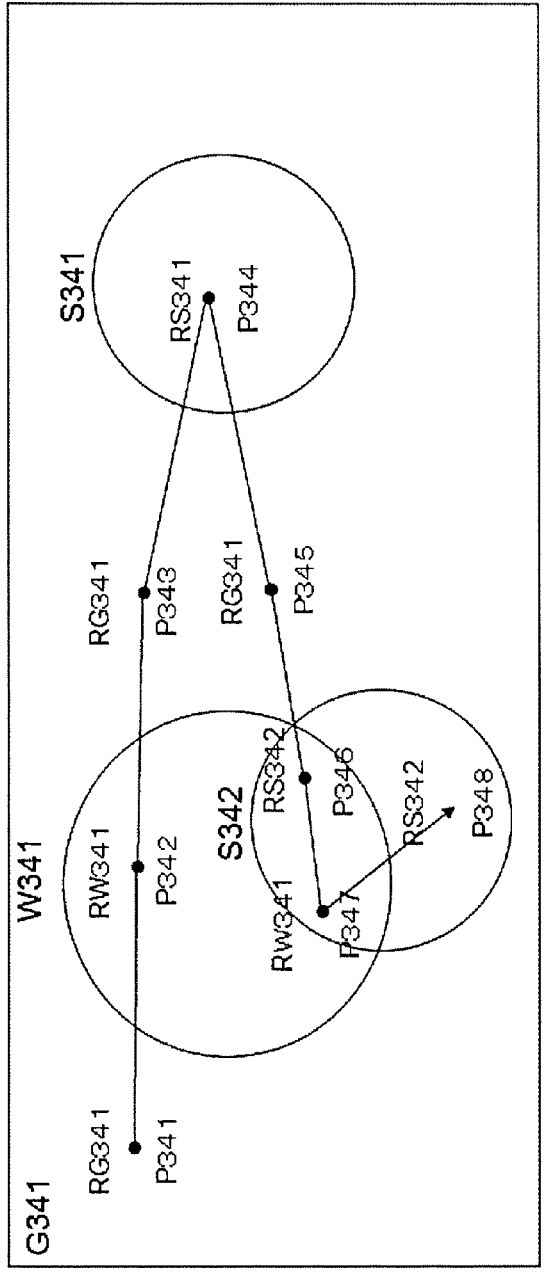
FIG. 34 illustrates Examples (K) and (L)

FIG. 34 (*b*) shows data in the positioning device management master 175 to be used in Example (K). Latitude and Longitude represent the position of Location ID, and Level is set to 1 for RG341, to 2 for RW341, and to 3 for RS351 and RS352. Time and distance do not cause positioning results to be deleted from the positioning history memory 165 in Example (K), and therefore there is no information on Valid period and Valid distance shown in FIG. 6. "List of acquirable positioning result location IDs" is a list of location IDs that can be received somewhere in the area where the relevant location ID can be received, and is used to, based on the location ID of a received positioning result, delete from the positioning history memory 165 a positioning result with a location ID that cannot be received.

In Example (K), a positioning result RG341 received at the point of positioning P341 is the first positioning result received after the start of positioning, while the positioning history memory 165 holds no positioning result, so it is notified to the application. A positioning result RW341 is received at the point of positioning P342, and is notified to the application because the positioning history memory 165 does not hold a positioning result with Location ID RW341.

A positioning result RG341 is received at the point of positioning P343, but is not notified to the application because the positioning history memory 165 holds a positioning result with Location ID RG341.

When a positioning result RS341 is received at the point of positioning P344, the positioning result RW341 is deleted from the positioning history memory since it is not included in "List of acquirable positioning result location IDs" for Location ID RS341 (RG341 and RS341), and RS341 is notified to the application. A positioning result RG341 is received at the next point of positioning P345, but is not notified because the positioning history memory 165 holds a positioning result with Location ID RG341.

When a positioning result RS342 is received at the point of positioning P346, the positioning result RS341 is deleted from the positioning history memory since it is not included in "List of acquirable positioning result location IDs" for Location ID RS342 (RG341, RW341, and RS342), and RS342 is notified to the application.

A positioning result RW341 is received at the point of positioning P347, while a positioning result with Location ID RW341 is not held in the positioning history memory, so the positioning result RS342 is deleted from the positioning history memory since it is higher in level than RW341, and RW341 is notified to the application. A positioning result RS342 is received at the point of positioning P348, and is notified to the application because RS342 is not held in the positioning history memory.

If Example (E) is applied to the present arrangement example, the positioning result RW341 received at the point of positioning P347 is not notified because it is held in the positioning history memory. The positioning result RS342 received at the point of positioning P348 also is not notified because it is held in the positioning history memory. If Example (F) is applied to the present arrangement example, on the other hand, the positioning result RW341 is received at the point of positioning P347 but RS342 held in the positioning history memory is not deleted, so the positioning result RS342 received at the point of positioning P348 is not notified.

As described above, even in an arrangement where coverages densely arranged to overlap one another and coverages isolated from one another are mixed together, Example (K) allows for deleting a probably invalid positioning result from among those held in the positioning history memory to notify of a more appropriate positioning result.

Example (K) allows for, even in a case where coverages having an identical location ID are scattered on a plurality of places, receiving and notifying of those positioning results. This is the same as Example (E). Example (K) additionally allows for, even in a case where coverages of different levels are scattered and mixed, receiving and notifying of their respective positioning results. Specifically, suppose that there are coverages α1, α2, β, γ, and δ, where α1 and α2 have identical Location ID α, and α1 and α2 are contained in β and γ, respectively. As for the levels of the Location IDs, α, β, and γ are set to satisfy α>β and α>γ, and β, γ, and δ are set to be different from one another. "List of acquirable positioning result location IDs" is set to (α, β, γ), (α, β), (α, γ), and (δ) for α, β, γ, and δ, respectively. First, the portable device moves to the coverage α1, where positioning results α1 and β are received and are stored in the positioning history memory. The portable device then moves to the coverage α2, where positioning results γ and α2 are received. When the positioning result γ is received, the positioning result β is deleted from the positioning history memory because "List of acquirable positioning result location IDs" for the positioning result γ is (α, γ). Since the positioning result γ is not held in the positioning history memory, α, which is higher in level than the positioning result γ, is deleted from the positioning history memory. Consequently, the received positioning results γ and α2 are notified. The portable device then moves to the coverage δ, where α and γ in the positioning history memory are deleted because "List of acquirable positioning result location IDs" for Location ID δ is (δ). Consequently, the received positioning result δ is notified. The same thing cannot be done in Example (E) unless the levels of β, γ, and δ are set to be identical. As seen above, even in a case where a plurality of coverages with an identical location ID and coverages with location IDs that are different from it are mixed together, a positioning result received in each coverage is allowed to be notified each time it is received.

(Example (L))

Example (L) is a combination of two examples, Examples (E) and (G), and two ways are used in it as the method of deleting a positioning result from the positioning history memory 165, which are: a method in which a positioning result whose level is higher than that of a received positioning result is deleted from the positioning history memory 165 if the received positioning result is not held in the positioning history memory; and a method in which a positioning result that is not included in "List of acquirable positioning result location IDs" for the location ID of a received positioning result is deleted from the positioning history memory 165. Notification is provided when the level of location ID of a received positioning result is higher than or equal to the highest level of positioning results in the positioning history memory and the received positioning result is not held in the positioning history memory 165.

How a received positioning result is notified to the application in Example (L) will be described with reference to FIG. 34 used in Example (K).

In Example (L), a positioning result RG341 received at the point of positioning P341 is the first positioning result received after the start of positioning, while the positioning history memory 165 holds no positioning result, so it is notified to the application. A positioning result RW341 is received at the point of positioning P342, and is notified to the application because the positioning history memory 165 does not hold a positioning result with a location ID whose level is higher than or equal to that of Location ID RW341, i.e. 2. A positioning result RG341 is received at the point of positioning P343, but is not notified to the application because the positioning history memory 165 holds a positioning result with Location ID RG341.

A positioning result RS341 is received at the point of positioning P344, while "List of acquirable positioning result location IDs" for Location ID RS341 is "RG341 and RS341," so the positioning result RW341 is deleted from the positioning history memory and RS341 is notified to the application. A positioning result RG341 is received at the point of positioning P345, but is not notified because the positioning history memory 165 holds a positioning result with Location ID RG341.

When a positioning result RS342 is received at the point of positioning P346, the positioning result RS341 is deleted from the positioning history memory since it is not included in "List of acquirable positioning result location IDs" for Location ID RS342 (RG341, RW341, and RS342). After the deletion, RS342 is notified to the application because the positioning history memory does not hold a positioning result whose level is higher than or equal to that of the positioning result RS342, i.e. 3.

A positioning result RW341 is received at the point of positioning P347, while a positioning result with Location ID RW341 is not held in the positioning history memory, so the positioning result RS342 is deleted from the positioning history memory since it is higher in level than RW341, and RW341 is notified to the application. A positioning result RS342 is received at the point of positioning P348, and is notified to the application because the positioning history memory does not hold a positioning result whose level is higher than or equal to that of the positioning result RS342, i.e. 3.

If Example (E) is applied to the present arrangement example, the positioning result RW341 received at the point of positioning P347 is not notified because it is held in the positioning history memory. The positioning result RS342 received at the point of positioning P348 also is not notified because it is held in the positioning history memory. If Example (G) is applied to the present arrangement example, on the other hand, the positioning result RW341 is received at the point of positioning P347, but is not notified because the positioning history memory holds the positioning result RS342 whose level is higher than that of RW341, i.e. 2. In addition, the positioning result RS342 received at the point of positioning P348 also is not notified because it is held in the positioning history memory.

As described above, even in an arrangement where coverages densely arranged to overlap one another and coverages isolated from one another are mixed together, Example (L) allows for deleting a probably invalid positioning result from among those held in the positioning history memory to notify of a more appropriate positioning result.

Based on the operation of each working example illustrated above and according to a service to be provided by the application, the design can be worked out on how to distribute multiple positioning devices, how to assign a level to each positioning device, and which working example to operate with the positioning library.

Like Example (K), Example (L) can be used to, even in a case where coverages having an identical location ID are scattered on a plurality of places, notify of those positioning results each time they are received.

As with the effect of Example (G), Example (L) allows for creating a coverage where the positioning history memory can be cleared when a positioning result is received. While in Example (G) restriction on the priorities of positioning results to be notified can be set for the coverage where the positioning history memory is cleared, all those settings of the priorities are invalidated in Example (L), so whether to restrict the priorities or not can be changed just by switching between the working examples with the same settings.

(Application Example 1 Related to the Positioning Device Management Master)

A portable device with an application for providing a service based on positional information sometimes cannot use the same positioning means as that used by another model because of the portable device not having the same positioning means or being less accurate or sensitive than required by the application.

As described in Step 3550 in Process example 1 in FIG. 5, Process example 2 in FIG. 12, Process example 3 in FIG. 16, and Process example 4 in FIG. 20, whether to use a positioning result or not can be changed in the embodiment described above if data contents to be stored as the positioning device management master 175 are limited to part of the arranged multiple positioning devices and which part to store is varied for each application. If those different positioning device management masters are not used for different applications but for different portable device models, portable devices whose available positioning means are different from one another are allowed to equally use an identical application.

A description will be made with reference to FIG. 35 on how portable devices whose available positioning means are different from one another are allowed to use an identical application by the use of different positioning device management masters. Example (A) will be used in this description. Suppose that the portable devices are of: Model (A) with positioning means of a GNSS, Wi-Fi, iBeacon, and sound wave signal type; and Model (B) with positioning means of a GNSS, Wi-Fi, and sound wave signal type but without that of an iBeacon type.

Figure 35:
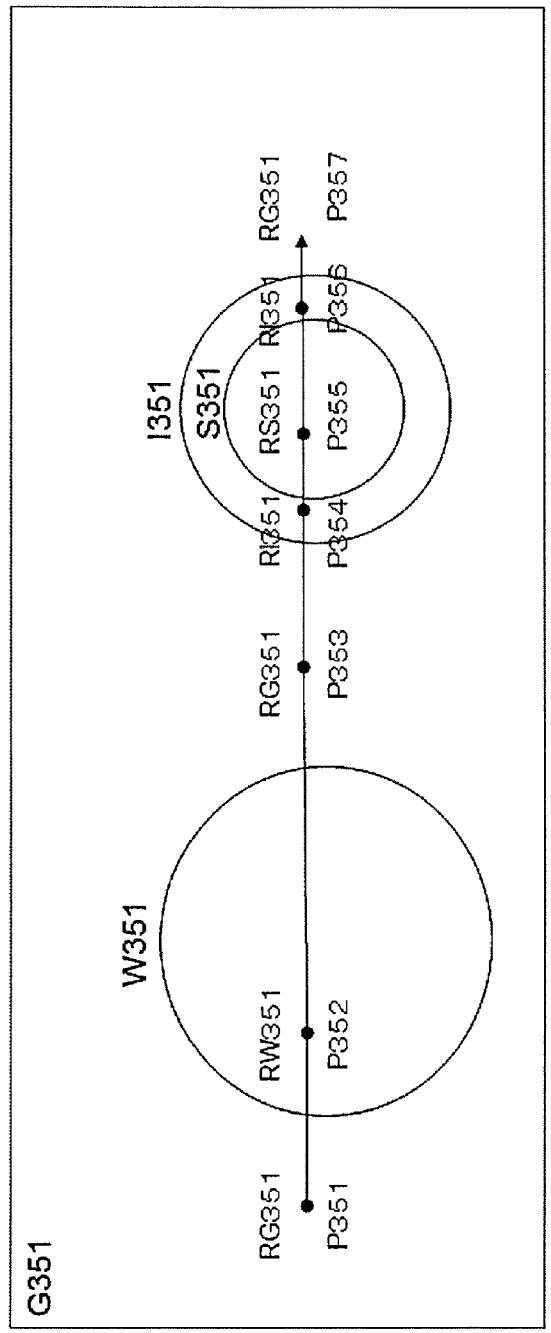
FIG. 35 illustrates an application example in which devices of different models receive service provision.

FIG. 35 (a) shows an arrangement example of positioning devices. G351, W351, S351, and I351 are the coverages of positioning devices of a GNSS, Wi-Fi, sound wave signal, and iBeacon type, respectively. The location IDs of positioning results to be received from them are RG351, RW351, RS351, and RI351, respectively. Each circle drawn in FIG. 35 (a) schematically represents the coverage of each positioning device, and a rectangle schematically represents an area where coordinates are converted to Location ID RG351 (an actual coverage takes a complicated form due to various environmental factors, and may also vary depending on the receiving portable device). The coverage S351 is located within the coverage I351. P351 through P357 are points of positioning (positions to which the portable device moves) to be used for description, which is given of a case where P351, P352, P353, P354, P355, P356, and P357 are moved through in this order in FIG. 35 (a). For convenience of description, suppose that a positioning result with a location ID indicated above each point of positioning is received at each point of positioning.

FIGS. 35 (b) and (c) show data in the positioning device management master 175 to be used in this description. Latitude and Longitude represent the position of Location ID, and Level (the type of positioning device or the priority of positioning result) is set to 1 for RG351, to 2 for RW351, to 3 for RS351, and to 3 for RI351. The positions of RS351 and RI351 are set to an identical value. Time and distance do not cause positioning results to be deleted from the positioning history memory 165 in Example (A), and therefore there is no information on Valid period and Valid distance shown in FIG. 6. "List of acquirable positioning result location IDs" also does not cause positioning results to be deleted from the positioning history memory 165, and therefore there is no such information shown in FIG. 6. Data in the positioning device management master in FIG. 35 (b) has the location ID to be received from the positioning device of an iBeacon type, but data in FIG. 35 (c) does not.

Suppose that the portable device of Model (A) downloads FIG. 35 (b) from the positioning information management server as data for the positioning device management master 175. Suppose that the portable device of Model (B) downloads FIG. 35 (c) from the positioning information management server as data for the positioning device management master. The switching between data for the positioning device management master depending on model is done in a way that the portable device transmits information indicating its model when requesting positioning device management master data from the positioning information management server, and the positioning information management server sends back positioning device management master data corresponding to the model. As an alternative, the application may be given with different positioning device management masters for different models in advance, and data in a positioning device management master corresponding to a model may be passed to the positioning library. As another alternative, the positioning library may have different sets of positioning device management master data for different models, and positioning device management master data corresponding to a model may be used.

A case where the portable device of Model (A) is used will be described. After the application starts, Model (A) first receives a positioning result RG351 at the point of positioning P351. RG351 is the first positioning result received after the start of positioning, and is therefore notified to the application. A positioning result RW352 is received at the point of positioning P352, and is notified to the application because it is not held in the positioning history memory 165. A positioning result RG351 is received at the point of positioning P353, but is not notified to the application because it is held in the positioning history memory. A positioning result RI351 is received at the point of positioning P354, and is notified to the application because it is registered on the positioning device management master (FIG. 35 (*b*)) and is not held in the positioning history memory. A positioning result RS351 is received at the point of positioning P355, but is discarded because it is not registered on the positioning device management master. A positioning result RI351 is received at the point of positioning P356, but is not notified to the application because it is held in the positioning history memory. A positioning result RG351 is received at the point of positioning P357, but is not notified to the application because it is held in the positioning history memory.

A case where the portable device of Model (B) is used will be described next. After the application starts, Model (B) first receives positioning results at the point of positioning P351 through P353 and notifies the application of them as with Model (A). The point of positioning P354 is a point of positioning where a positioning result RI351 can be received, but Model (B) does not receive RI351 because it does not have positioning means of an iBeacon type. A positioning result RS351 is received at the point of positioning P355, and is notified to the application because it is registered on the positioning device management master and is not held in the positioning history memory. A positioning result RI351 is received at the point of positioning P356, but is not notified to the application because of the same reason as the point of positioning P354. A positioning result RG351 is received at the point of positioning P357, but is not notified to the application because it is held in the positioning history memory. As seen above, even models with different positioning means are allowed to use one application likewise if different positioning device management masters are properly used.

(Application Example 2 Related to the Positioning Device Management Master)

Figure 36:
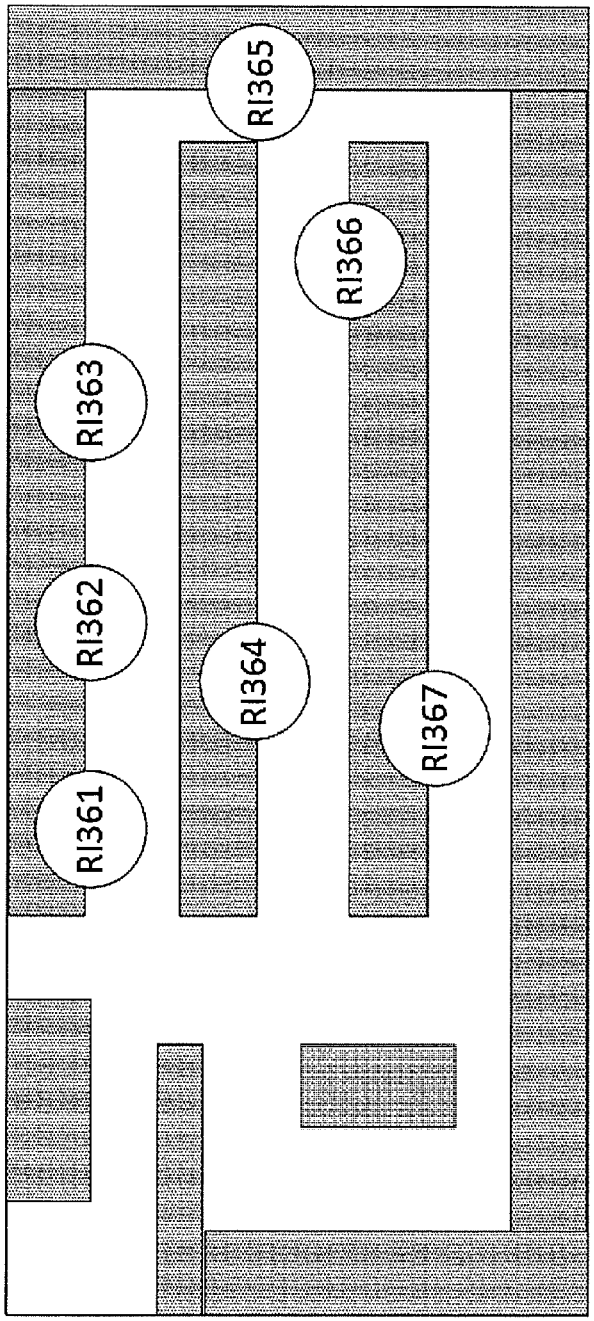
FIG. 36 illustrates an application example in which services are provided based on different pieces of positional information.

Different services based on different pieces of positional information can be provided in an identical area by using different sets of data for the positioning device management master 175. FIG. 36 (*a*) shows an arrangement example of positioning devices in a store. FIGS. 36 (*b*) and (*c*) are sets of data for the positioning device management master for classes of the likes and tastes (A) and (B), respectively. For example, in a case where a customer in a store is led to answer a questionnaire on the likes and tastes and a positional information service is provided based on that, the customer's likes and tastes are classified into the two of (A) and (B) based on the customer's answer data, and the positioning device management master 175 corresponding to the classification result is caused to be downloaded from the positioning information management server 300. The portable device randomly receives positioning results in the store but is notified only of positioning results that are registered on the positioning device management master, so the user can only receive services based on positioning results classified into the user's likes and tastes. A common service may be provided for the two classes. This can be done easily by including a location ID in both of the classes (A) and (B) as with Location ID RI361 in (b) and (c) in FIG. 36.

(Application Example of Preventing Fabrication)

When a service is provided based on positional information, there may be a case in which a malicious user manipulates positioning means of a portable device using software to give the appearance that the portable device stays in another position than where it actually stays, or a case in which a malicious user records and replays a signal received from a positioning device to give the appearance that the portable device is located where the positioning device is located. Such positional fabrication can be rendered impractical in the present example by making it a condition for notification of a positioning result that positioning results of a plurality of positioning means are held in the positioning history memory 165, or by making it impossible to notify of a positioning result unless positioning results are received in a predetermined order.

Figure 37:
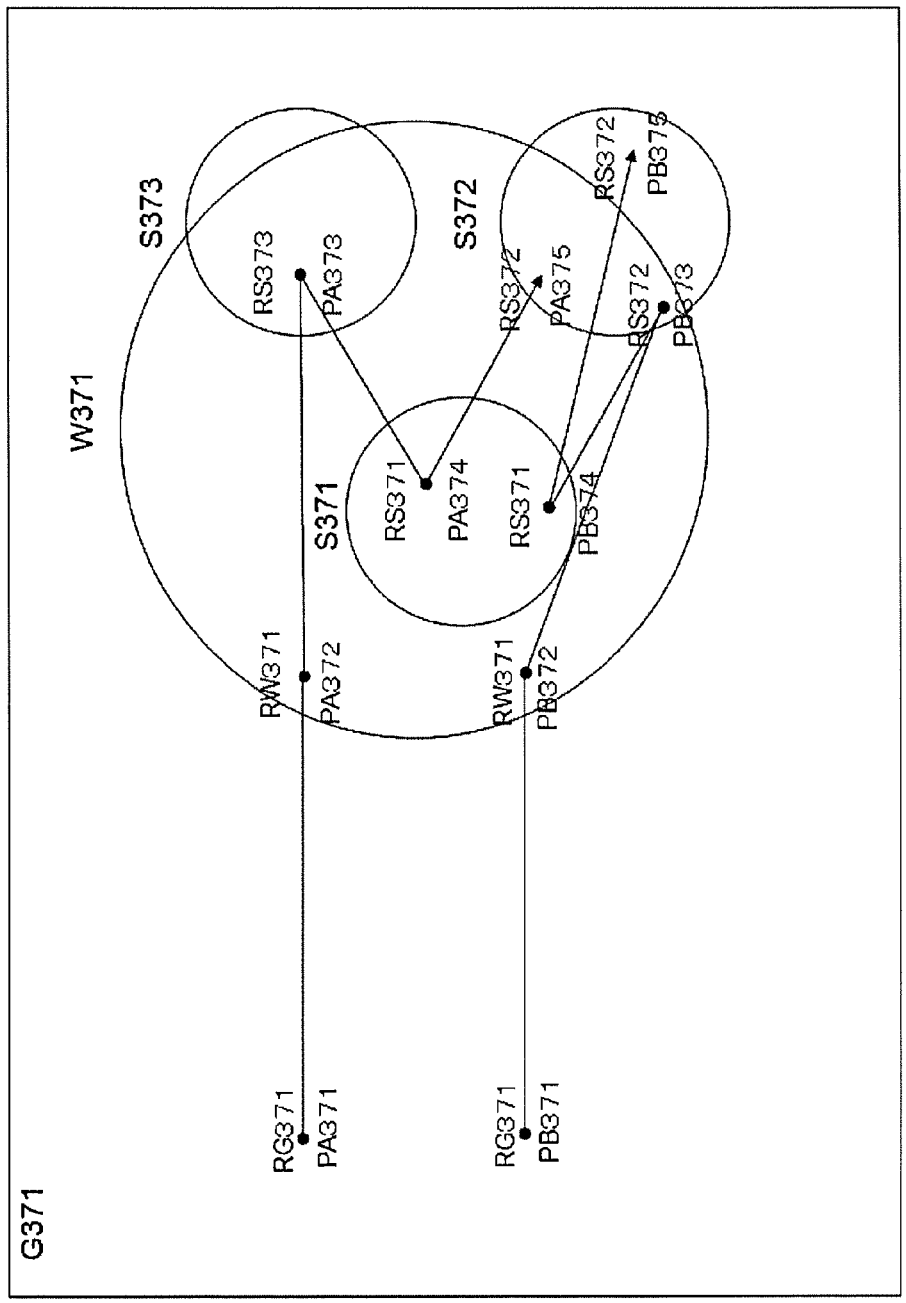
FIG. 37 shows an example of arranging positioning devices to illustrate an application example to preventing fabrication.

FIG. 37 shows an arrangement example of coverages of positioning devices to be used for description. G371, W371, S371, S372, and S373 are the coverages of positioning devices of a GNSS, Wi-Fi, sound wave signal, sound wave signal, and sound wave signal type, respectively. The location Ds of positioning results to be received from them are RG371, RW371, RS371, RS372, and RS373, respectively. Each circle drawn in FIG. 37 schematically represents the coverage of each positioning device, and a rectangle schematically represents an area where coordinates are converted to Location ID RG371 (an actual coverage takes a complicated form due to various environmental factors, and may also vary depending on the receiving portable device). PA371 through PA375 and PB371 through PB375 are points of positioning (positions to which the portable device moves) to be used for description, which is given of two courses in FIG. 37, i.e. a course in which PA371, PA372, PA373, PA374, and PA375 are moved through in this order and a course in which PB371, PB372, PB373, PB374, and PB375 are moved through in this order. For convenience of description, suppose that a positioning result with a location ID indicated above each point of positioning is received at each point of positioning.

FIGS. 38 and 39 show data in the positioning device management master 175 to be used in this description. Latitude and Longitude represent the position of Location ID, and Level (the type of positioning device or the priority of positioning result) is set to 1 for RG371, to 2 for RW371, to 3 for RS371, to 4 for RS372, and to 5 for RS373. A received positioning result is discarded without being processed or is notified to the application in this example based on whether a positioning result is held in the positioning history memory or not, so it is required for the positioning history memory to be able to hold positioning results. Specifically, different values are assigned to the levels of RS371, RS372, and RS373 so that they can be held in the positioning history memory at the same time. Example (A) is used in this example, and therefore there is no information on Valid period, Valid distance, and "List of acquirable positioning result location IDs." If another working example than Example (A) is used, it is required to add necessary data according to the working example. As described later in FIGS. 40 and 41, the data in FIG. 38 has "List of positioning results required for notification," and the data in FIG. 39 has "List of positioning results required for acceptance."

"List of positioning results required for notification" in the data in the device management master in FIG. 38 is referred to by the NOTIFY(r1) function described later in FIG. 40, and is used to prevent notification of a received positioning result to the application unless the positioning history memory holds all the positioning results on the list at the time of notification.

"List of positioning results required for acceptance" in the data in the device management master in FIG. 39 is referred to by the IS_ACCEPTABLE(r1) function described later in FIG. 41, and is used to discard a received positioning result without processing unless the positioning history memory holds all the positioning results on the list after the positioning result is received.

Figure 40:
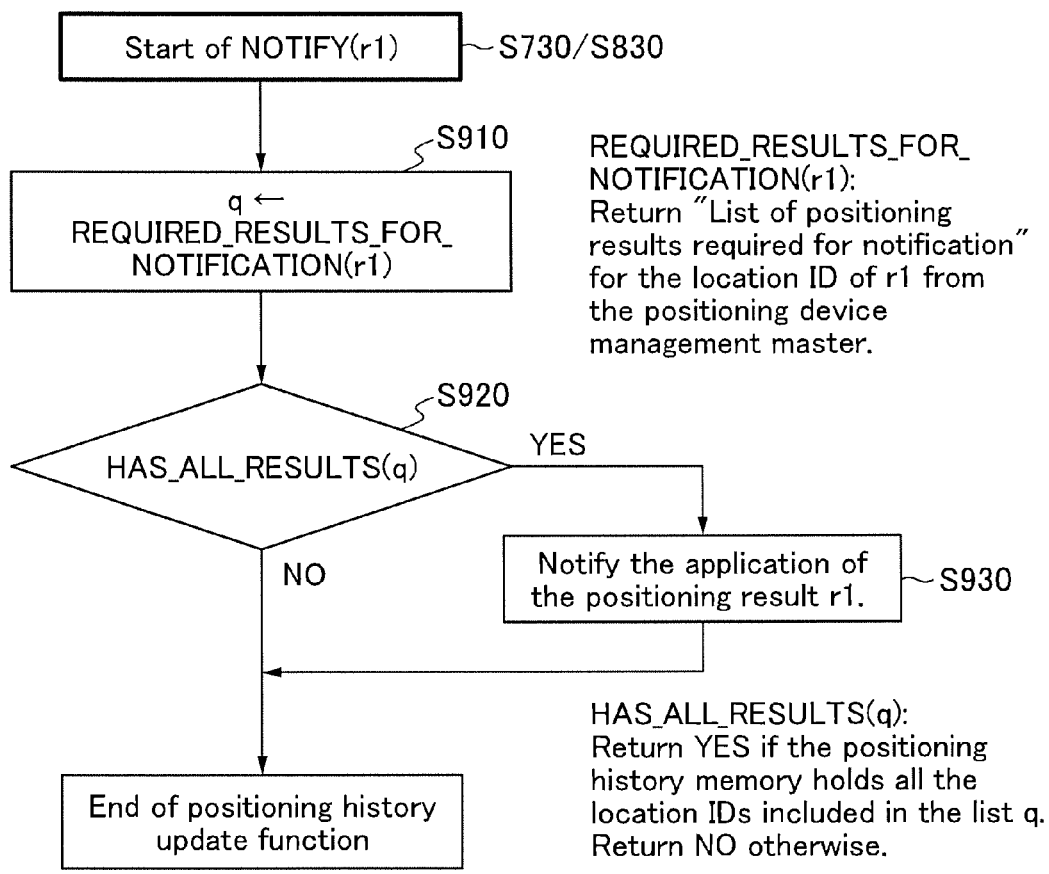
FIG. 40 is a flow diagram showing an example of the procedure of a function used to limit cases where the positioning result is notified.

FIG. 40 shows an example of the flow of the NOTIFY(r1) function in step S730 in Update example 1 in FIG. 7 and in step S830 in Update example 2 in FIG. 8, the function being for notifying of a received positioning result only when predetermined positioning results are held in the positioning history memory. In step S910, "List of positioning results required for notification" for the location ID of a positioning result r1 is acquired from the positioning device management master 175 and is substituted into a variable q. In step S920, whether the positioning history memory 165 holds all the positioning results included in the list q as elements or not is checked. If it holds them, the positioning result r1 is notified to the application and the process is ended. If it does not hold them, the process is ended without notification of the positioning result to the application.

Figure 41:
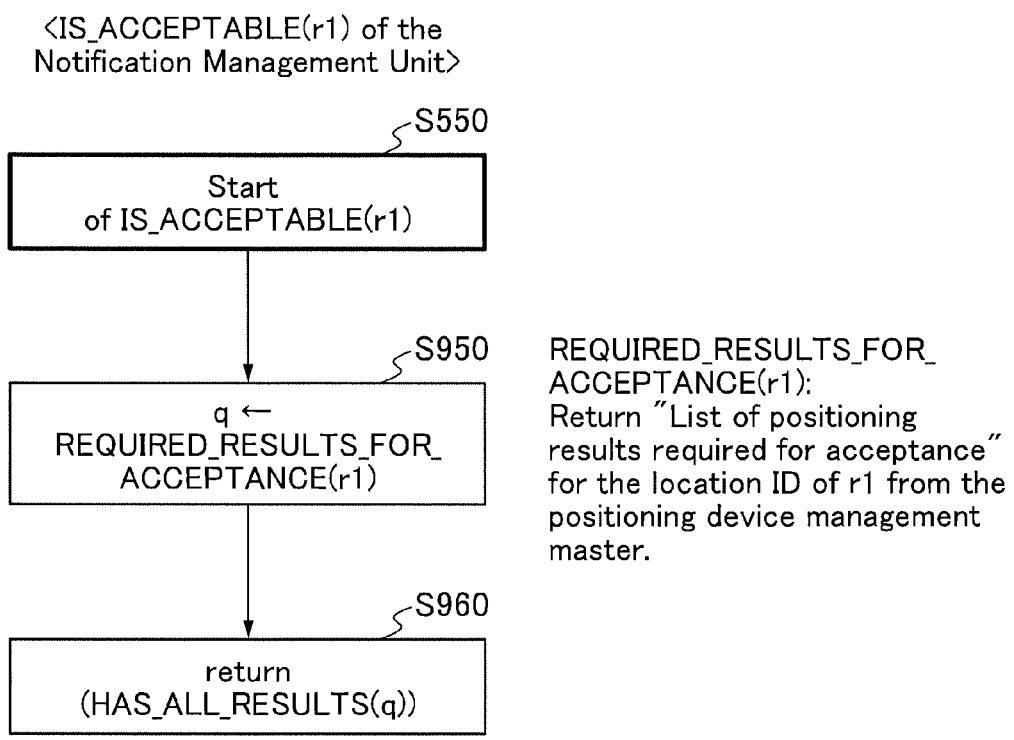
FIG. 41 is a flow diagram showing an example of the procedure of another function used to limit cases where the positioning result is notified.

FIG. 41 shows an example of the flow of the IS_ACCEPTABLE(r1) function in step S550 in Process example 1 in FIG. 5, in Process example 2 in FIG. 12, in Process example 3 in FIG. 16, and in Process example 4 in FIG. 20, the function being for processing a received positioning result only when predetermined positioning results are held in the positioning history memory. In step S950, "List of positioning results required for acceptance" for the location ID of a positioning result r1 is acquired from the positioning device management master 175 and is substituted into a variable q. In step S960, whether the positioning history memory 165 holds positioning results included in the list q as elements or not is checked, and the result is returned.

An example in which a received positioning result is notified only when predetermined positioning results are held in the positioning history memory will be described based on the course PA371 through PA375 in FIG. 37. Example (A) is used in this example with the data shown in FIG. 38 as the positioning device management master and with the flow of the NOTIFY(r1) function in FIG. 40. If another working example is used, it is required to appropriately set the levels of location IDs registered on "List of positioning results required for notification." If Example (B) is used, for example, a positioning result whose level of location ID is higher than that of a positioning result to be notified is not held in the positioning history memory, and thus the levels of location IDs registered on "List of positioning results required for notification" must be lower than or equal to that of the relevant location ID.

How positioning results are notified along the course PA371 through PA375 will be described. A positioning result RG371 is received at the point of positioning PA371, and is notified to the application because it is the first positioning result received after the start of positioning. A positioning result RW371 is received at the point of positioning PA372, and is notified to the application because it is not held in the positioning history memory. A positioning result RS373 is received at the point of positioning PA373. Though RS373 is not held in the positioning history memory, "List of positioning results required for notification" for Location ID RS373 is RS371, which is not held in the positioning history memory, so RS373 is not notified. A positioning result RS371 is received at the point of positioning PA374. RS371 is notified to the application because it is not held in the positioning history memory and "List of positioning results required for notification" for Location ID RS371 is RW371, which is held in the positioning history memory. A positioning result RS372 is received at the point of positioning PA375. RS372 is notified to the application because it is not held in the positioning history memory and "List of positioning results required for notification" for Location ID RS372 is RS371, which is held in the positioning history memory. As seen above, a received positioning result can be notified only when predetermined positioning results are held in the positioning history memory.

An example in which a received positioning result is discarded unless predetermined positioning results are completely held in the positioning history memory will be described next based on the course PB371 through PB375 in FIG. 37. Example (A) is used in this example with the data shown in FIG. 39 as the positioning device management master and with the flow of the IS_ACCEPTABLE(r1) function in FIG. 41. However, Example (B) may be used if the levels of elements on "List of positioning results required for notification" in the positioning device management master are lower than or equal to the level of location ID.

How positioning results are notified along the course PB371 through PB375 will be described. A positioning result RG371 is received at the point of positioning PB371, and is notified to the application because it is the first positioning result received after the start of positioning. A positioning result RW371 is received at the point of positioning PB372, and is notified to the application because it is not held in the positioning history memory. A positioning result RS372 is received at the point of positioning PB373. RS372 is discarded without being processed because "List of positioning results required for acceptance" for Location ID RS372 is RS371, which is not held in the positioning history memory. A positioning result RS371 is received at the point of positioning PB374. RS371 is not discarded because "List of positioning results required for acceptance" for Location ID RS371 is RW371, which is held in the positioning history memory. RS371 is notified to the application because it is not held in the positioning history memory. A positioning result RS372 is received at the point of positioning PB375 subsequently to the point of positioning PB373. RS372 is not discarded because "List of positioning results required for acceptance" for Location ID RS372 is RS371, which is held in the positioning history memory at the moment. RS372 is notified to the application because it is not held in the positioning history memory. As seen above, notification can be allowed to be provided only of positioning results received in a predetermined order.

(Another Configuration Example)

Figure 42:
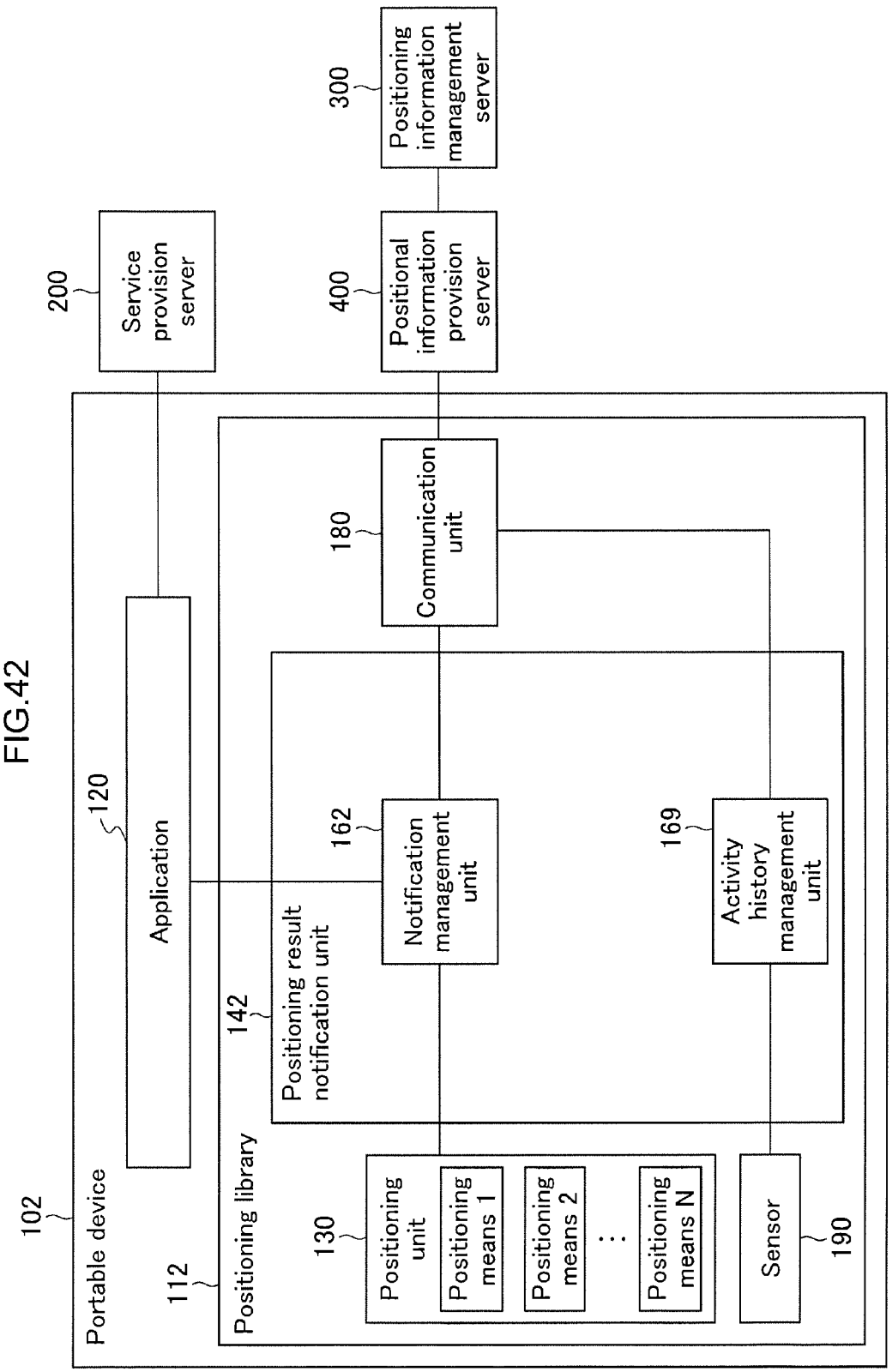
FIG. 42 is a block diagram showing another example of the configuration of the portable device of the embodiment and servers that can be used by the portable device.

FIG. 42 shows another example of the configuration of the portable device of the embodiment and servers that can be used by the portable device. This example is the configuration of the portable device having a function to transmit a received positioning result and velocity derived from an observation value obtained from a sensor of the portable device to the server along with time, and of the server device having a function to transmit information to be notified to the application to the portable device.

Software constituting the portable device 102 comprises an application 120 and a positioning library 112. The application 120 has a function, for example, to download information from a service provision server 200 and notify a user of it, based on a positioning result (e.g. location ID) notified from the positioning library 112. The service may be provided not by the service provision server 200 but by the application 120.

The positioning library 112 at the start of the application establishes a data communication path to a positional information management server 400 via a communication unit 180 and requests the server to start positioning. Upon receiving the start request, the positional information management server 400 clears its positioning history memory and activity history memory, acquires a positioning device management master and a positioning result master from a positioning information management server 300, and performs preprocessing required to determine whether a positioning result is to be notified or not. As an alternative, the positioning device management master and the positioning result master may be held by the application and be sent to the server via the library 112, or may be held by the library 112 itself in advance and be sent to the server.

A notification management unit 162 receives a positioning result from a positioning unit 130, and transmits it to the positional information provision server 400 via the communication unit 180. The positional information provision server determines whether the received positioning result is to be notified to the application or not, and transmits the positioning result to the positioning library 112 if necessary. Upon receiving the positioning result from the positional information provision server 400 via the communication unit 180, the notification management unit 162 notifies the application 120 of it.

An activity history management unit 196 acquires a measurement value related to the moving velocity of the portable device from a sensor 190 and transmits the moving velocity along with the measurement time to the positional information provision server 400 via the communication unit 180. Data in the activity history memory is not referred to when the positional information provision server 300 determines whether the positioning result is to be notified or not in embodiments of Examples (A), (B), (E) through (G), (K), and (L), so in this case the sensor 190 and the activity history management unit 196 may be excluded from the components of the positioning library 112.

While embodiments of the invention have been described, the invention is not limited by the description herein and it is a matter of course that various changes and applications may be made thereto within the scope of the invention by those skilled in the art.

The invention claimed is:

1. A device capable of being used while moving and of receiving a service according to a position to which the device has moved, the device including a processor and comprising:
    a positioning unit configured in the processor to, based on positioning signals for location identification separately received from a plurality of positioning devices, determine respective positional information of the plurality of positioning devices;
    a holding unit configured in the processor to hold positional information determined by the positioning unit for each type of the plurality of positioning devices;
    a notification unit configured in the processor to, regarding positional information newly determined by the positioning unit, determine with reference to the holding unit whether to provide notification of the position in order to receive the service or not, and provide the notification according to the determination; and
    a storage unit configured in the processor to store pieces of positional information of a predetermined number of types that should be determined in an area including one position, wherein
    the notification unit provides the notification when the holding unit comes to hold pieces of positional information of the predetermined number of types stored in the storage unit.

2. The device according to claim 1, further comprising an update unit configured in the processor to, when positional information of the same type as positional information held by the holding unit is newly determined by the positioning unit, update the held positional information with the newly determined positional information.

3. The device according to claim 1, wherein the notification unit is configured to determine to provide notification regarding the newly determined positional information based on the holding unit not holding the same positional information as the newly determined positional information as positional information of the type to which the newly determined positional information belongs.

4. The device according to claim 1, wherein the holding unit holds, along with the positional information, temporal information on a time at which the positional information was determined by the positioning unit, further comprising
a deletion unit configured in the processor to delete positional information held by the holding unit based on the temporal information.

5. The device according to claim 1, further comprising:
a unit configured in the processor to determine a relative distance traveled by the device; and
a deletion unit configured in the processor to delete positional information held by the holding unit based on the distance traveled since the positional information was determined by the positioning unit.

6. The device according to claim 1, wherein the storage unit stores pieces of positional information of the predetermined number of types along with an order in which these pieces of positional information should be determined, and
the notification unit provides the notification when pieces of positional information of the predetermined number of types stored in the storage unit come to be determined by the positioning unit in the order stored in the storage unit and be held by the holding unit.

7. The device according claim 1, further comprising a unit configured in the processor to download information to be stored in the storage unit from a positioning information management server.

8. The device according to claim 1, wherein at least part of processes of the holding unit and the notification unit are performed by making a request to a positional information provision server for processing.

9. A device capable of being used while moving and of receiving a service according to a position to which the device has moved, the device including a processor and comprising:
  a positioning unit configured in the processor to, based on positioning signals for location identification separately received from a plurality of positioning devices, determine respective positional information of the plurality of positioning devices;
  a holding unit configured in the processor to hold positional information determined by the positioning unit for each type of the plurality of positioning devices; and
  a notification unit configured in the processor to, regarding positional information newly determined by the positioning unit, determine with reference to the holding unit whether to provide notification of the position in order to receive the service or not, and provide the notification according to the determination, wherein
  the type represents priority, and the device further comprising:
  a deletion unit configured in the processor to, based on the priority of the type to which the newly determined positional information belongs being lower than a highest priority of the priorities of the types to which positional information held by the holding unit belongs, delete from the holding unit positional information that belongs to the type whose priority is higher than the priority of the type to which the newly determined positional information belongs.

10. A device capable of being used while moving and of receiving a service according to a position to which the device has moved, the device including a processor and comprising:
  a positioning unit configured in the processor to, based on positioning signals for location identification separately received from a plurality of positioning devices, determine respective positional information of the plurality of positioning devices;
  a holding unit configured in the processor to hold positional information determined by the positioning unit for each type of the plurality of positioning devices;
  a notification unit configured in the processor to, regarding positional information newly determined by the positioning unit, determine with reference to the holding unit whether to provide notification of the position in order to receive the service or not, and provide the notification according to the determination;
  a storage unit configured in the processor to store information that indicates, in an area where a certain positional information of a certain type is determined, positional information of another type that can be determined; and
  a deletion unit configured in the processor to delete from the holding unit positional information other than positional information of said another type that information stored in the storage unit indicates to be able to be determined regarding the newly determined positional information.

11. The device according to claim 10, wherein
  the notification unit is configured to determine to provide notification regarding the newly determined positional information based on a priority of the type to which the newly determined positional information belongs being higher than or equal to a highest priority of the priorities of the types to which positional information held by the holding unit belongs.

12. The device according to claim 10, wherein
  the notification unit is configured to, when positional information is deleted by the deletion unit, read from the holding unit positional information that belongs to the type whose priority is lower than a priority of the type to which the positional information belongs, and provide notification thereof.

13. The device according to claim 10, wherein
  the notification unit notifies an application program in the device or a server device communicating with the device of the position.

14. The device according to claim 10, wherein
  the priority represented by the type is determined based on the extent of an area where a positioning signal from a positioning device of the type can be received.

15. The device according to claim 10, wherein
  the priority represented by the type is determined according to the contents of the service.

16. A device capable of being used while moving and of receiving a service according to a position to which the device has moved, the device including a processor and comprising:
  a positioning unit configured in the processor to, based on positioning signals for location identification separately received from a plurality of positioning devices, determine respective positional information of the plurality of positioning devices;
  a holding unit configured in the processor to hold positional information determined by the positioning unit for each type of the plurality of positioning devices;
  a notification unit configured in the processor to, regarding positional information newly determined by the positioning unit, determine with reference to the holding unit whether to provide notification of the position in order to receive the service or not, and provide the notification according to the determination; and
  a storage unit configured in the processor to store information that indicates the type of each positioning device, wherein
  the type to which positional information determined by the positioning unit belongs is determined with reference to the storage unit, and
  when a positioning signal is received but no information is stored in the storage unit regarding the positioning device corresponding to the positioning signal, processes on the positional information regarding the positional signal is controlled not to be performed.

17. The device according to claim 16, wherein
  positioning devices whose information is stored in the storage unit are selected according to the model of the device.

18. The device according to claim 16, wherein
  positioning devices whose information is stored in the storage unit are selected according to the contents of the service.

19. A non-transitory computer-readable medium having a computer executable program stored therein to be incorporated into a device capable of being used while moving and of receiving a service according to a position to which the device has moved, at least part of which is installed on the device to provide notification of the position,
  the device including a processor and comprising
  a positioning unit configured in the processor to, based on positioning signals for location identification separately received from a plurality of positioning devices, determine respective positional information of the plurality of positioning devices, the computer executable program comprising:

program code for holding positional information determined by the positioning unit in a memory for each type of the plurality of positioning devices;

program code for determining with reference to the memory whether to provide the notification in order to receive the service or not regarding positional information newly determined by the positioning unit; and program code for storing pieces of positional information of a predetermined number of types that should be determined in an area including one position, wherein the notification is provided when pieces of positional information of the predetermined number of types stored in the storage unit comes to be held in the memory.

20. The non-transitory computer-readable medium according to claim 19, wherein the computer executable program is provided as a library to the device and provides the notification to an application installed on the device.

* * * * *